(12) United States Patent
Bedor et al.

(10) Patent No.: US 11,468,788 B2
(45) Date of Patent: Oct. 11, 2022

(54) SYSTEM AND METHOD FOR TEACHING CURRICULUM AS AN EDUCATIONAL GAME

(71) Applicant: Plasma Games, Inc., Raleigh, NC (US)

(72) Inventors: Samuel Bedor, Raleigh, NC (US); Ryan Benedetto, Holly Springs, NC (US); Michelle Gabele, Holly Springs, NC (US); Cody Hagman, Raleigh, NC (US); Andrew Hansen, Raleigh, NC (US); Hunter Moore, Raleigh, NC (US); Christophe Renaud, Chapel Hill, NC (US); Jordan Rustin, Raleigh, NC (US); Melissa Wessel, Durham, NC (US)

(73) Assignee: PLASMA GAMES, LLC, Raleigh, NC (US)

( * ) Notice: Subject to any disclaimer, the term of this patent is extended or adjusted under 35 U.S.C. 154(b) by 597 days.

(21) Appl. No.: 16/103,294

(22) Filed: Aug. 14, 2018

(65) Prior Publication Data

US 2020/0051460 A1 Feb. 13, 2020

Related U.S. Application Data

(63) Continuation of application No. PCT/US2018/046163, filed on Aug. 10, 2018.

(51) Int. Cl.
*G09B 19/22* (2006.01)
*G09B 5/06* (2006.01)

(52) U.S. Cl.
CPC ............. *G09B 19/22* (2013.01); *G09B 5/065* (2013.01)

(58) Field of Classification Search
CPC .................................. G09B 19/22; G09B 5/065
See application file for complete search history.

(56) References Cited

U.S. PATENT DOCUMENTS

| 5,556,100 A * | 9/1996 | Taylor ................... A63F 3/0478 273/249 |
| 8,506,304 B2 | 8/2013 | Connor |

(Continued)

FOREIGN PATENT DOCUMENTS

| KR | 10-2004-0052741 | 6/2004 |
| WO | 2008/086240 A2 | 7/2008 |

(Continued)

OTHER PUBLICATIONS

Lennon, Elizabeth et. al., "Taking It to the Next Interface Level: Advancing Game Design for Higher Education STEM Applications" (2014) (Year: 2014).*

(Continued)

*Primary Examiner* — Kurt Fernstrom
(74) *Attorney, Agent, or Firm* — NK Patent Law

(57) ABSTRACT

An educational game (and learning management system and methods pertaining to the same) can be configured for the effective teaching of advanced educational curriculum, such as STEM subjects for high school and above. The educational game is configured to integrate social context, real scientific principles and strategic tradeoffs within game mechanisms. This covert teaching and testing environment promotes exploration, individualized discovery, repeat engagement, and systems thinking and planning skills. The educational game can be dynamically and procedurally generated.

19 Claims, 43 Drawing Sheets

(56) References Cited

U.S. PATENT DOCUMENTS

| | | |
|---|---|---|
| 9,082,309 B1 | 7/2015 | Fuka |
| 9,230,221 B2 | 1/2016 | Gobert et al. |
| 9,333,427 B2 | 5/2016 | Sabo et al. |
| 9,373,082 B2 | 6/2016 | Gobert et al. |
| 9,378,650 B2 | 6/2016 | Kadar et al. |
| 9,564,057 B2 | 2/2017 | Gobert et al. |
| 9,798,704 B2 | 10/2017 | Cohen et al. |
| 9,849,388 B2 | 12/2017 | Cohen et al. |
| 9,858,828 B1 | 1/2018 | Fuka |
| 9,916,772 B1 | 3/2018 | Schell et al. |
| 2006/0273510 A1* | 12/2006 | Pelzel .............. A63F 1/00 273/243 |
| 2007/0076015 A1 | 4/2007 | Tanabe et al. |
| 2008/0038705 A1 | 2/2008 | Kerns et al. |
| 2008/0038708 A1 | 2/2008 | Slivka et al. |
| 2008/0166686 A1 | 7/2008 | Cook et al. |
| 2009/0081628 A1 | 3/2009 | Leban et al. |
| 2009/0186329 A1 | 7/2009 | Connor |
| 2009/0325140 A1 | 12/2009 | Gray et al. |
| 2010/0029384 A1* | 2/2010 | Andersen .......... A63F 13/10 463/32 |
| 2010/0209896 A1 | 8/2010 | Weary et al. |
| 2010/0261151 A1 | 10/2010 | Skelton et al. |
| 2011/0065082 A1* | 3/2011 | Gal .................. G09B 7/02 434/365 |
| 2011/0076654 A1 | 3/2011 | Green et al. |
| 2011/0165540 A1 | 7/2011 | Riedel-Kruse |
| 2011/0250571 A1 | 10/2011 | Weary et al. |
| 2011/0250572 A1 | 10/2011 | Weary et al. |
| 2011/0250573 A1 | 10/2011 | Weary et al. |
| 2011/0250574 A1 | 10/2011 | Weary et al. |
| 2013/0177878 A1 | 7/2013 | Rodriquez et al. |
| 2013/0260351 A1 | 10/2013 | Pasqualis et al. |
| 2014/0065590 A1 | 3/2014 | Kim et al. |
| 2014/0123067 A1 | 5/2014 | Sokolsky et al. |
| 2015/0050625 A1 | 2/2015 | Stein et al. |
| 2015/0111191 A1 | 4/2015 | Kim et al. |
| 2016/0034434 A1 | 2/2016 | Guerrier et al. |
| 2016/0117942 A1* | 4/2016 | Marino ............... G09B 7/00 434/219 |
| 2017/0017630 A1 | 1/2017 | Barash et al. |
| 2017/0068895 A1 | 3/2017 | Kil et al. |
| 2017/0256172 A1 | 9/2017 | Kil et al. |
| 2017/0363854 A1 | 12/2017 | Filippov |
| 2017/0365179 A1 | 12/2017 | Filippov |
| 2017/0372215 A1 | 12/2017 | Platt et al. |
| 2018/0053439 A1 | 2/2018 | Philippov et al. |
| 2018/0082392 A1 | 3/2018 | Miller et al. |

FOREIGN PATENT DOCUMENTS

| | | |
|---|---|---|
| WO | 2010/002395 A1 | 1/2010 |
| WO | 2016/142706 A1 | 9/2016 |
| WO | 2017040417 A1 | 3/2017 |

OTHER PUBLICATIONS

Pranantha, D., Chen, W., Bellotti, F., Van Der Spek, E., De Gloria, A., & Rauterberg, M. (Apr. 2014). Designing Physics Game to Support Inquiry Learning and to Promote Retrieval Practice. In CSEDU (1) (pp. 330-337) (Year: 2014).*

Nykl, Scott et. al., "An Overview of the STEAMiE Educational Game Engine" 38th ASEE/IEEE Frontiers in Education Conference 2008 (Year: 2008).*

Moore, Emily B., et. al., PhET Interactive Simulations: Transformative Tools for Teaching Chemistry, Journal of Chemical Education, 2014 (Year: 2014).*

PCT, International Search Report and Written Opinion in International application No. PCT/US2018/046163 dated May 10, 2019.

PCT, International Preliminary Report on Patentability in International application No. PCT/US2018/046163 dated Feb. 16, 2021.

INAPI Chile, Office Action for corresponding Chilean Patent Application No. 2021000315, dated Mar. 16, 2022, 11 pages.

* cited by examiner

Achievements — *Laboratory*

Sheila was born outside of Washington DC in. Sheila discovered chemistry at a young age and was drawn to its elegant simplicity. Infinite combinations of matter can be formed from the same 119 basic elements.

As a laboratory chemist, Sheila's daily work influences the way people understand the world, helps find more productive and efficient manufacturing techniques. She is currently working on formulations that will make generic medications more heat tolerant, thereby improving the shelf life of drugs — which is much needed in a world under threat from The Hive.

Advances in computer visualization capabilities have made it possible for Sheila to present complex data sets to regulators, expediting the review of her breakthroughs. Sheila is an avid contributor to Charted, an open source visualization tool. She also contributes to a growing effort to make chemistry more open and transparent by creating a platform that connects chemists around the world and facilitates sharing of basic research data in a secure and trusted manner.

*In Game Effect:* Catalyst
Oxidation/reduction reactions occur more vigorously (REDOX: 2x time based effects)

Sheila

*Job Title:* Laboratory Chemist 2
*Employer:* Big Company, Inc. in *NYC, NY*
*Salary:* $100,000
*Prior Jobs:* Laboratory Chemist 1 at Other Co.
*Education:* MS Chemistry from School U.
BS Biochemistry from School U.

*Job perk:* predictable hours

*Impacts:* Env. | Soc. | Diff. | Fun

At Risk Report — 1430

| # | Name | At Risk Score | Reason | Comments | Message |
|---|---|---|---|---|---|
| 1 | Daniel Sattely | 0.5 | Incomplete Assignments | 01/14/2018: Sent message. 01/05/2018: Added to system. | P / S |
| 2 | Rebecca Bard | 0.5 | Incomplete Assignments | 01/15/2018: Received response. RB was out of town for first 2-weeks, but will make up assignments soon. 01/05/2018: Added to system. | P / S |
| 3 | Sam Pudnitz | 0.4 | Volatile usage | 01/14/2018: Follow-up if volatility continues. 01/05/2018: Added to system | P / S |
| 16 | Penelope Gonzalez | 0.08 | N/A | 01/05/2018: Added to system | P / S |
| ... | | | | | |

1432 At Risk Score, 1434 Reason, 1436 Comments, 1438 (marker), 1440 Message, Back

FIG. 40

Marie Curie — 1480

Challenges Created: 1 — 1482
Joined: Jan. 1, 2018

*Custom Lesson Mode*

Back

1484 — Engagement Rating: 95%
Easter Eggs Found: 60%

Curriculum Difficulty Mode

Easier — 1490 Complex — *customize* 1498

Level Difficulty Mode

Easier — 1492 Harder — *customize* 1498

Learning Styles

Play to strengths — 1494 Work on weaknesses — *customize* 1498

Episode 1: First Contact

Intro: First Contact
Level 1: The Clearing
Level 2: New Allies
Level 3: The Power Station
Level 4: Crossroads encounter
...

Physical Science (1 of 5) - NGSS — 1486

HS-PS1-1: Intro to Chemistry
HS-PS1-2: Atomic Model
HS-PS1-7: E-mag Radiation
HS-PS1-3: States of matter
HS-PS1-4: Bulk Properties (1 of 2) — 1488
...

FIG. 43A

| Subject Matter | Material | Categorical Topic | specific Modules (order unlocked, Substance, Format, Learning Style) | | | | |
|---|---|---|---|---|---|---|---|
| Chemistry | Carbon | Electro-magnetic properties | 5<br>concept<br>video<br>mixed media | 6<br>formula<br>text<br>logical | 13<br>definition<br>text, audio<br>mixed media | 14<br>example<br>video<br>process | 19<br>industry<br>text<br>visual | 21<br>concept<br>text<br>visual |
| | | Chemical reactivity properties | 7<br>concept<br>video<br>mixed media | 8<br>concept<br>text<br>visual | 9<br>history<br>audio<br>audio | 15<br>example<br>video<br>process | 16<br>concept<br>audio<br>visual | 17<br>industry<br>audio<br>visual |
| | | Combustion properties | 12<br>concept<br>video<br>audio, social | 10<br>history<br>visual | 11<br>concept<br>text, audio<br>visual | 25<br>concept<br>video<br>social | 26<br>problem<br>audio<br>logical | 28<br>industry<br>text<br>visual |
| | | Nuclear properties | 29<br>concept<br>video<br>visual | 30<br>concept<br>video<br>visual | 27<br>formula<br>text<br>logical | 22<br>concept<br>video<br>logical | 23<br>definition<br>text, audio<br>visual | 24<br>problem<br>text<br>visual |
| | | Bulk material properties | 1<br>concept<br>video<br>social | 2<br>concept<br>text<br>visual | 3<br>history<br>audio<br>social | 4<br>formula<br>video<br>logical | 10<br>example<br>text<br>visual | 11<br>industry<br>video<br>audio |
| | Nitrogen | Electro-magnetic properties | 31<br>concept<br>industry | 32<br>concept | 33<br>definition | 34<br>example | 35<br>industry | 36<br>career |

FIG. 44

SYSTEM AND METHOD FOR TEACHING CURRICULUM AS AN EDUCATIONAL GAME

CROSS-REFERENCE TO RELATED APPLICATION

This application is a continuation of International Patent Application Serial No. PCT/US18/46163, filed Aug. 10, 2018, entitled "System and Method for Teaching Curriculum as an Educational Game," all of which is incorporated by reference herein.

FIELD OF DISCLOSURE

The present application is directed to a system and methods for teaching curriculum as an educational game, and a learning management system and methods relating to the same.

BACKGROUND

Formal education and educational techniques, or pedagogy, date back thousands of years. As the demands of society and the state of knowledge evolves, educational institutions and pedagogy have adapted to the occasion. For example, social norms and educational practices rooted in the Agricultural Revolution were updated over the last 300-years in response to the Industrial Revolution. Today, the world is being transformed by the Information Technology (IT) Revolution among other scientifically-driven trends. This has already impacted most aspects of modern life. But educational practices are lagging behind and have mostly only adapted IT-tools and techniques for peripheral tasks like record keeping. Learning management systems (LMS) are still in their infancy and have failed to transform the educational experience. Conventional learning management systems typically facilitate record keeping and notifications but provide little insight about students because the data tracked is information-poor, namely, it tends to be limited to observations of a single, final submission per assignment, a performance assessment or grade of that submission and the time of submission. Effective use of IT and IT-enabled pedagogy within or as a supplement to the classroom is still lacking. At the same time, the frenetic pace of scientific and other technological advancements is driving forward, constrained more by the knowledge capabilities and social norms (regulation) than the availability of capital or resources. Educational institutions and pedagogy still need further improvements to take advantage of available digital technologies and best practices.

Education is a primary driver of social change and adapting to the needs of tomorrow. Education is also highly localized to suit the needs of individual countries, societies and cultures. The state of education in one country may be quite distinct from another. For instance, the US economy is generally healthy and at the forefront of science and technology. However, the US educational system is falling behind. It is criticized for failing to adequately train students in science, technology, engineering and math (STEM) subjects. This is both a broad-based critique that the average US student is not sufficiently aware or capable in these fields, and a specific critique that the number of STEM professionals graduated each year is lagging behind international per capita norms by a large margin. This puts the US economy at risk of being leap frogged by small and focused economies that have more effectively embraced science and advanced technology, like South Korea and Israel which lead on per capita scientific capabilities and output, as well as large and strategically committed economies that are embarking on massive transformations, like China and India. As a result, the US educational system is in dire need of breakthrough innovations to its institutions and pedagogy to sustain the US's competitive position in the global economy.

One such example of reform or innovation in the US educational system is the migration from No Child Left Behind (NCLB) and Common Core testing to the Every Student Succeeds Act (ESSA) and Next Generation Science Standards approaches. These reforms are intended to make the educational environment more responsive to individual- and class-level needs while allowing teachers more flexibility in how they approach topics. In addition, these reforms are intended to expand the curriculum focus from discrete lessons and concepts to broader context, trends and scientific reasoning. While these sound like reasonable intentions, the reforms are also reconfiguring the traditional course progression at some schools. This is, in turn, creating its own problems and challenges. For instance, teachers are expected to cover curriculum for which they may not be trained, causing strain and burnout in the labor force while underserving students. There is a need for educational options that mitigate the labor force gaps in the educational system during the current and future educational reforms.

Another such reform or innovation in the US educational system is the rise of alternative school formats, like charter schools, virtual schools, homeschooling, and off-track schools. In response to a variety of issues in the public educational system, new school formats have been authorized, funded and deployed across the country. The alternative school formats serve approximately 15% of K-12 students. Charter schools are often very similar to public schools in their general format (e.g., large buildings, ~20-30 student classrooms, ~7 periods per day, etc.), but charter schools are provided greater flexibility in how they approach student development and education. The specific focus or strategy of a charter school (e.g., being a liberal arts-first program that teaches all subjects through the lens of a classical humanities education or being a math and science-first program that emphasizes the scientific method and research-driven inquiry) may result in deficits in the course offerings. Charter schools partially offset their gaps through self-selection and strategic focus. But this could become a problem if educational standards are increased (e.g., to catch up with South Korean K-12 requirements). Virtual schools are online-first programs that rely more on student-driven studies and activities and have periodic in-person school days to provide some socialization and face-to-face interactions. Virtual schools are flexible and provide a broad mix of courses, but they are dependent upon the available course offerings. Meanwhile, homeschooling is an increasingly popular option by which parents (or groups of parents) take ownership of their child's education. Homeschool parents will often teach their children directly or coach their student through self-guided learning. In addition, groups of homeschool parents will form to coordinate access to rare skills, like science education, to round out course offerings. Off-track schools are short-term schools that occur when other schools go on break. They are a means of keeping students in the learning mode, retaining the gains from the prior semester, and providing exposure to new topics or enrichment beyond what the traditional school can offer. Each of these alternative school formats have emerged to solve some issues with the traditional educational system but create new issues and challenges. There is a need for more robust educational materials and curriculum supplements to address a varied educational landscape.

At the same time, global trends and demographics show that the real impact of educational reform in the coming century will be in the developing world, not the US. Half of the world's children are born in South East Asia. Some of these children will be the first in their family to receive a formal education beyond the most rudimentary level (K-6). The educational systems are simultaneously being built-out and updated for modern curriculum. As a result, the students may be expected to learn about the state of the art of science and technology, globally, even though the students' teachers are unlikely to have the training, expertise or access to resources to properly teach this curriculum. Therefore, there is a great need for breakthrough innovations to educational curriculum, materials and pedagogy to address the needs of the developing world's educational systems—even before institutions are adequately developed.

In addition to these global-scale and macro-level needs that impact educational systems, there are also a variety of issues and limitations with the current state of education and pedagogy that impact the class-room environment and the efficacy of education. For instance, education is a social process. Students don't just learn curriculum as presented on a syllabus or in a textbook. Students learn through the lens of their teachers and their educational experience. Students learn through the creation of relationships and the identification of role models. And students learn through their social ties and relationships outside of the classroom. Giving students exposure to the world beyond the horizon of their upbringing is a critical aspect of empowering students to engage with the curriculum, to learn and grow, and to pursue higher education and careers that might otherwise seem out of reach. There is a need for educational innovations that make education a more social experience and that inspire children down a career path.

If education is defined as the transfer of knowledge and knowledge is considered a socially-embedded construct, then education is also a process of societal instruction and finding one's place in the world. The world and the economy are increasingly global. Both face systemic challenges unlike humanity has ever known, including issues of climate change, pandemics, and persistent social economic stratification. These should drive humanity's collective efforts toward common goals. But reactionary political movements, zero-sum thinking and social media can make the world feel divided and remote from individual experience. There is a need for educational innovations that make education a more contextualized and meaningful experience that unites all students.

Education is also an evolving enterprise. It has always been known that every student is different in their capabilities, limitations and interests. But it has only been relatively recently that experimentation and systematic research has uncovered ways to effectively teach to different students within the confines of existing class formats. There is still a need for further educational innovations that make education a more customized and tailored experience that is sensitive to individual strengths and weaknesses.

In addition, education is being pulled in a lot of different directions, which has resulted in a universal sense of time constraint and frustration. For example, in the United States, school administrators are being held accountable more and more by Federal agencies on top of prior State, District and Town levels of oversight. Teachers are expected to cover more curriculum in new ways, while also reporting grades more frequently and administering more tests. Digital platforms have streamlined some of the mechanical tasks of reporting but have also exposed teachers to more direct, regular communication with administrators and parents. Students are expected to learn more curriculum while bolstering their extracurricular activity resumes for college admissions. Parents, who are increasingly in dual-working or single-parent situations, find themselves spending more time driving to those activities and carrying more of the burden to fund their child's education through fundraisers. In short, stakeholders across the education system are finding themselves short on time and looking for more convenient, flexible ways to learn. There is a need for educational options that are either more efficient and, save time, or, at least, more respectful of the time constraints of all stakeholders.

As one further issue—and a disruptive one at that, education is currently struggling to capture the attention and interest of students with flat black-and-white textbooks, long class lectures and boring assignments. Today's students are growing up as digital natives who have been inundated by flashy, bright colored and stimulating content on television, tablets and phones since they were born. Education has failed to keep pace with the production quality and innovative presentations of the rest of the media industry. As a result, students are less engaged by traditional course content. Students also find it more difficult to concentrate on less sensory-stimulating materials. This issue is further exacerbated by rising rates of health issues, like: attention deficit disorder (ADD) and attention deficit hyperactivity disorder (ADHD), which make it harder for impacted students to study in seated classroom environments; autism, which can make it harder for impacted students to concentrate in bustling classroom environments; and many disorders in between. There is a need for educational options that can compete with polished mainstream media stimuli and capture the attention of students who find it hard to learn in typical classroom environments.

One such area of main stream media that has experienced significant growth and widespread adoption amongst K-12 age students is video games. Video games have come a long way in the last 40-years, evolving from monochromatic line and dot graphics with parlor game style play to photo-realistic immersive environments with deep game play. Video games seem to capture the attention of young audiences by default, drawing them in with compelling graphics and a new rule structure to learn and master. Therefore, it should be no surprise that the education industry has started to look to video games for inspiration in next generation educational materials and pedagogy.

For the most part, this inspiration has culminated in mere "gamification" of prior educational materials. As shown in FIG. 1, a prior art method of gamifying educational materials typically involves borrowing extant curriculum, extant materials, and extant teaching styles 2 and applying a series of transformations to that material to gamify it 4. This step of gamifying extant materials 4 can include any of the following: translating textbooks into apps 6 which simply involves migrating content from print formats (e.g., text books) to digital interfaces (e.g., phone screens); polishing the visual aesthetic 8 of the content, which is achieved by adding colorful graphics, animated characters, and lots of stars, flashing pop-ups and other indicators of interaction; adding audio feedback 10, which takes advantage of the mixed-media nature of computer interfaces; renaming quizzes as games 12, which is a thinly veiled effort to make the experience seem different even though the underlying content has not been fundamentally reconfigured; and stopping the reliance on grades (e.g., A, B, C, D, F) and starting the use of points (e.g., 32,560 points or 3 gold stars as a proxy for an A) 14 to transform the evaluating system and distract students from the fact that they are still just taking a quiz. After applying some or all of the above steps, a traditional textbook or in class educational material is transformed into a gamified educational experience. This process has been repeated countless times for K-6 curriculum, specifically, in the math and early reading areas (e.g., popular games include Davidson and Associate's MathBlasters, Age of Learning's ABCMouse, Dreambox Learning's math game, and WeWantToKnow AS's Dragonbox). Beyond grade 7, there are only a few examples of gamification that have achieved traction. For example, Legends of Learning has created a number of science mini-games with high graphic design standards, but which merely gamify traditional quizzes and simulations. Triseum's Variant: Limit is a visually stunning puzzle game that teaches calculus concepts, but the game world, story and gameplay are unrelated to the educational material that is taught (calculus) and, thus, it is also merely a gamified quiz. Gamification falls short in many areas. Gamification appears wholly inadequate to address the complexity of more advanced content. Gamification fails to teach curriculum within socially embedded processes, which are important to understanding how science progresses and the tradeoffs it faces. And gamification may not appeal to more mature audiences, hence, the lack of available options for high school and beyond. Moreover, it is not yet clear if gamification is an effective and long-term solution to education's needs. Most of these gamified experiences are unsubstantiated in their efficacy and the assessments of academics show lackluster results. The designers of gamified products merely: hope that the gamified experience is fun 16; hope that fun translates into improved engagement 18; hope that engagement translates into improved learning 20; and hope that improved learning translates into improved retention 22. There are a lot of disconnects and sources of frailty in this causal sequence. Therefore, there is a need for educational options that go beyond the limitations of gamification.

For more complex curriculum, the set of available options is even less inspired. Most of the available educational materials are either mere digitization of traditional textbooks (per step 6, above) or virtual simulators. The digitized textbooks sometimes include lightly gamified quizzes and tests but are pedagogically indistinguishable from the textbook experience. For example, McGraw Hill has a line of Glencoe digital textbooks that adapt traditional materials for tablets and other computer interfaces. Virtual simulators, whether designed for 2D computer interfaces or 3D virtual reality goggles, are capable of replicating laboratory experiment experiences, transporting students into the distant past or far off locations, and a variety of clever use cases. These virtual environments are cost effective (e.g., versus a class trip around the world), safe (e.g., relative to a chemistry lab with toxic fumes and explosive or corrosive substances), alleviate some of the teaching load by incorporating some walk throughs and guidance into the virtual lab experience (e.g., versus teacher-run labs), and have some other advantages. As another example, Schell Games recently released a virtual reality chemistry lab experiment game show simulator called HoloLAB Champions that may bring the lab experience to millions of students who might not be privileged enough to attend schools with the funding, resources, or teaching staff capable of providing a real-world chemistry lab. However, these materials—both digitized textbooks and virtual simulators—are still static (e.g., they offer the same experience each time), finite (e.g., they usually only tackle one or two modules of a course curriculum at a time) and are fundamentally tethered to the pedagogical approaches of the extant educational materials from which they are derived. Another way of thinking about this is that educational technology (EdTech) is currently transitioning through the Web 1.0 era of merely migrating content to digital. EdTech has not yet taken the leap into a digital-first world or Web 2.0 (or beyond) practices. There is a need for educational options that transcend mere digital transformation of extant educational materials and pedagogies.

Which leads to an exciting new area of development: serious games. Serious games are a category of video games where the primary purpose is something other than entertainment. Serious games resemble real-time strategy games (e.g., Blizzard's Starcraft line) that are created for scientific exploration and behavioral psychology experimentation, defense and military strategy simulations, as well as city planning, emergency management, and other socially-embedded process modeling efforts where human behavior is a key input to the focal system. Serious games show a lot of promise in transforming the way that humans approach a variety of tasks (e.g., problem solving) by transitioning from a set of research and modeling norms that rely on universal truths and suffers from so-called "physics envy" of predictability, and toward a new set of research and modeling norms that embrace cognitive and behavioral psychology, bounded rationality, and diverse preference sets of people. For example, IBM has a serious games business unit that has built simulators for a variety of applications from military defense to urban planning. IBM's serious games have resulted in new insights and strategies about how to conduct military search patterns and build out urban infrastructure. Serious games are still a recent phenomenon, and they have not yet permeated all possible applications. There is a need for educational options that transcend fixed simulations and embrace behavioral factors.

Serious games have only just started to be developed for educational applications. For example, a team at MIT developed a massively multiplayer online (MMO), open world, serious game called The Radix Endeavor that was released in 2014. In The Radix Endeavor, users are exposed to some biology and statistics concepts by a process of self-guided exploration of the game's vast environment. While intriguing and a promising prototype, the game is light on content—both in terms of total educational concepts and the density of concepts that a student can experience in a given period of time. It also fails to meaningfully integrate the educational curriculum into the user interactions, resulting in a disconnect between game play and the content. Critically, because of this disconnect, play does not drive learning, repeat play does not drive greater recall, and complete play does not drive deeper learning. It also fails to satisfy many of the needs of key stakeholders, including teachers and students, who are: time constrained and, thus, cannot afford to explore aimlessly; lesson constrained and, thus, need guidance in which game features to utilize at which times to keep pace with prescribed curriculum; and burnt out by a plethora of content that merely digitizes extant presentations of educational materials and, thus, do not want to even try new options. There is a need for educational options that leverage promising new approaches and actually satisfy the needs of the users.

In summary, education is at a crossroad. Much of the system of education, its institutions and pedagogical approaches is rooted in the past. This is currently a time of great global transformation that is placing complex demands on institutions and asking for innovative new approaches. The IT Revolution has great potential to meet these needs, but it has also presented new challenges. Looking forward, there is a great need for radical innovations across the entire educational value chain.

BRIEF SUMMARY

According to a first invention, a game, system and method for teaching science, technology, engineering and math (STEM) curriculum is provided. The game includes an enemy avatar that has a set of scientific properties, and a player-controlled avatar that is configured to interact with the first set of scientific properties of the enemy avatar using at least one game mechanism. The interaction of the at least one game mechanism with the first set of scientific properties is a simulation of scientific principles.

According an embodiment, the player-controlled avatar has a second set of scientific properties, and the enemy avatar is configured to interact with the second set of scientific properties of the player-controlled avatar using a game mechanism. The interaction of the game mechanism with the second set of scientific properties is also a simulation of scientific principles. According to another embodiment, the player-controlled avatar has a supply of energy, and the interaction of the game mechanism with the first set of scientific properties is accurately simulated in two parts. The two parts include: a player-controlled action portion that transmits energy from the supply of energy of the player-controlled avatar to the enemy avatar; and an enemy reaction portion that absorbs the transmitted energy based on the first set of scientific properties. According to another embodiment, the game includes a field of play that has a third set of scientific properties. The game mechanism is configured to interact with the third set of scientific properties of the field of play, and the interaction of the game mechanism with the third set of scientific properties is a simulation of scientific principles. According to another embodiment, the interaction of the game mechanism with the first set of scientific properties is accurately simulated in multiple parts, including: a player-controlled action portion that transmits energy from the player-controlled avatar to the enemy avatar, an enemy reaction portion that absorbs some of the transmitted energy based on the first set of scientific properties, and a loss factor portion that dissipates a remainder of the transmitted energy into the field of play. According to another embodiment, the first set of scientific properties is selected from the list of: electrical properties, magnetic properties, thermal properties, chemical reactivity properties, combustion reactivity, nuclear properties, bulk physical properties, organic molecule properties, protein properties, cell structure properties, and biological function properties. According to another embodiment, the first set of scientific properties is simulated based on elements from the periodic table of elements. According to another embodiment, the game mechanism is a simulation of a gadget that is configured to operate with an element from the periodic table of elements as the medium of the gadget. According to another embodiment, the first set of scientific properties is simulated based on cell structure and function of cells selected from the list of: prokaryotic cells, plant cells and animal cells. According to another embodiment, the simulation of scientific principles is based on energy transfer and energy conversion. According to another embodiment, the game mechanism is a simulation of energy transfer based on a selection from the list of: radiation, photon emission, conduction, convection, projection, chemical reaction, fusion and fission. According to another embodiment, the game mechanism is selected from the list of: an electro-magnetic radiation gadget that is simulated based on the Bohr model of the atom and the absorption of radiation by metals; an electro-magnetic pulse gadget that is simulated based on Maxwell's equations and the Lorentz force law of electromagnetism and the induction of electric current in metal circuits; an oxidation-reduction sprayer that is simulated based on chemical reaction of elements and molecules and the conduction and convection of heat energy to matter; an acid-base reaction gadget that is simulated based on acid-base properties, the chemical reactivity of elements and molecules and stoichiometry, and the conduction and convection of heat energy to matter; a railgun device that is simulated based on Faraday's laws of induction and the laws of classical mechanics regarding the transfer of kinetic energy to macroscopic objects and the impact on the structural properties of matter; an electronic transmission device that is simulated based on analog and digital electronic component control systems properties regarding the controlled transfer of an electronic signal to interact with the electro-magnetic properties of the matter; a virus that is simulated based on cell structure and function theories and that alters the function of the cell structure; and a cell structure that is simulated based on prokaryotic cell, plant cell or animal cell functions and that produces byproducts for the cell. According to another embodiment, the game mechanism cross-cuts at least two domains of scientific knowledge. According to another embodiment, the game has a laboratory area with explanations, equations and data relating to the interaction of the game mechanism with the first set of scientific properties. According to another embodiment, the game has an achievements area with industry context, career trends and employment information relating to the interaction of the game mechanism with the first set of scientific principles.

According to a second invention, a computer system, software product and method for educational assessment is provided. The system has a processor and a non-transitory computer readable medium that stores instructions to implement an educational game software module. The educational game software module receives educational curriculum, creates a game mechanism from the educational curriculum that is based on science principles, and generates an educational game including the game mechanism.

According to an embodiment, the educational game software module initializes a database with content based on the educational curriculum, receives educational standards relating to the educational curriculum, aligns the educational curriculum with the educational standards, and identifies the educational curriculum into educational modules based on the alignment of the educational curriculum and the educational standards. The game mechanism is only created for educational modules identified from within the educational curriculum. According to another embodiment, the educational game software module receives a game asset, and associates the game mechanism with the game asset. According to another embodiment, the educational game software module tracks user performance based on use of the game mechanism, and generates a user learning profile based on the user performance. According to another embodiment, the educational game software module defines a set of pedagogical objectives for the educational curriculum, scores the educational curriculum based on the pedagogical objectives, and creates the game mechanism based on the scoring of the educational curriculum. According to another embodiment, the educational game software module defines a set of learning styles for the educational curriculum, scores the educational curriculum based on the learning styles, and creates the game mechanism based on the scoring of the educational curriculum. According to another embodiment, the educational game software defines a set of learning objectives for the educational curriculum, scores the educational curriculum based on the learning objectives, and creates the game mechanism based on the scoring of the educational curriculum. According to another embodiment, the educational game software module defines a sequence of learning objects for the educational curriculum, scores the educational curriculum based on the sequence of learning objects, and creates the game mechanism based on the scoring of the educational curriculum. According to another embodiment, the educational game software module develops tiers of the game mechanism. Each tier of the game mechanism varies in complexity, such as a number of user controlled inputs, a specificity of calculation of the user controlled inputs, and a number of domains cross-cut by the user controlled inputs. According to another embodiment, the educational game software module presents the educational game to a user, receives a user input including use of the game mechanism, and updates the educational game based on the user input received. According to another embodiment, the educational game software module generates a user learning profile that tracks user performance based on use of the game mechanism. The educational game updates the educational game based on the user learning profile. According to another embodiment, the educational game software module defines a set of pedagogical objectives for the educational curriculum, scores the educational curriculum based on the pedagogical objectives, and creates the game mechanism based on the scoring of the educational curriculum. The educational game updates the scoring of the educational curriculum. According to another embodiment, the educational game software module defines a set of learning styles for the educational curriculum, scores the educational curriculum based on the learning styles, and creates the game mechanism based on the scoring of the educational curriculum. The educational game updates the scoring of the educational curriculum. According to another embodiment, the educational game software module defines a set of learning object categories for the educational curriculum, scores the educational curriculum based on the learning object categories, and creates the game mechanism based on the scoring of the educational curriculum. The educational game updates the scoring of the educational curriculum based on the set of learning object categories. According to another embodiment, the educational game software module defines a sequence of learning objects for the educational curriculum, scores the educational curriculum based on the sequence of learning objects, and creates the game mechanism based on the scoring of the educational curriculum. The educational game updates the scoring of the educational curriculum based on the sequence of learning objects. According to another embodiment of the invention, the educational game software module develops tiers of the game mechanism. According to another embodiment of the invention, the educational game software module develops tiers of the game mechanism based on the scoring of the sequence of learning objects.

According to a third invention, a method, educational game and computer system for teaching science, engineering, technology and math (STEM) curriculum is provided. The method is performed using a computer system having a processor, non-transitory computer-readable medium and an educational game software package. The method retrieves variants of a game mechanism, renders a variant of the game mechanism that is configured to have two or fewer user input controls, receives input from the user input controls, renders another variant of the game mechanisms that is configured to have at least two user input controls, and receives input from the at least two second user input controls.

According to an embodiment, the method renders a third variant of the game mechanisms that is configured to have at least three user input controls, and receives input from the user input controls. According to another embodiment, the variants of the game mechanism are rendered in order. According to another embodiment, the variants of the game mechanism are rendered in order of increasing complexity along at least one dimension, including: a number of domains of educational curriculum, educational curriculum difficulty, and learning style difficulty. According to another embodiment, the second variant of the game mechanism relates to more domains of educational curriculum than the first variant of the game mechanism. According to another embodiment, the third variant of the game mechanism relates to more domains of educational curriculum than the first variant of the single game mechanism. According to another embodiment, the third variant of the game mechanism relates to more domains of educational curriculum than the second variant of the game mechanism. According to another embodiment, the second variant of the game mechanism presents educational curriculum of greater difficulty than the first variant of the game mechanism. According to another embodiment, the third variant of the game mechanism presents educational curriculum of greater difficulty than the first variant of the game mechanism. According to another embodiment, the third variant of the game mechanism presents educational curriculum of greater difficulty than the second variant of the game mechanism. According to another embodiment, the second variant of the game mechanism presents more learning styles than the first variant of the single game mechanism. According to another embodiment, the third variant of the game mechanism presents more learning styles than the first variant of the game mechanism. According to another embodiment, the third variant of the game mechanism presents more learning styles than the second variant of the game mechanism.

According to a fourth invention, an educational game for teaching science, engineering, technology and math (STEM) curriculum is provided. The educational game includes a first avatar, and at least one defensive item (or at least one offensive item) equipped by the first avatar. The defensive item (or the offensive item) has at least one scientific property based on real scientific principles and selected from a list of: electro-magnetic properties, chemical reactivity properties, combustion properties, nuclear properties, and bulk material properties.

According to an embodiment, the scientific property of the defensive item is based on an element from the periodic table of elements. According to another embodiment, the defensive item has at least two facings with a different scientific property. According to another embodiment, the defensive item has at least two layers with a different scientific property. According to another embodiment, the defensive item has at least two facing with a different scientific property. The defensive item has at least two layers for each of the facings and each layer has a different scientific property. According to another embodiment, the scientific property of the defensive item is based on an element of the periodic table of elements. According to another embodiment, the modification to the defensive item.

The modification augments the scientific property in accordance with real scientific principles. According to another embodiment, the scientific property of the defensive item is based on a metal from the periodic table of elements. The modification and the augmentation of the scientific property include: additional mass of the element and proportionate increases in mass-based properties, mechanical design changes including thermal ventilating fins and improved thermal transfer rates over time, improved access to the element and reduced resource requirements to perform maintenance on the item, an extra external layer of gold plating and reduced chemical reactivity, an extra external layer of corrosive resistant material and a reduced rate of oxidation reactions over time, and a polishing treatment on the outer surface of the at least one defensive item and reduced absorption of electromagnetic radiation. According to another embodiment, the scientific property of the defensive item is based on a textile material. The modification and the augmentation of the scientific property is selected from the list of: a new weave pattern and improved thermal transfer rates over time based on distance traveled, and a new polymer blend and reduced liquid absorption. According to another embodiment, the educational game includes a career profile of a STEM professional with an area of subject matter expertise. The modification and the augmentation of the scientific property is associated with the area of subject matter expertise of the career profile of the STEM professional.

According to an embodiment, the scientific property of the offensive item is based on an element from the periodic table of elements. According to another embodiment, the offensive item is based on a molecule formed by elements from the periodic table of elements. According to another embodiment, the offensive item and the scientific principle includes: a laser emitter and the Bohr model of the atom, liquid dispersing grenades and acid-base reactions, a flamethrower and oxidation-reduction reactions, an electro-magnetic pulse grenade and Maxwell's equations and Lorentz force laws, a rail gun and Faraday's laws of induction and the laws of classical mechanics, and electronic transmission devices and analog and digital circuit design. According to another embodiment, the educational game includes at least one modification to the offensive item. The modification augments the scientific property in accordance with real scientific principles. According to another embodiment, the scientific property of the offensive item is based on a gas from the periodic table of elements. The modification and the augmentation of the scientific property include: another gas with a higher atomic number and an increased maximum energy output, another gas with an increased number of available electron shells, a compressor that increases the pressure of the first gas in a fixed chamber and an increase of thrust when the first gas is released, and additional moles of the first gas and an increased maximum energy output. According to another embodiment, the educational game further comprises a career profile of a STEM professional with an area of subject matter expertise. The modification and the augmentation of the scientific property is associated with the area of subject matter expertise of the at least one career profile of the STEM professional. According to another embodiment, the scientific property of the offensive item is based on a classical mechanics of material properties. The modification and the augmentation of the scientific property includes: an increase in the mass of material and the increased maximum energy output, and an access to composite materials and increased structural properties. According to another embodiment, the educational game includes a career profile of a STEM professional with an area of subject matter expertise. The modification and the augmentation of the scientific property includes an increase in the mass of material and the increased structural properties.

According to a fifth invention, a computer system, method and educational game for educational assessment and reporting is provided. The computer system has a processor, and a non-transitory computer readable medium operatively connected to the processor and storing instructions including a learning management system software module. The learning management system software module receives student performance data from an educational game that is configured to teach a learning object and a game mechanism. The student performance data includes data for how a student performed on the learning object and on the game mechanism. The learning management system analyzes the student performance data for comprehension of the learning object and the game mechanism, and creates a report of the analysis of the student performance data.

According to an embodiment, the computer system includes a usage module that tracks when the educational game was utilized. The student performance data is analyzed based on the usage module, and the report is created to include data and insights from the usage module. According to another embodiment, the computer system includes a performance module that tracks how well the student performed on the game mechanism. The student performance data is analyzed based on the performance module, and the report is created to include data and insights from the performance module. According to another embodiment, the computer system includes an engagement module that tracks user behavior patterns of the student. The student performance data is analyzed based on the engagement module, and the report is created to include data and insights from the engagement module. According to another embodiment, the computer system, a gap analysis module that tracks patterns of competencies and deficiencies of the student with respect to the learning object and the game mechanism. The student performance data is analyzed based on the gap analysis module, and the report is created to include data and insights from the gap analysis module. According to another embodiment, the computer system a tutoring module that tracks patterns of requests for guidance by the student. The student performance data is analyzed based on the tutoring module, and the report is created to include data and insights from the at least one tutoring module. According to another embodiment, the computer system a concept mapping module that tracks how the student is progressing through the learning object and the game mechanism. The student performance data is analyzed based on the concept mapping module, and the report is created to include data and insights from the concept mapping module. According to another embodiment, the report is created to include data and insights about a learning style of the student. According to another embodiment, the report is created to include data and insights about a learning style of a class of students. According to another embodiment, the report is created to include data and insights about at risk indicators of the student. According to another embodiment, the the report is created to include data and insights about career interests of the student. According to another embodiment, the report is created to include data and insights about a play history of the educational game by the student. According to another embodiment, the report is created to include data and insights about a replay of the educational game by the student. According to another embodiment, the report is created to include a dynamic weather graphic that summarizes some of the data and insights about the student performance data of the student. According to another embodiment, the student is associated with a class of students, and the report is created to include data and insights about the student performance of the student and a relative performance of the student as compared to the class of students. According to another embodiment, the student is associated with a class of students, and the report is created to include data and insights about a learning style of the student and a relative learning style of the student as compared to the class of students. According to another embodiment, the student is associated with a class of students, and the report is created to include data and insights about at risk indicators of the student and a relative at risk indicator of the student as compared to the class of students.

According to a sixth invention, a method for creating a custom level of an educational game and an educational game is provided. The method uses a computer system having a processor and a non-transitory computer readable medium operatively connected to the processor and storing instructions. The method renders a level select menu having a customization option, receives a selection from the customization option of the level select menu, and generates a level of the educational game based on the selection from the customization option of the level select menu. An educational difficulty of the level is based on the selection from the customization option of the level select menu.

According to an embodiment, the customization options include curriculum difficulty and learning style. According to another embodiment, the method includes retrieving a user learning profile, and the level is generated based on the user learning profile. According to another embodiment, the educational difficulty of the level is based on the user learning profile. According to another embodiment, the customization option includes curriculum difficulty, level difficulty, and learning style. According to another embodiment, the customization option includes a list of subject matter domains including: physical sciences, chemistry, chemical engineering, physics, astronomy, mechanical engineering, electrical engineering, civil engineering, life sciences, biology, earth sciences, geology, atmospheric science, environmental engineering, industrial design, human factors engineering, industrial engineering, operations and supply chain, mathematics, and statistics. The selection of the customization option includes at least two selections from the list of subject matter domains. According to another embodiment, the customization option includes a list of modules of a subject matter domain, and the selection of the customization option includes at least two selections from the list of modules of the subject matter domain. According to another embodiment, the method validates an appropriateness of the level based on the user learning profile. The appropriateness of the level is validated using a technique including: scoring at least one learning object associated with the level, querying an achieved objective score for a plurality of other users similar to the user learning profile, and evaluating a simulated objective score for a machine learning proxy player. According to another embodiment, the customization options include level difficulty and mission format. According to another embodiment, the method receives a request for a custom level, retrieves a user learning profile that includes performance data including educational material competency, educational material mastery and learning style preferences, and generates a level of the educational game based on the user learning profile. The educational difficulty of the level is based on the user learning profile. According to another embodiment, the user learning profile is based on a prior play history of the educational game by a user associated with the user learning profile. According to another embodiment, the method renders a level select menu having a customization option, and receives a selection from the customization option of the level select menu. The level of the educational game is generated based on the selection from the customization option of the level select menu. According to another embodiment, an educational difficulty of the level is based on the selection from the customization option of the level select menu. According to another embodiment, the customization option includes curriculum difficulty, level difficulty, and learning style. According to another embodiment, the customization option includes a list of subject matter domains including: physical sciences, chemistry, chemical engineering, physics, astronomy, mechanical engineering, electrical engineering, computer engineering, civil engineering, life sciences, biology, earth sciences, geology, atmospheric science, environmental engineering, industrial design, human factors engineering, industrial engineering, operations and supply chain, computer science, mathematics, and statistics. The selection of the customization option includes at least two selections from the list of subject matter domains. According to another embodiment, the customization option includes a list of modules of a subject matter domain, and the selection of the customization option includes at least two selections from the list of modules of the subject matter domain. According to another embodiment, the method validates an appropriateness of the level based on the user learning profile. The appropriateness of the level is validated using a technique including: scoring at least one learning object associated with the level, querying an achieved objective score for a plurality of other users similar to the user learning profile, and evaluating a simulated objective score for a machine learning proxy player.

According to a seventh invention, a method of curating educational material of an educational game, a computer program and an educational game relating to the same are provided. The method uses a computer system having a processor and a non-transitory computer readable medium operatively connected to the processor and storing instructions. The method receives educational curriculum, segments the educational curriculum into learning objects, appends the plurality of learning objects with learning objectives data including learning style, incorporates the learning objects into an educational game, presents the educational game including the learning objects to a user, receives a user input relating to the educational game, evaluates user engagement with the plurality of learning objects in the educational game, assesses user performance based on an efficiency score achieved in the educational game, sequences the learning objects based on the user engagement and the user performance. The learning objects are presented to the user in the educational game based on the sequencing.

According to another embodiment, the method restricts access to the learning objects, whereby the learning objects cannot be viewed in the educational game, and grants access to the learning objects based on the user performance. According to another embodiment, the method replicates some of the learning objects, and translates those learning objects that were replicated into another learning style. According to another embodiment, the method prioritizes presentation of some of the learning objects based on user engagement and user performance. According to another embodiment, the method presents one of the learning objects based on the learning style of the learning objects. According to another embodiment, the method presents another learning objects based on the user input. According to another embodiment, the method updates the learning objectives data appended to the plurality of learning objects based on the user performance. According to another embodiment, the method updates the learning objectives data appended to the plurality of learning objects based on the user engagement. According to another embodiment, the method appends the learning objects with pedagogical objectives data. According to another embodiment, the method updates the pedagogical objectives data appended to the plurality of learning objects based on the user performance. According to another embodiment, the method updates pedagogical objectives data appended to the plurality of learning objects based on the user engagement. According to another embodiment, the method receives a narrative framework and a story element, integrates the narrative framework and the story element with the learning objects, receives user input relating to the narrative framework and the story element, and sequences the learning objects based the user inputs relating to the narrative framework and the story element.

BRIEF DESCRIPTION OF THE FIGURES

FIG. 31 is an illustration of an unlocked STEM professional profile of the achievements area of FIG. 30.

FIG. 37 is an illustration of a user interface for a class report of the teacher mode of FIG. 36.

FIG. 40 is an illustration of a user interface for an at risk class report for a class for the teacher mode of FIG. 36.

FIG. 43A is an illustration of a first aspect of a user interface of a custom lesson mode of the teacher mode of FIG. 36.

FIG. 44 is an illustration of a data structure of learning objects of the educational game.

DETAILED DESCRIPTION

Figure 1:
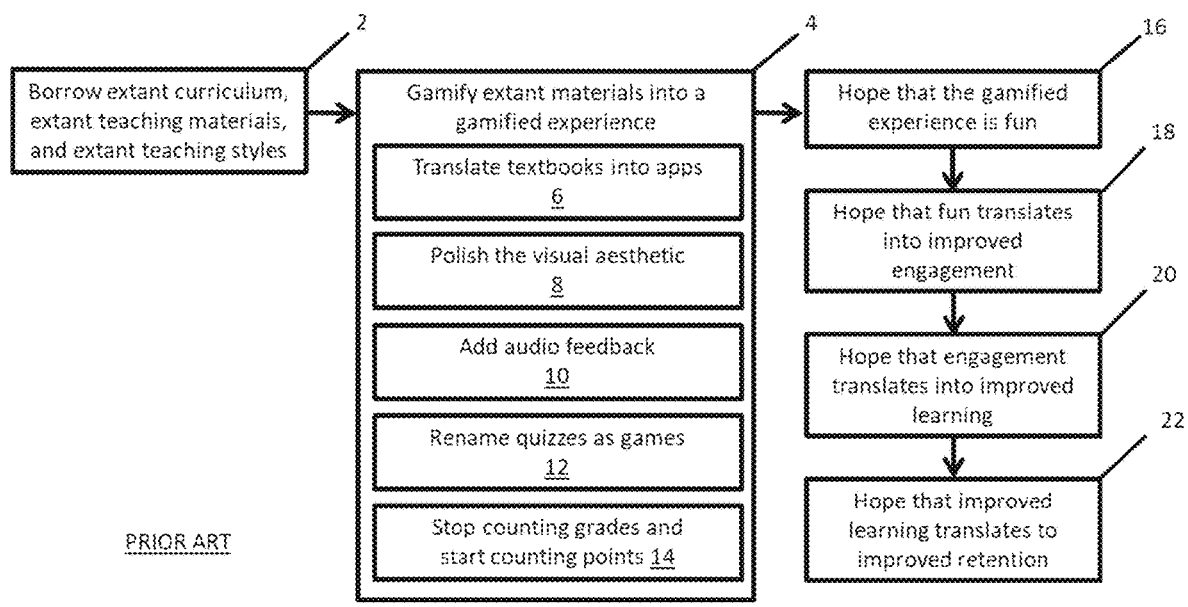
FIG. 1 is a flow diagram of a prior art method for gamifying educational materials.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

The present invention, as herein described, relates to a method and system for teaching curriculum as an educational game. It represents a holistic redesign of curriculum and the way that students (one type of user of the system) engages with the curriculum. It also represents a radical step forward in how a teacher (another type of user of the system) issues assignments and tracks student behavior and learning. In the process, the present invention addresses many of the needs of the current educational system.

Figure 2:
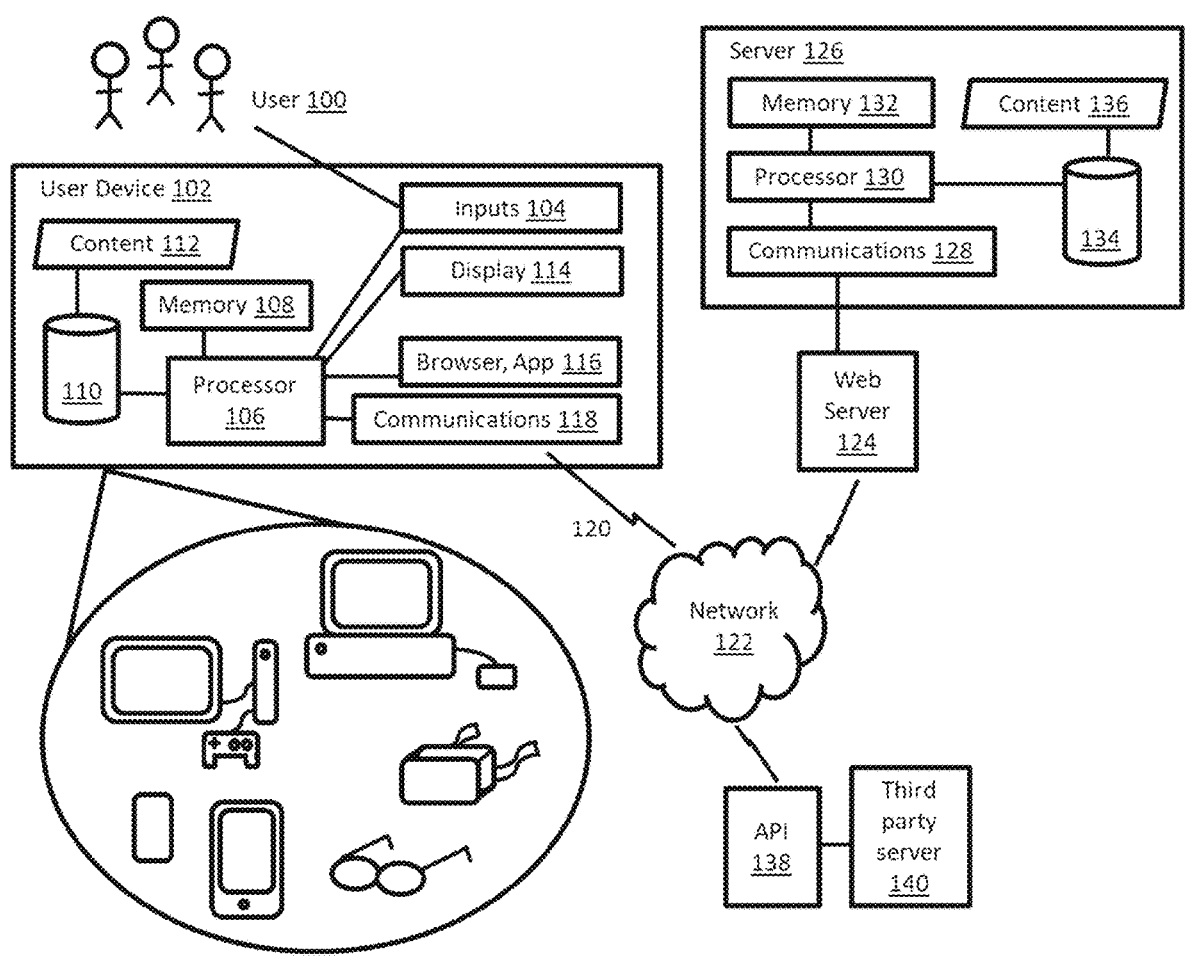
FIG. 2 is a block diagram of a networked computer system that is configurable to provide an educational game to users.

With reference to FIG. 2, an embodiment is implemented over a networked system of computers (frequently referred to as "the cloud"). For example, in one embodiment, the educational game is delivered via online services like Valve's Steam platform or via a WebGL portal in a browser, with connectivity to a centralized server for real-time updates, real-time tracking and comparisons of users, and improved performance of dynamically generated content. For the purpose of explaining when and how users interact with the computer system, the following description will generally describe the users as receiving or viewing digital content and making inputs on end points of the computer system. However, the end points of the computer system may be either active or dummy devices. The methods and systems described herein could also be implemented natively on a standalone computing device without impairing the functionality or experience.

As illustrated in FIG. 2, a user 100 interacts with a user device 102, which include traditional gaming devices (e.g., desktop/laptop computers and video game consoles), mobile devices (e.g., phones and tablets), and next-generation computing devices (e.g., virtual-reality goggles and augmented- or mixed-reality glasses). Each of these user devices 102 share a number of common hardware components that are operatively associated with one another (hereinafter referred to more simply as "connected" to one another), including: inputs 104 such as keyboards and touch screens that transmit user 100 actions to a processor 106; the processor 106 includes a plurality of CPUs, GPUs and other cores that run the various compute loads of the user devices 102; memory 108 that is connected to the processor 106 and temporarily stores compute states and other data; a data storage device 110 that is connected to the processor 106 and stores data including content 112, such as educational games, learning management systems and other applications, in a non-transitory manner; a display 114 that is connected to the processor 106 and presents the content 112, as processed, to the user 100; a browser or app 116 that is connected to the processor 106 and is increasingly being used as a light operating system compute environment for the content 112; and communications devices 118 that connect via transmissions 120 the processor 106 to the external networked environment, such as network 122. Network 122 connects the user devices 102 to a web server 124, which is an external facing layer of security and network management for a server 126. The server 126, like the user devices 102, has a number of common hardware components, including: a communications device 128 that connects the web server 124 to a processor 130; the processor 130 includes a plurality of CPUs, GPUs and other cores that run the various compute loads of the server 126; memory 132 is connected to the processor 130 and temporarily stores compute states and other data; and a data storage device 134 is connected to the processor 130 and stores content 136, such as educational games, learning management systems and other applications. The network 122 also connects the user devices 102 and the server 126, through an application program interface 138, to third party servers 140. The third party servers 140 provide useful data to the user devices 102 and the server 126, make use of the data from the user devices 102 and the server 126, and provide various services to the user devices 102 and the server 126.

Figure 3:
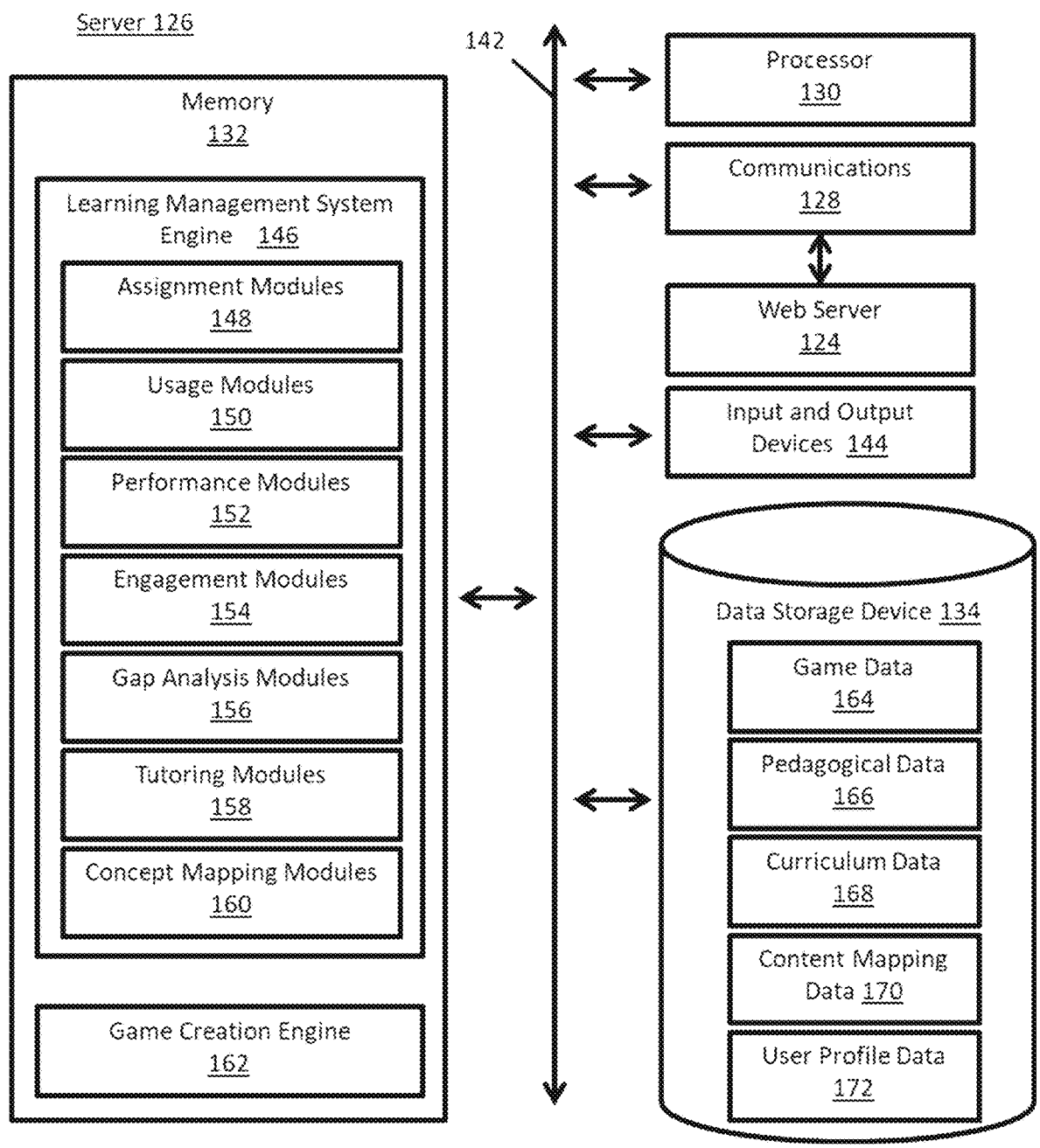
FIG. 3 is a block diagram of a server in the networked computer system of FIG. 2.

Referring now to FIG. 3, a detailed box diagram of the server 126 and dedicated subroutines and data structures of the server 126 is provided. As described above, the server 126 includes the processor 130, the memory 132, the data storage device 134 and the communications device 128 connected to the web server 124, all of which are operatively connected over a bus 142. The server 126 also includes input and output devices 144 connected via the bus 142 that allow for local interaction and control of the server 126.

Operating in the memory 132 is a learning management system engine 146 that includes several modules that operate upon the core data structure. The modules covertly observe user inputs and interactions and, using evidence-based analysis, manage the educational experience within the educational game and provide recommendations for out-of-game (e.g., in class) learning to the users.

Assignment modules 148 manage core data association tasks, like creating class profiles, categorizing classes by subject (e.g., allowing teachers to assign one class to Physical Sciences 1 and another to AP Chemistry), enrolling students in those classes, and updating student information like unique identifiers. The assignment modules 148 also track teacher issued assignments, issue notifications of new assignment availability, and send reminders of impending deadlines for assignments that have not been completed.

Usage modules 150 track the student-user from initial sign-up through final use of the system. This includes tracking whether the student read the notification of an issued assignment (e.g., if the notification was sent via email or SMS), whether the student activated and logged-in to the system since the notification, and whether the student attempted or completed the assignment. The usage modules 150 also track when the user is engaging with the system over the course of the school year. This includes the consistency of use with respect to the school year, the issuance of assignments, and the usage patterns of other students in the same class. This also includes granular tracking of the time of day and location where the user is engaging the system to detect abnormalities in usage patterns that may indicate the user is at risk of academic failure (e.g., as measured by end of the year exams).

Performance modules 152 assess user behavior and activities in-game. In short, the performance modules 152 track how well the user has played the educational game as a measure of learning progress, mastery and retention. This includes tracking actions that the user has taken, resources gathered and consumed in-game, as well as how those actions and resources translate into in-game accomplishments (e.g., satisfying win conditions) and effectiveness (referred to as "efficiency scores" in the educational game disclosed herein). This can be compared against ideal (minimum/maximum) performance for fixed or known games that are calculable, as well as best (minimum/maximum) performances for dynamically or procedurally generated content that are observable from crowdsourcing play of the game and from machine learning algorithms based on the same.

Engagement modules 154 assess the implications of observable user behaviors and activities in-game. For instance, the engagement modules 154 analyze clicks per minute, time spent on each screen, the breadth and depth of search within educational materials, patterns of discovery within the gameplay, and other observable interactions with the user device 102 (like eye tracking) as a measure of user engagement with the system. High and sustained rates of interaction over extended periods may indicate high engagement, fun and learning; whereas low or erratic rates of interaction with long-periods of break may indicate low engagement, distraction or frustration. The engagement modules 154 analyze user behavior to infer user satisfaction with and interest in the learning experience.

Gap analysis modules 156 also assess the implications of observable user behaviors and activities, but for the purpose of analyzing patterns of strengths, preferences and competence versus weaknesses, aversions and deficit. The gap analysis modules 156 analyze which levels the user plays and how many times, which educational materials the user consumes at which times, and whether the user leans on their strengths (or away from their weaknesses) when given the choice. This results in an indication of which subject matter the student is drawn to (e.g., genetics over electro-magnetism), what aspects of that material they find most interesting (e.g., historical figures and landmark discoveries over simulations) or useful (e.g., equations over explanations), as well as the user's learning style preferences (e.g., visual and action-based over auditory and logical learning). Combined, the outputs of the gap analysis modules 156 provide very useful information to the user and the teacher about how to build a relationship with the user, how to connect the user with the curriculum, and how the user learns—all of which may have effects beyond the scope of the educational game and associated curriculum.

Tutoring modules 158 assess user behavior, performance and preference with respect to intervention for motivation, stretch goals, minor assistance, and remediation. There is a natural cycle or undulation of cognitive intensity that users can sustain during educational games. Too much intensity can lead to burn out and low understanding, and too little intensity can lead to disengagement and distraction. Similarly, users can get stuck when they lose their bearings or have difficulty with a concept. The tutoring modules 158 are configured to nudge the user to prevent the user from burning out, over-exerting, disengaging or stagnating based on how quickly the user can be introduced to new concepts, how long the user needs to digest those concepts, how quickly the user can be given opportunities to utilize those concepts, and, then, how long the user needs to use that knowledge to achieve mastery. The tutoring modules 158 are configured to intervene passively in-game through narrative and character-driven game dialog and infrequently used animations, which can add some novelty to play in order to sustain a user for a brief time. The tutoring modules 158 are configured to intervene actively in-game through the issuance of side quests, which may provide a longer break to sustain a user over a longer learning session. The tutoring module 158 is also configured to intervene through notifications and the unlocking of new educational materials, which draws the user toward more learning content. Regarding motivation, the tutoring modules 158 are configured to issue notifications and incentives to the user to keep the user engaged through a cycle of learning. Regarding stretch goals, the tutoring modules 158 also look for opportunities to interject secondary or supplementary content. Regarding minor assistance, the tutoring modules 158 provide hints or reminders about concepts if the user's performance is chaotic (e.g., showing low levels of mastery) or the user expresses frustration (e.g., through erratic clicking and darting around through the educational materials). Regarding remediation, the tutoring modules 158 are configured to direct the user to additional materials, such as educational materials in alternative learning styles, to promote learning or encourage the user to repeat previously attempted levels in order to refresh their memory or improve mastery of foundational concepts.

Concept mapping modules 160 assess user behavior, performance and preference (e.g., strengths vs. weaknesses) with respect to the focal curriculum. The concept mapping modules 160 analyze the user's progress through the game, retention of leanings, and sequences of use and learning. This provides an indication of how the user takes ownership over the learning process, whether they are motivated by completion (e.g., one linear path through the game) or mastery (e.g., iterative deep-dives to achieve maximum efficiency scores and unlock all educational materials and achievements), and the pace at which the user is learning new learning objects. The concept mapping modules 160 provide an abstracted view of the user's behavior that may be more human-scale and actionable with respect to the curriculum (e.g., as opposed to clicks-per-minute during a particular level of the game) and, thus, provides meaningful input to teachers, parents and other guides in the student's educational journey.

Also operating in the memory 132 is a game-creation engine 162 that requests game assets and educational materials from the data storage device 134 and assembles the game assets and the educational materials into game content in response to the current state of the learning management system engine 146 and user input. The game creation engine 162 requests and loads pre-configured interfaces, levels and curriculum, as well as dynamically assembles procedurally generated levels and hyper-structured curriculum. The hyper-structured curriculum and associated learning is a data structure of learning objects (e.g., finite and readily digestible lessons from an educational curriculum that are presented in sets for different learning styles and categorized via an extensive set of pedagogical categories, learning objective categories that are tiered by difficulty and sequenced across domain disciplines) and game elements (e.g., in game avatars, terrain features, interactive objects and the like that are also structured and categorized based on the underlying learning content of the elements).

The hyper-structured curriculum is different from "scaffolded learning." Scaffolded learning refers to teacher intervention (e.g., human-based) to support individual learners through complex or difficult tasks using a variety of disjointed remediation techniques that take the student out of the flow or context of the focal task. By contrast, the educational game described herein has hyper-structured curriculum that is a lattice of modular and dynamically reconfigurable learning objects that are teachable within a consistent framework, with a consistent context and purpose, and selectable based on the user's readiness.

The data storage device 134 contains a variety of data used in association with the educational game. For example, the data storage device 134 contains game data 164 that includes all of the software elements to render and present a video game on the user device 102. The game data 164 includes: player characters or avatars, alternative character skins, non-player character models or avatars, level maps, terrain features and environment objects, other 2D graphics and 3D models, animations, textures, lighting and effects, algorithms, physics engine, and all of the typical utilities and game engine-provided functions (e.g., frame rate controls, resolution controls, etc.) of a modern video game. The game data 164 also includes a narrative framework and story elements with hyper-structured dialog that is designed for repeat and evolving replay of the same game content (i.e., with dynamic rendering of hyper-structured curriculum).

The data storage device 134 contains pedagogical data 166 that includes the structure and associated evaluative criteria of learning objectives and learning styles used to categorize the learning objects. The learning objectives categorize and weight learning objects based on topics like: broad context within the overarching curriculum taxonomy, individual subject matter concepts, concept definitions, concept equations, example problems, example calculations, inquiry-based design, action-based decision making of when and how to deploy learning objects, industry trends and information, real world product examples, career trends and information, social meaning or impact of the concept in the world, and so on. The learning styles categorize and weight learning objects based on topics like: visual leaning, auditory learning, practice or action-based learning, social learning, and mixed-media learning. The pedagogical data 166 provides the digital learning framework to the educational game and the learning management system 146.

The data storage device 134 contains curriculum data 168 that includes raw and processed educational materials of traditional textbooks, in class presentations, discussion prompts, laboratory experiments, and problem sets, tests and quizzes. The educational materials have been processed and configured for digital presentation in accordance with a wiki-like format but has also been modularized and replicated for multiple learning objectives and multiple learning styles. For example, the curriculum data 168 is segmented, differentiated and categorized based on the learning objective from the pedagogy module 166. In addition, the curriculum data 168 is segmented, analyzed and categorized based on the learning style of the pedagogy modules 166. A single learning object may have a plurality of entries that are differently weighted for their ability to accomplish a given learning objective based on the learning styles present, such as: text and terminology definitions for visual learning, audio files of the same or similar text for auditory learning, charts and equations for logical learning, simulations for kinesthetic or action-based learning, videos of experts discussing the topic in the context of its real-world relevance to the user for social learning, and mixed-media experiences for multi-modal learning. The curriculum data 168 also includes rights access controls and user preference driven algorithms to selectively reveal data to users.

The data storage device 134 contains content mapping data 170 that associates the game data 164, the pedagogical data 166 and the curriculum data 168. For example, the content mapping data 170 associates a videos and other educational materials on environmental damage and pollution with level maps that are transitioning from forests and wild environments to industrialized maps with power generating equipment and pollution in order to teach the broad context of industrialization from the Age of Exploration through the Industrial revolution and up to today along with lessons about unifying concepts of science, like energy. This mapping and association creates a cohesive, thematically resonant presentation of educational curriculum that transcends the traditional presentation of concepts by embedding significant amounts of information and context in the artistic style, game elements and the story of the educational game. As another example, the content mapping data 170 associates videos of lava flows, coal mine fires and internal combustion engine operations (e.g., visual learning from the pedagogical data 166) with level maps that feature natural gas mining rigs and combustible terrain and game elements (game data 164) in order to teach chemistry curriculum regarding combustion and thermodynamics (curriculum data 168). As another example, the content mapping data 170 associates multi-path or segmented level maps (game data 164) with action-based learning styles (pedagogical data 166) to teach project management and systems thinking curriculum (curriculum data 168). Using these associations, the game creation engine 162 is configured to procedurally generate a thematically sound, visually and auditorily resonant, and educationally relevant game experience for a given learning object of educational curriculum. Procedural generation is an algorithmic process that facilitates dynamic level generation and obviates the manually intensive task of human-created game and level creation. In one embodiment, the educational game is generated procedurally based on pedagogical objectives and learning objectives associated with game element meta-data. As a result, the educational game can be request based on the specification of certain learning objects and educational modules (e.g., rather than merely by game level in the traditional games).

The data storage device 134 also includes user profile data 172, which is individual user specific records generated by the learning management system engine 146. For example, the user profile data 172 records the user's available (e.g., purchased or licensed) content and game access rights, the user's association with schools, teachers and classes, the user's assigned levels and challenges (e.g., from the assignment modules 148), the user's progression through the educational game (e.g., from the usage modules 150), the user's efficiency scores during that progression (e.g., from the performance modules 152), the user's patterns of engagement (e.g., from the engagement modules 154), the user's strengths and weaknesses (e.g., from the gap analysis modules 156), the user's reactions to hints and other assistance (e.g., from the tutoring modules 158), and the overall assessment of the user's progression through the concepts and curriculum of the educational game (e.g., from the concept mapping modules 160). The user profile data 172 is persistent, secure in accordance with the relevant regulations and standards (e.g., US's Federal Educational Rights and Privacy Act (FERPA), EU's General Data Protection Regulation (GDPR), etc.), and accessible through an API to enable integrated reporting to the educational system of record (e.g., a learning management system, or LMS) of the school district.

Figure 4:
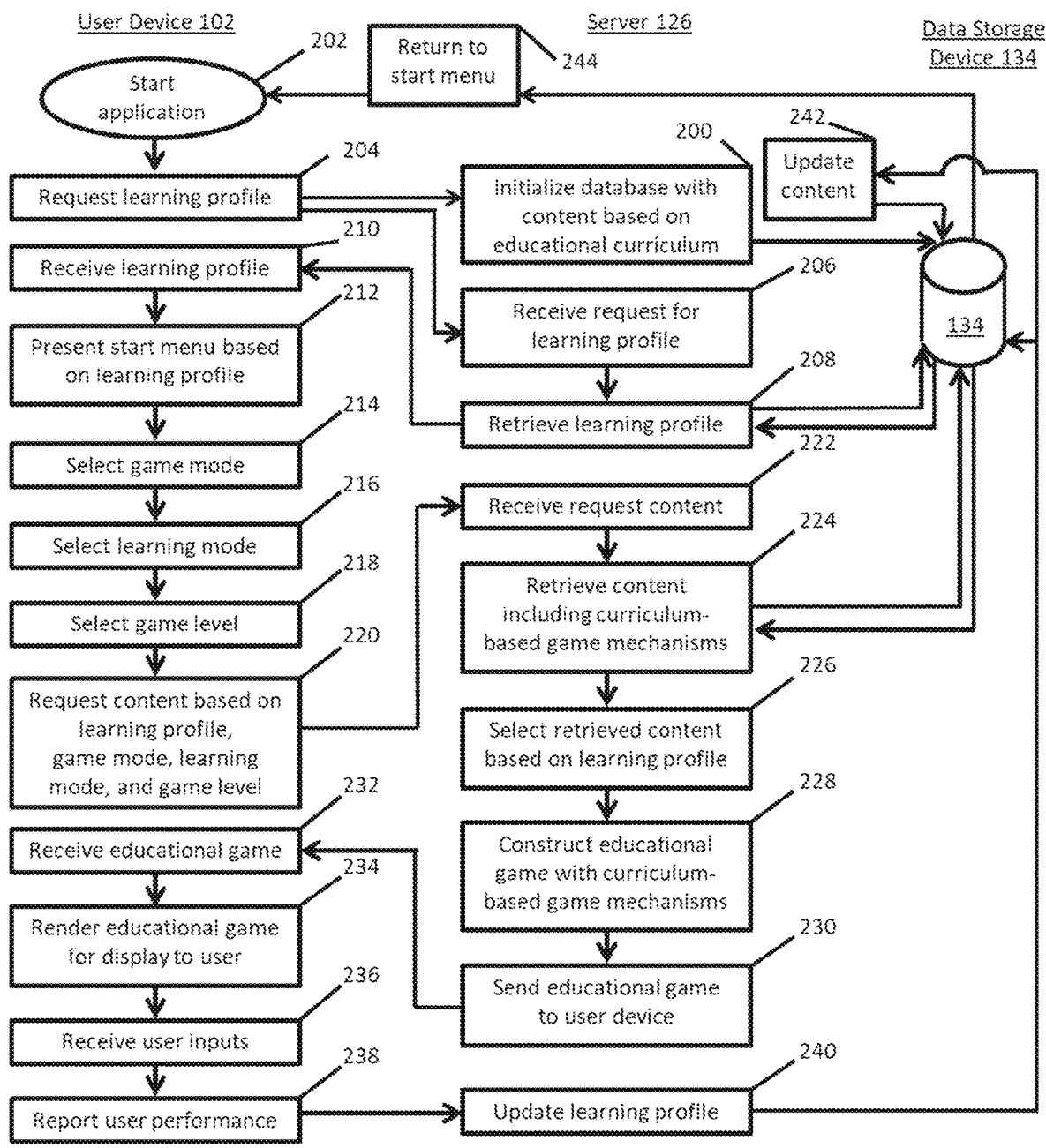
FIG. 4 is a flow diagram of a method of teaching curriculum using an educational game, as implemented on the networked computer system of FIG. 2.

Referring now to FIG. 4, a method of teaching curriculum using an educational game is illustrated. The method is performed using the systems shown in FIG. 2 and FIG. 3, including steps performed on (or activated by inputs from) the user device 102, the server 126 and the data storage device 134. It will be appreciated that prior to deploying the method, the system has been connected, initialized, and all required software has been installed and updated. For instance, the data storage device 134 has been initialized with content based on educational curriculum 200 such as an educational game.

The method starts with the user starting the application 202 for the educational game on their user device 102. Upon startup, the educational game on the user device 102 requests a learning profile 204 from the server 126 if the user has signed-in from the user device 102 before; otherwise, the educational game will prompt the user to create an account and sign in and, then, make the request for the learning profile 204. Once the server 126 receives the request for the learning profile 206, the server 126 retrieves the learning profile 208 from the data storage device 134. This process confirms that the user has an active account with the appropriate rights access and permissions, checks for fraud or duplicate active accounts, and so on. Then, the learning profile is transmitted back to the user device 102, which receives the learning profile 210.

Next, the user device 102 presents a start menu based on the learning profile 212. To simplify the interface and efficiently guide users to appropriate content, the start menu is configured to guide users to their next educational experience. To illustrate this with a few examples, the first time the user logs-in, the user will only be presented with one game-mode option (plus an option to access settings) to reduce confusion while the user becomes accustomed to the interface. If the user's teacher issued an assignment, a pop-up notification or alert regarding the assignment will be clearly displayed to guide the user to the assignment. If the user has not logged-in for several weeks, a pop-up notification will encourage the user to replay the last level or module to refresh the user's memory and promote retention. And, if the user has completed all of the available content, a pop-up notification will encourage the user to attempt a simulation that crosscuts multiple topics about which the user has room to improve. The user can either click-on and follow the recommendations of the notification or make selections from the start menu as the user chooses.

If the user chooses to make their own selections, the user selects a game mode 214 from the start menu presented on the user device 102. The game mode includes multiple game play options, including: a story mode for the core game play experience; a puzzle mode for expert play that challenges the user's mastery of the educational curriculum and the game play of the educational game; and a simulation mode that enables the user to create a customizable game play experience that cross-cuts subject matter from any curriculum.

Then, the user selects a learning mode 216 from the start menu presented on the user device 102. The selected learning mode indicates the user's desired complexity level of the educational materials, for example, ranging from simple concept-only learning objects and challenges to complex decision-driven and computationally intensive problem solving.

Then, the user selects a game level 218 to experience. The game level indicates the user's desired episode of the story mode and the desired level within that episode, a puzzle challenge from the puzzle mode, or a customizable level of the simulation mode. The episodes are groupings of several levels (e.g., 10 levels) that are thematically centered around the same grand challenge topic and related subject matter knowledge. The levels of an episode are presented with aesthetically resonant game elements for the associated grand challenge topic and related subject matter knowledge.

For example, an episode includes 10 levels that are focused on tackling pollution and toxic waste in the environment. The 10 levels have level maps of various degrees of contamination and waste in a natural environment with trees and streams. In each level, the user controls player characters to defeat the enemy element and, in so doing, undo the pollution and harm caused. The episode highlights tradeoffs between traditional dirty technologies utilized by the enemy elements and the cleantech or Greentech options utilized by the player characters. The weapon and armor elements that utilize dirty vs. clean tech feature game mechanisms and in-game tradeoffs based on real science principles. The user can command player characters to convert enemy weapons and enemy armor into player character-useable gear, but this will require some modifications or conversions to mitigate the environmental harm of the enemy items. And the user can convert power nodes in-game that represent dirty tech options (e.g., a coal powered generator) into a clean(er) tech option (e.g., by adding air scrubbers to reduce sulfur dioxide emissions, or, better yet, replacing the generator with solar panels) to learn about how existing and future technologies work, while comparing the relative efficacies and environmental impacts of each. In some instances, the enemy's dirty tech may be more powerful, but the dirty tech comes with negative externalities. In other instances, the player's clean tech is both more powerful and has fewer negative externalities. The episode also highlights tradeoffs between scientific knowledge, technology and economic factors, like cost, by simulating real world resource constraints through the player item progression and upgrade system. The tradeoffs and contrasts presented throughout the episode is well suited to present and convey educational materials regarding the grand challenge of pollution, the difficult tradeoffs between dirty and clean tech, and the myriad number of other tradeoffs that face science and technology and the society within which they occur.

Once the user selections are made and locked-in, the user device 102 requests content based on the learning profile, the game mode, the learning mode and the game level 220 from the server 126. The server 126 receives the request for content 222 from the user device 102, and retrieves the content including curriculum-based game mechanisms 224 from the data storage device 134.

The server 126 selects the retrieved content based on the learning profile 226 of the user. The selection process dynamically and procedurally customizes the experience for the user in order to prevent the user from being able to skirt by through rote memorization alone and create opportunities to incrementally improve the user's breadth and depth of knowledge.

The server 126 constructs, builds, or generates an educational game with curriculum-based game mechanisms 228 based on the selections. The server 126 then sends the educational game to the user device 230, and the user device 102 receives the educational game 232. The user device 102 renders the educational game for display to the user 234. In other embodiments, the game may be run and/or rendered directly from the server 126 or other cloud-based resource (e.g., accessible via a web browser or mobile application). As the user plays the game, the user device 102 receives user inputs 236 and updates the educational game as the game play unfolds. The user inputs are the collective user interactions with the user device 102 during play of the educational game. The user inputs represent the user's intended in-game actions that influence the user's performance and efficiency score. The user inputs also represent the user's interactions with the interface and educational materials of the educational game.

Once the educational game is completed, the user device 102 reports the user performance 238 to the server 126. The server 126 updates the learning profile 240 of the user based on the reported user performance and saves the update in the user storage device 134. The server 126 also updates content 242 stored in the user storage device 134. For example, if the educational game presented a set of learning objects to the user and the user performed well, then an inference is made that the set of learning objects are effective and the learning objects are up-weighted in the database so that future users (or, preferably, only segments of those users) are more likely to see the set of learning objects. In contrast, if the user performs poorly, then the set of learning objects may not be effective and are down-weighted in the database so that future users (or, preferably, only segments of those users) are less likely to be presented with the same learning objects. Once the updates are complete, the server 126 signals the user device 102 and the user device 102 returns to the start menu 244.

According to the above-described method, the curriculum-based game mechanisms incorporate real scientific principles with simulation-level accuracy and authentic presentations of the learning objects into the game mechanics of the educational game. The curriculum is not merely presented and, later, tested. Instead, the curriculum is graphically and functionally integrated into the available actions of the player characters via game mechanisms that integrate learning with the game mechanics and game play of the educational game. As the user plays the educational game, the user leverages their knowledge of the learning objects in a predominantly action-based setting, which promotes repetition, experimentation and deep learning. The educational game shows pairings of macro- and micro-process (or nano- or quantum-, as relevant) and juxtaposes multiple science standards against one another, simultaneously, enabling the user to learn the entire system and gain an intuitive understanding of the relative effects of different scientific principles. For example, one game mechanism is the use of an electro-magnetic radiation gadget (e.g., a laser emitter) that works based on the principles of the Bohr model of the atom and how lasers interact with the electro-magnetic and thermal properties of metal armor. Thus, the game mechanism spans scales, including: quantum level interactions of photons and electrons within the laser, and macro level interactions of energy transfer and thermal heating and cooling. On the back-end, the user is covertly assessed for their completion, competence and mastery of the learning objects. The story-driven narrative framework of a rich game experience also allows for the observation and testing of the user's beliefs and values concerning the educational materials, an otherwise difficult concept to teach, measure and test. Therefore, the educational game described herein couples the learning objects to the game play, creating a novel pedagogical approach to teaching.

Figure 5:
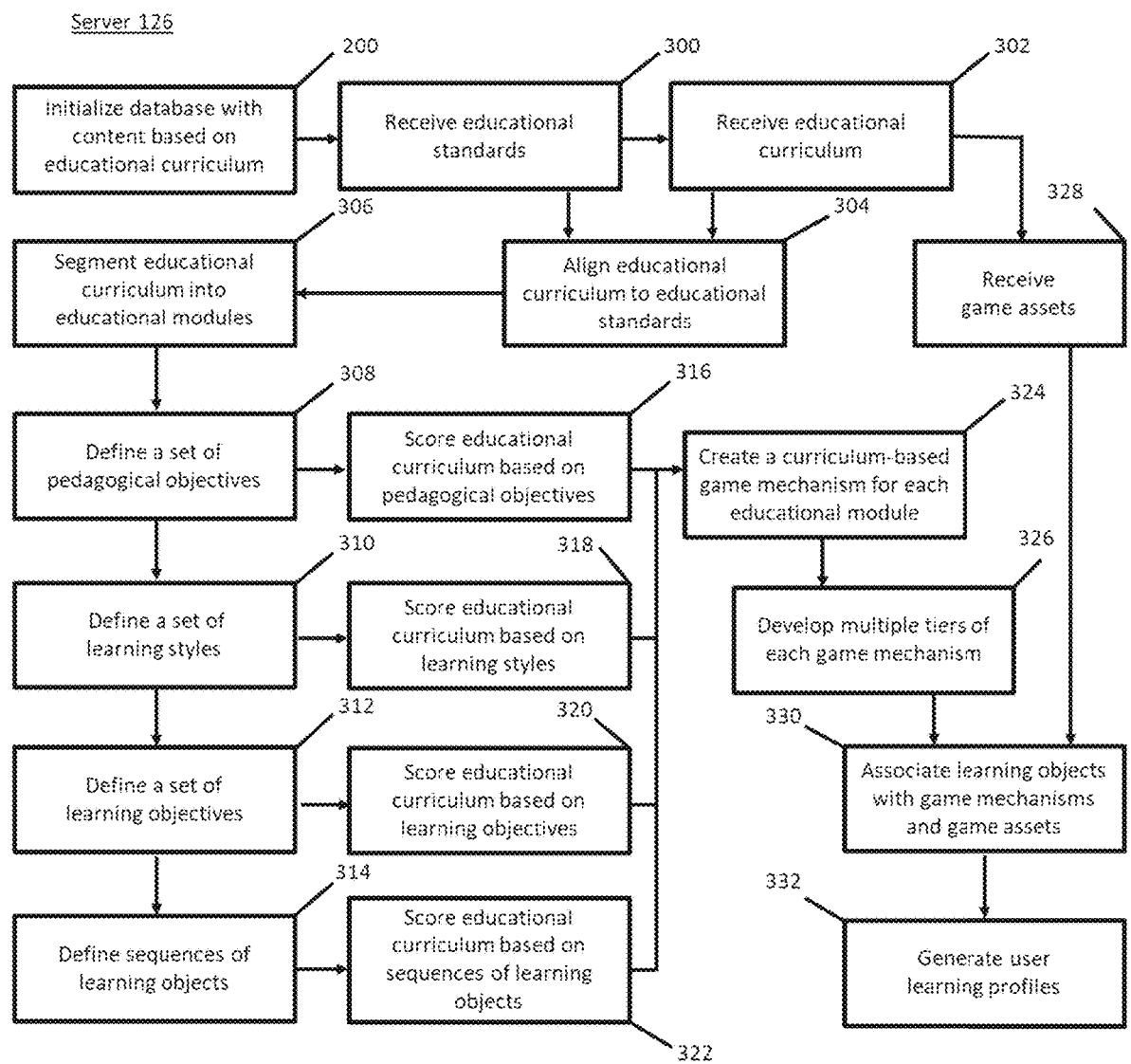
FIG. 5 is a flow diagram of a method of creating educational materials including game mechanisms based on educational curriculum for the educational game.

Referring now to FIG. 5, a method of creating educational materials including game mechanisms based on educational curriculum for the educational game is illustrated. The method extrapolates the step of initializing a database with content based on educational curriculum 200 from the method shown in FIG. 4, and, similarly, is performed using the server 126.

According to the method of FIG. 5, the server 126 receives educational standards 300, for example, from the Department of Education, state-level departments, or other institutions and standards groups (e.g., Achieve.org is responsible for coordinating the creation, roll-out and adoption of the Next Gen Science Standards). In the heterogeneous educational environment of the 50 States, each state also has its own standards for STEM classes across the K-12 curriculum. As a result, standards like the Next Gen Science Standards are a critical framework for unifying and harmonizing common educational expectations and curriculum. Standards represent the best starting place from which to review and organize educational materials into learning objects.

The server 126 receives educational curriculum 302. The educational curriculum for a given subject includes: course syllabi; textbooks; news articles; classroom presentations; laboratory experiments; simulations; videos and mixed-media presentations of the focal subject matter (e.g., videos from corporate and academic STEM professionals and experts); tests, quizzes, and end of the year exams (e.g., Common Core, SAT and AP exams); historical context, such as landmark breakthroughs in science, seminal inventions that brought the technology to market, and the famous figures; social context, such as the role and importance of the topic in society, current political debates and challenges, the operation of bureaucratic processes in limiting available options and constraining behavior, and the impact that future progress may have on the same; industry context, such as industry trends, leading companies, and product information; and career context, such as roles and responsibilities, titles and progression, salaries and recent employment rates, and personal anecdotes of individual's experiences.

The server 126 aligns the educational curriculum to the educational standards 304. In one embodiment, the educational curriculum is coded to identify how the educational curriculum embodies, addresses and informs various educational standards.

The server 126 then segments the educational curriculum into educational modules 306. The educational modules represent the critical portions of the educational curriculum that are both necessary and sufficient to address the educational standards. Thus, the step of segmenting the educational curriculum involves identifying the most critical educational content and making that educational content central to the user interaction with the educational game. All of the educational curriculum is retained, but the educational modules receive additional processing and treatment as described below.

Next, the server 126 defines a set of pedagogical objectives 308, defines a set of learning styles 310, defines a set of learning objectives 312, and defines a sequence of learning objects 314, which will be described in turn.

Figure 6:
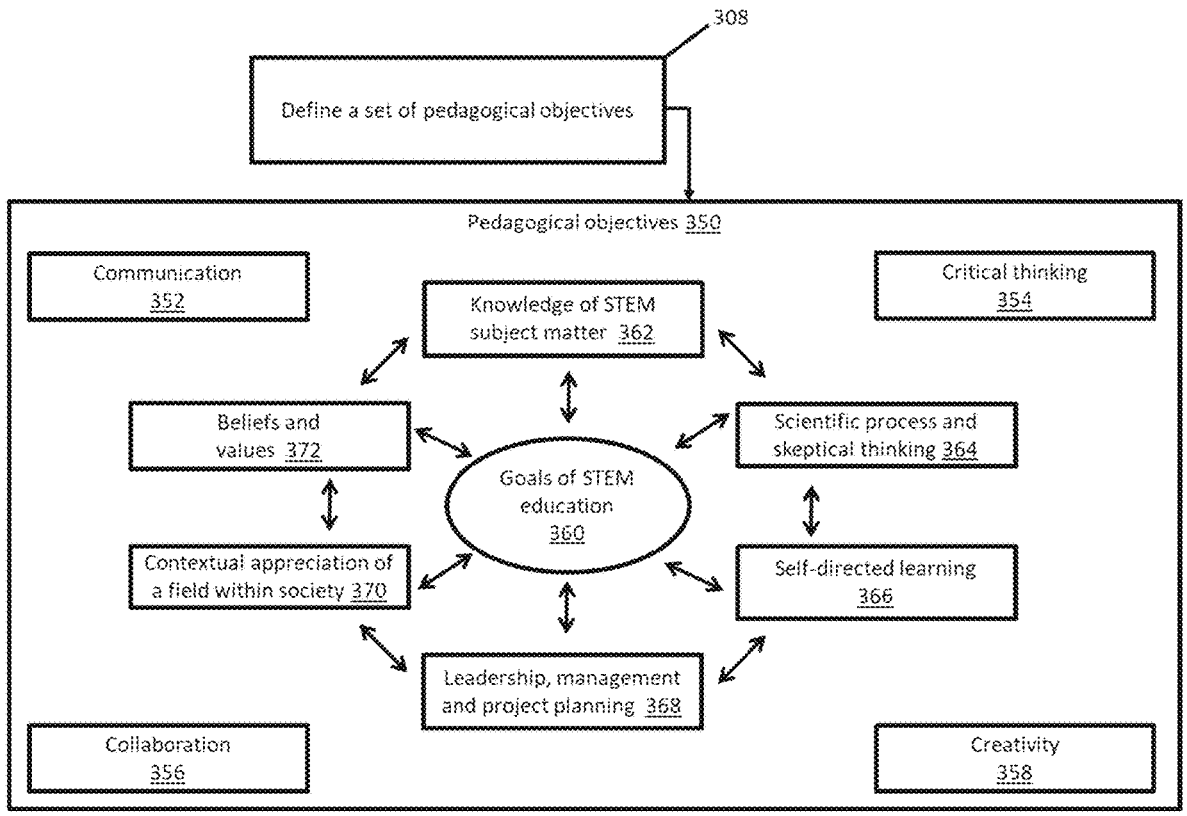
FIG. 6 is a block diagram of the step of defining a set of pedagogical objectives for the method of FIG. 5.

As shown in FIG. 6, pedagogical objectives 350 are a set of abstracted goals or learning outcomes that users should achieve from the educational experience with an emphasis on "why" the user should achieve those goals. There are four generic pedagogical objectives 350 that are guiding much of curriculum design, today, which include: communication 352, critical thinking 354, collaboration 356 and creativity 358 skill development (also known as the "4Cs"). Communication 352 skills relate to basic reading, writing, oral and listening skills. Critical thinking 354 skills start with fundamental questions of epistemology and extend through observation, analysis, interpretation, reflection, evaluation, inference, explanation, problem solving and, ultimately, decision making. Collaboration 356 skills relate to interpersonal association and teamwork, as well as understanding of the inherently social and political process of communication and critical thinking. Lastly, creativity 358 skills relate to how and where to find inspiration to explore new problems and develop new solutions, and, in the processes, instill a sense of wonder and discovery into learning.

In the context of STEM education, there are several additional, more discrete and actionable goals of STEM education 360, including: knowledge of STEM subject matter 362, scientific process and skeptical thinking 364, self-directed learning 366, leadership, management and project planning, 368, contextual appreciation of a field and its role in society 370, and beliefs and values 372.

Foremost in traditional educational focus has been knowledge of STEM subject matter 362. Knowledge of STEM subject matter 363 relates to the foundational understanding of the state of the art of scientific thinking, the taxonomy of fields and theories, a working vocabulary of key terms and measures, and the core concepts and mathematical formulae for each domain. Traditionally, knowledge of STEM subject matter 363 has been taught one discipline at a time, with little emphasis or opportunity for effective cross-cutting of concepts.

Recently, STEM education has increased focus on the scientific process and skeptical thinking 364. Knowledge of the scientific process and skeptical thinking 364 relates to the understanding of how scientific knowledge is accumulated and tested, and why citizens of the modern world and members of the scientific community, in particular, need to be cautious consumers of new discoveries, bold claims, and most mainstream media presentations of empirical data. While this broad knowledge of STEM and the scientific process is clearly an important prerequisite for pursuing a STEM career, it may fade in significance and from memory of students—which is where the other goals of STEM education 360 may be more important. Yet, they are often overlooked by traditional STEM curriculum and in the traditional in class presentation format.

Another goal of STEM education 360 is teaching students the motivation, discipline and process behind self-directed learning 366. Self-directed learning 366 starts with self-awareness and humility. To acquire new knowledge, students need to engage in self-reflection to understanding what they know and what they do not know, what their strengths are and what their weaknesses are, how they learn effectively and how they struggle to learn, and so on. Self-directed learning 366 also relies upon knowledge of where and how to look for resources and assistance. This may seem trite in a post-Internet world where the collective knowledge of humanity is only a few clicks away. However, the vast majority of instances of real need that a student-user will encounter in their lives will require broader, deeper or more tacit knowledge than is available in most online resources. Much of the valuable knowledge that they will need will be held by friends, coworkers, and experts who each need to be approached differently to secure their support and cooperation. This is a central skill and knowledge set that all students and, in particularly, STEM students need to learn. In addition, students need to learn how to motivate themselves and be disciplined in their pursuits to develop deep expertise and valuable skills. Self-directed learning 366 is conveyed, for example, through story-driven motivations and problem-based learning or inquiry that sparks an initial interest and confidence in the student, while withholding enough of the answer to set the student down a path of exploration.

One additional goal of STEM education 360 is developing leadership, management and project planning 368 skills. The broad objective of collaboration 356 is valid and useable for small projects. Even through PhD programs, students are likely to work on fairly small-scale projects with finite teams. However, in the modern economy, STEM projects can be massive endeavors that involve thousands of researchers, scientists, engineers and mathematicians, decades of collaboration, and span dozens of national borders—like the Large Hadron Collider in Lucerne, Switzerland and the Hong Kong-Zhuhai-Macau Bridge in the Pearl River Delta in China. Accordingly, an effective STEM education should instill a refined appreciation for the distinctions between leadership and management. An effective STEM education should also teach students more sophisticated project planning and systems thinking skills than the basic scientific method (e.g., construct a hypothesis, design an experiment, collect data, analyze the data, draw conclusions, accept or reject the hypothesis, communicate results). For instance, real-world projects have a multitude of tasks, a complex set of interdependencies of those tasks, and a shifting set of external constraints and influences. Leadership, management and project planning 368 skills are conveyed, for example, through character-driven story elements, presentation of organizational management best practices, and in-game decision making that has real consequences on game play.

Another goal of STEM education 360 is conveying contextual appreciation of a field and its role within society 370. In the slower moving economic era of the past, it was barely enough to learn what a given theory is and how to calculate an estimated value of some key measure. However, in today's frenetic technological environment with an increased focus on sustainability and holistic design thinking, students need to be increasingly aware of and designing for complex adaptive systems. This starts with gaining a broad perspective on the history of science and technology. Students should then learn how technology has helped solve some of the biggest challenges that faced mankind, like starvation, disease and poverty, and how technology has also created new problems, like climate change and systems that perpetuate structural racism. Students should learn how they and their career choices fit into this complex mix by learning contextual appreciation of a field and its role in society 370.

Another goal of STEM education 360 is to learn the beliefs and values 372 that naturally flow from the other pedagogical objectives 350. In a way, beliefs and values 372 represent the emotional signature of the proper combination of the other pedagogical objectives 350. Beliefs and values 372 are taught through story- and character-driven empathy, ethically-motivated critical thinking, and the pursuit of best practices that have been normalized and socialized. Students that learn beliefs and values 372 will have the wherewithal to make great things happen from their STEM education.

Figure 7:
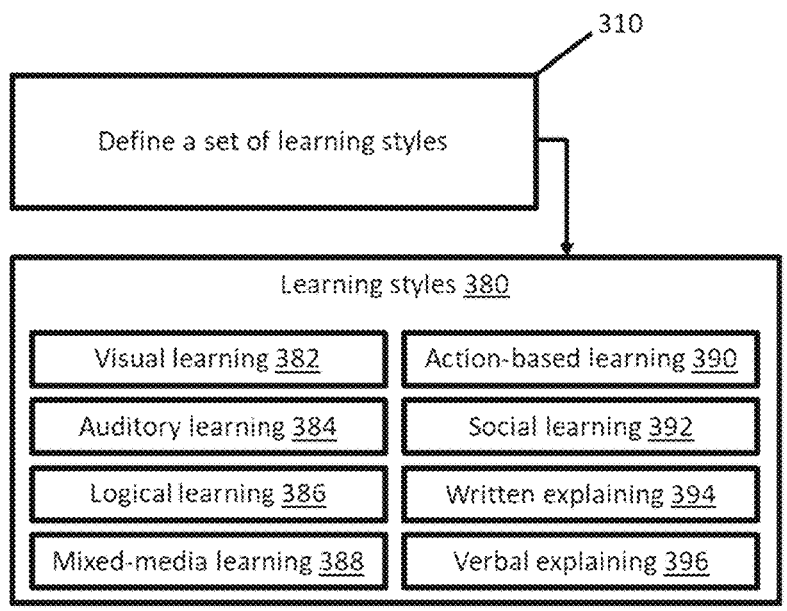
FIG. 7 is a block diagram of the step of defining a set of learning styles for the method of FIG. 5.

Referring back to FIG. 5, the server 126 defines a set of learning styles 310. As shown in FIG. 7, the learning styles 380 are different modes of conveying and learning knowledge, which address the "how" of learning. Each student learns differently. Each student has different strengths, weaknesses and preferences that cause the user to learn more quickly from some modes than others. Based on the inherent association of some knowledge with certain modes, students may learn certain material more quickly than classmates. There are many different learning styles 380 and, as described herein, educational curriculum are organized and categorized along multiple dimensions of learning styles. The learning styles 380 may include, for example: visual learning 382, auditory learning 384, logical learning 386, mixed-media learning 388, action-based learning 390, social learning 392, written explaining 394, and verbal explaining 396.

Visual learning 382 is quite simply the teaching and learning from text and graphical presentations of material. Educational materials that are predominantly text-based, like definitions or long-form explanations, as well as graphics, including 2D and 3D illustrations of spatial relationships and forms, are likely to be effective for students who are visual learners. Visual learning 382 has been the dominant mode of academic learning for several hundred years because of the persistence or durability of books as the main means of capturing and disseminating knowledge over great distances, over time and at a low cost. Students who wish to pursue lengthy careers in academia are likely to demonstrate strong visual learning 382 preferences and ability. However, not all students learn well from visual (e.g., text-heavy or image-centric) presentation of materials. For example, as much as 15% of the global population is estimated to be dyslexic. Students with dyslexia are likely to struggle with visual learning and, as a result, they make up an estimated 80% of remedial education programs. Other modes of teaching and learning are often required for these students.

Auditory learning 384 is the teaching and learning from verbal communication, whether listening to a teacher in a classroom, music, or other sounds. Audio learning 384 is a staple of formal education because of verbal communication's central role in human interactions. Auditory learning 384 relies on sounds, rhythm, and other musical and linguistic elements, as well as mnemonics and acrostics to convey and entrench its message in memory. Auditory materials also invoke strong emotional reactions and command attention.

Logical learning 386 is the teaching and learning from relationships or rules, patterns, and formulae. In traditional learning environments, logical learning 386 is a largely intuitive and self-guided experience because the identification and recognition of the relationships and patterns, and understanding of the formulae, requires a high degree of internalization and tacit integration of the knowledge. Games are a great example of logical learning 386 because games use a set of rules that, when followed, result in patterns of outcomes and consequences. The scientific method is also largely an exercise in logical learning 386 since the scientific method is intended to systematically test cause-and-effect relationships.

Mixed-media learning 388 includes most formal education (e.g., where a teacher both speaks to the class and visually represents concepts on the wall of the classroom), as well as videos, movies, games and other multi-modal or multi-sensory experiences. Mixed-media learning 388 is not so much a unique form of instruction as it is a purposeful and reinforcing combination of multiple other learning styles and learning modes, simultaneously or in rapid sequence. In theory, any educational material could benefit from a degree of mixed-media design. However, only some concepts truly benefit from the added complexity and risk of confusion of mixed-media learning 388 instruction. For example, mixed-media learning 388 is perhaps the most effective means of drawing attention to parallels and juxtapositions in embodied cognition. Mixed-media learning 388 is also effective for infusing core concepts like subject matter knowledge and process-oriented tasks with social and contextual perspective. For example, videos of real academic and industry STEM experts and professionals are an effective means of incorporating a social touch to core subject matter. Such videos also infuse the presentation of core subject matter knowledge with industry context and historical perspective.

Action-based learning 390 is the teaching and learning from hands-on practice, experience, and experimentation in a problem-driven setting. Action-based learning 390 has become popular in pedagogy circles, recently, because action-based learning 390 is an effective means of empowering students with agency or choice, reinforcing process-driven approaches like the scientific method, and uncovering subject matter knowledge in the process. However, action-based learning 390 also requires significant amounts of time and effort to set up, oversee and evaluate. Accordingly, action-based learning 390 may be inappropriate for some educational materials and may be too complicated for untrained teaching staff to administer successfully.

Social learning 392 is the teaching and instruction through group settings and personal interaction. Social learning 392 is effective for building collaborative skills and improving how students interact in social environments. This is important for developing leadership, management and project planning skills, as well as learning the context, beliefs and values that pervade a field, like FIRST's "Gracious Professionalism®", the National Society of Professional Engineer's Code of Ethics, and other standards of professional conduct. Social learning 392 is also a powerful mode of motivating and facilitating learning when the channel matters as much (if not more) than the content. For example, students are known to learn more effectively when they have a strong or positive personal relationship with their teacher. Students also learn more effectively when the students are emotionally invested and relating to characters in stories. Accordingly, social learning 392 is an effective means of facilitating learning for some educational materials.

Written explaining 394 and verbal explaining 396 are slightly different learning styles from the other learning styles in that written explaining 394 and verbal explaining 396 are exclusively focused on how the student demonstrates mastery of the educational materials. In addition, the act of utilizing knowledge via written explaining 394 and verbal explaining 396 reinforces the knowledge more effectively. Written explaining 394 involves demonstrating one's knowledge through written exposition, such as laboratory write ups, essays and paper assignments. Some educational materials lend themselves to being reinforced or tested in this format. For example, textbooks are being populated with more and more reflection prompts to make students stop, think, form connections, explain an answer to the prompt and, then, proceed. Accordingly, written explaining 394 may be an effective means of reinforcing learning of some educational materials.

Verbal explaining 396 challenge the user to demonstrate their knowledge through oral exposition, such as oral exams for foreign language learning and PhD comprehensive exams. Verbal explaining 396 is quite effective but is limited in application because of resource constraints—it is difficult for one teacher to administer an oral exam to 20 to 30 students at a time without the classroom devolving into chaos. However, the introduction of ubiquitous machine learning-enabled voice recognition software in the last decade (e.g., Amazon's Alexa, Microsoft's Cortana, Alphabet's Ok Google/Assistant) has created an opportunity to deploy verbal explaining 396 for more educational materials. Accordingly, verbal explaining 396 is only recently a scalable and reasonable means of reinforcing the learning and testing of educational materials.

Figure 8:
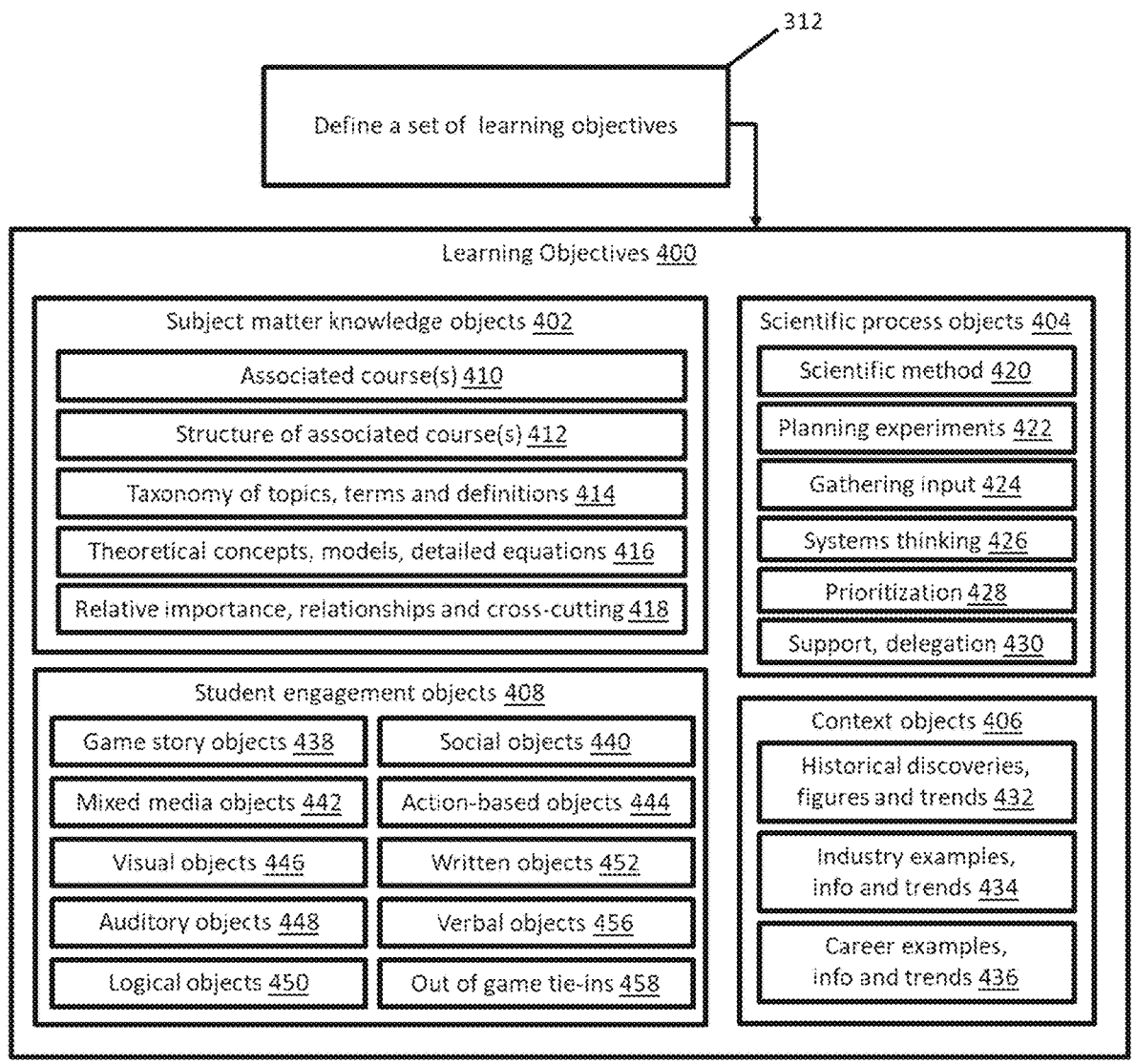
FIG. 8 is a block diagram of the step of defining a set of learning objects for the method of FIG. 5.

Referring back to FIG. 5, the server 126 defines a set of learning objectives 312, which organize the "what" that should be learned. As shown in FIG. 8, the learning objectives 400 include four broad categories of objects, including: subject matter knowledge objects 402, scientific process objects 404, context objects 406 and student engagement objects 408. The learning objectives 400 are not mutually exclusive and a specific piece of educational material may be organized along multiple dimensions of learning objectives 400. The learning objectives 400 are informed and defined, in part, based on the pedagogical objectives 350 and the learning styles 380.

Subject matter knowledge objects 402 organize and structure the core knowledge assets and content of the educational materials. First, the subject matter knowledge objects 402 organize the educational materials by the associated course(s) 410 that cover the educational materials, such as physical sciences like chemistry, chemical engineering, physics, astronomy, mechanical engineering, electrical engineering, computer engineering, civil engineering; life sciences like biology and ecology; earth sciences like geology, atmospheric science and environmental engineering; industrial design and human factors engineering; industrial engineering, operations and supply chains; computer science; mathematics and statistics; and other varieties of science, technology, engineering and mathematics. Second, the subject matter knowledge objects 402 organize the educational materials by the structure of the courses 412, for example, tracking syllabi and textbook chapter orderings. Third, the subject matter knowledge objects 402 organize the educational materials by the functional type of the content, including: taxonomy of topics, terms and definitions 414, which represent the linguistic structuring of the educational materials; theoretical concepts, models and detailed equations 416, which represent the mathematical structuring of the educational materials; and the relative importance, relationships and cross-cutting 418, which represent the social and contextualized structuring of the educational materials.

Scientific process objects 404 organize and structure the operational skills-, tacit skills-, and process-oriented knowledge assets of the educational materials. The scientific process objects 404 include the stages of the scientific method 420. The scientific method 420 is the most widely used framework for inquiry-based design and study, and includes the steps of: performing initial observation, asking a question, researching the background information, constructing a hypothesis, designing an experiment, testing the hypothesis with the experiment, validating the experimental design, analyzing data from the experiment, drawing conclusions from the data, confirming or rejecting the hypothesis, and communicating the results of the inquiry. For example, a set of educational materials relating to enthalpy are organized into a series of laboratory experiment-like steps that follow the scientific method 420. The resultant data structure of learning objects is then accessed modularly by step of the scientific method 420, reinforcing systems thinking and critical thinking.

The scientific process objects 404 include planning experiments 422 and other project management best practices. As mentioned above, the scale and complexity of scientific and technical endeavors in the modern economy are so large and unwieldy for a single person to handle that the ability to plan and manage is increasingly important. Accordingly, the educational materials are organized and structured to teach the art, science, and practice of planning. For example, elements of the project management framework and agile design framework are incorporated in an embodiment of the educational game described herein to provide a rounded planning perspective and skill set.

The scientific process objects 404 include gathering input 424 and other research design best practices around collecting data. The modern economy is increasingly data-driven. Yet, not all data is created equal. Data must be rigorously framed and defined, consistently measured, and vigilantly maintained to ensure adequate quality and reliability over time for the intended purpose. Accordingly, the educational materials are organized and structured to teach the art, science, and practice of gathering input 424.

The scientific process objects 404 include systems thinking 426 and other cognitive techniques for comprehending or visually representing, learning how subsystems operate within, and implementing changes to complex systems. Accordingly, real-world challenges are presented in their full complexity and nuance with a framework of systems thinking 426 providing sufficient structure to facilitate learning. For example, elements of design thinking, TRIZ (the system of innovation) and lean thinking (the process of waste removal) are incorporated into one embodiment to provide a rounded planning perspective and skill set. Specifically, these systems thinking 426 techniques are incorporated into the presentation of learning objects in the laboratory mode as an alternative to process orientations like the scientific method, in the story elements as a means of communicating player character thought processes and subject matter expertise, and within level designs where decision making can act as a driver of strategic tradeoffs in game play.

The scientific process objects 404 include prioritization 428 and other managerial techniques for allocating focus and attention across competing tasks or needs. According, real-world challenges are presented in their full complexity and nuance with a triage process providing sufficient structure to facilitate learning.

The scientific process objects 404 include a distinction between support and delegation 430 tasks. In the former, educational materials are classified based on whether the educational materials take a perspective that puts the user in a support capacity versus puts the user in a leading and delegating capacity. In the former, the educational game is configured to put the user in a support capacity where the user does not play a role in systems thinking, coordinating or planning. In the latter, the educational game is configured to put the user in a delegating capacity where the user plays a leading role in systems thinking, coordinating and planning activities. Accordingly, the educational materials are organized and structured to promote the user taking on different roles.

The learning objectives 400 include context objects 406, which are the broad, informed perspective of the field that students should learn. For example, students may need to appreciate a broader context in order to make sense of the importance of scientific principles, gain appreciation and respect for the slow, winding and laborious nature of scientific research, find inspiration and excitement to learn the educational materials or pursue a career in the field, and learn the myths and norms of a field to acclimate to the profession.

The context objects 406 include historical discoveries, figures and trends 432. Historical information is an important source of context because it grounds educational materials, particularly, scientific knowledge, in a certain time and place. Great discoveries are a product of their time. Students will one day work in the present to make discoveries and shape the future. Historical context also highlights that many discoveries emerge in pairs (e.g., new discoveries enable new tools and instruments, and new tools and instruments enable new discoveries). The process of scientific discovery and technological development is inherently embedded in historical context. Accordingly, the educational materials are organized and structured according to how they are informed by and embedded in historical context.

The context objects 406 include industry examples, information and trends 434. The industry examples, information and trends 434 range from product descriptions and explanations of how they leverage the educational materials to profiles of leading companies and their areas of expertise and R&D, and from how those products are made to how they are consumed or used. The industry examples, information and trends 434 provide real-world context that ties the educational materials to authentic touch points in the user's world and their experience.

The context objects 406 include career examples, information and trends 436. Career examples, information and trends 436 include the names, titles, salaries, educational backgrounds, related disciplines and future advancement opportunities of professional roles. Career examples, information and trends 436 humanize the historical 432 and industry 434 contexts. Career examples, information and trends 436 also providing meaning and purpose to educational material, by showing how real people use the concepts and technologies in the modern economy to make a living and have an impact. The career examples, information and trends 436 highlight the aspects and context of educational materials that is actionable and impactful in the future lives of the student users.

The learning objectives 400 are also structured and organized based on student engagement objects 408, which indicates how the learning objectives 400 will be consumed by the user. The student engagement objects 408 mirror many of the learning style 380 categories but they are somewhat reversed. Learning styles 380 represent how educational materials are presented (e.g., reading a paragraph of text is an example visual learning 382), whereas student engagement objects 408 represent how users interact with and respond to the educational materials (e.g., reading a set of dialogs and picking an outcome).

The student engagement objects 408 include game story objects 438 objects. Game story objects 438 are overarching narrative elements that drive the context and meaning for the gaming experience and bring those narrative elements back to a human-scale. For example, humanity faces a number of grand challenges, today, like climate change, which are threaded through the educational game as the narrative backbone, providing context, purpose, and unifying topic for the dialog. Users interact with the game story objects 438 through making choices in-game that have consequences on how the game progresses and how the user performs.

The student engagement objects 408 include social objects 440. Social objects 440 includes in-game character dialog and character development. Character dialog grounds the game story elements and promotes affiliation and empathy with the characters. For example, professional decorum and ethics are well suited to be taught via social objects 440 elements. Social objects 440 also includes real-world tie-ins to industry and career elements. For example, personal profiles and video diaries of real engineers and their experiences in the field draw upon social engagement.

The student engagement objects 408 include mixed-media objects 442, like videos with audio voiceovers and subtitles. Mixed-media elements 442 provide content to the user via multiple learning styles 380 at a time (including the mixed-media learning 388 learning style).

The student engagement objects 408 include action-based objects 444. Action-based objects 444 are kinesthetic learning objects that are configured for the user to interact with via tactile manipulation of simulations and selection of educational curriculum-based game mechanisms. Action-based objects 444 are well suited for repeat engagement, trial and experimentation because action-based objects 444 change in response to the user's prior interactions, creating a dynamic presentation of the educational materials.

The student engagement objects 408 include visual objects 446. The visual objects 446 are text, definitions, graphics and charts that convey the educational materials. The visual objects 446 utilize the visual learning style 382.

The student engagement objects 408 include auditory objects 448. The auditory objects 448 are sounds, rhythm, and other musical and linguistic elements, as well as mnemonics and acrostics to convey and entrench its message in memory. The auditory objects 448 also generally uncommon because of the difficulty of creating an effective auditory presentation of a learning object in most settings. Moreover, auditory objects 448 can be difficult to integrate into class discussions and explanations because average to poor auditory objects 448 may distract or disengage too many students. However, in the context of an adaptive learning platform, such as the educational game described herein, more auditory objects 448 can be created, selectively deployed, tested for efficacy and redeployed more efficiently in a personalized way. The auditory objects 448 utilize the auditory learning style 384.

The student engagement objects 408 include logical objects 450. The logic objects 450 involve teaching and learning from relationships or rules, patterns, and formulae. The logical objects 450 also include challenges that test the user's ability to recall and deploy the relationships, rules, patterns and formulae. The logic objects 450 utilize the logical learning style 386.

The student engagement elements 408 include written objects 452. The written objects 452 are prompts or solicitations of verbal explanations from the user, which take the form of text and/or dialog boxes that input the user's response. The written objects 452 evaluate whether the user understands the educational materials and is able to recall and deploy the underlying concepts with adequate proficiency. The written objects 452 utilize the written explaining 394 learning style.

The student engagement elements 408 include verbal objects 454. The verbal objects 454 are prompts or solicitations of oral explanations from the user, which take the form of audio recording and speech-to-text inputs that input the user's response. The verbal objects 454 utilize the verbal explanation 396 learning style.

The student engagement elements 408 also include out of game searches 458. Out of game searches 458 are prompts or solicitations for the user to gather information or data using a web browser API built into the educational game to access information from internet-based search engines and database resources. For example, the user is prompted to select a career path, like geophysical engineer, and identify a 4-year college and a vocational program in the user's area that relates to the career path, and, then, enter this information and thoughts and comments into a textbox. The out of game searches 458 extend the reach of the educational game to include real-world research, data and context that is flexible to individual user interest. In one embodiment, the out-of-game searches 458 are provided with tight time requirements, e.g., for a rapid turn around of an answer and to prevent the user from disengaging from the educational game.

In one embodiment, the user has autonomy and control over the consumption of educational material in the educational game. The educational game is configured to observe patterns of preference and strength and, then, present educational materials according to the user's stronger learning styles until the material is mastered. The educational materials is presented according to the learning styles of the user either to: only show the dominant learning style and sending the other presentations of the educational materials back a layer (e.g., to be accessed via hover overs and click throughs), or accentuate the dominant learning style and de-accentuate the secondary learning styles (e.g., by shrinking and graying out the latter). In addition, the educational game is configured to allow the user to hover over and click through the learning objects to access additional learning styles and learning modes, as well as control the presentation of the same through engagement with a simulation mode. As a result, the educational game provides a balanced and evolving mix of learning objects according to different learning styles to engage the user while also incrementally exposing the user to other materials to round the user's ability to process information from all learning styles.

Figure 9:
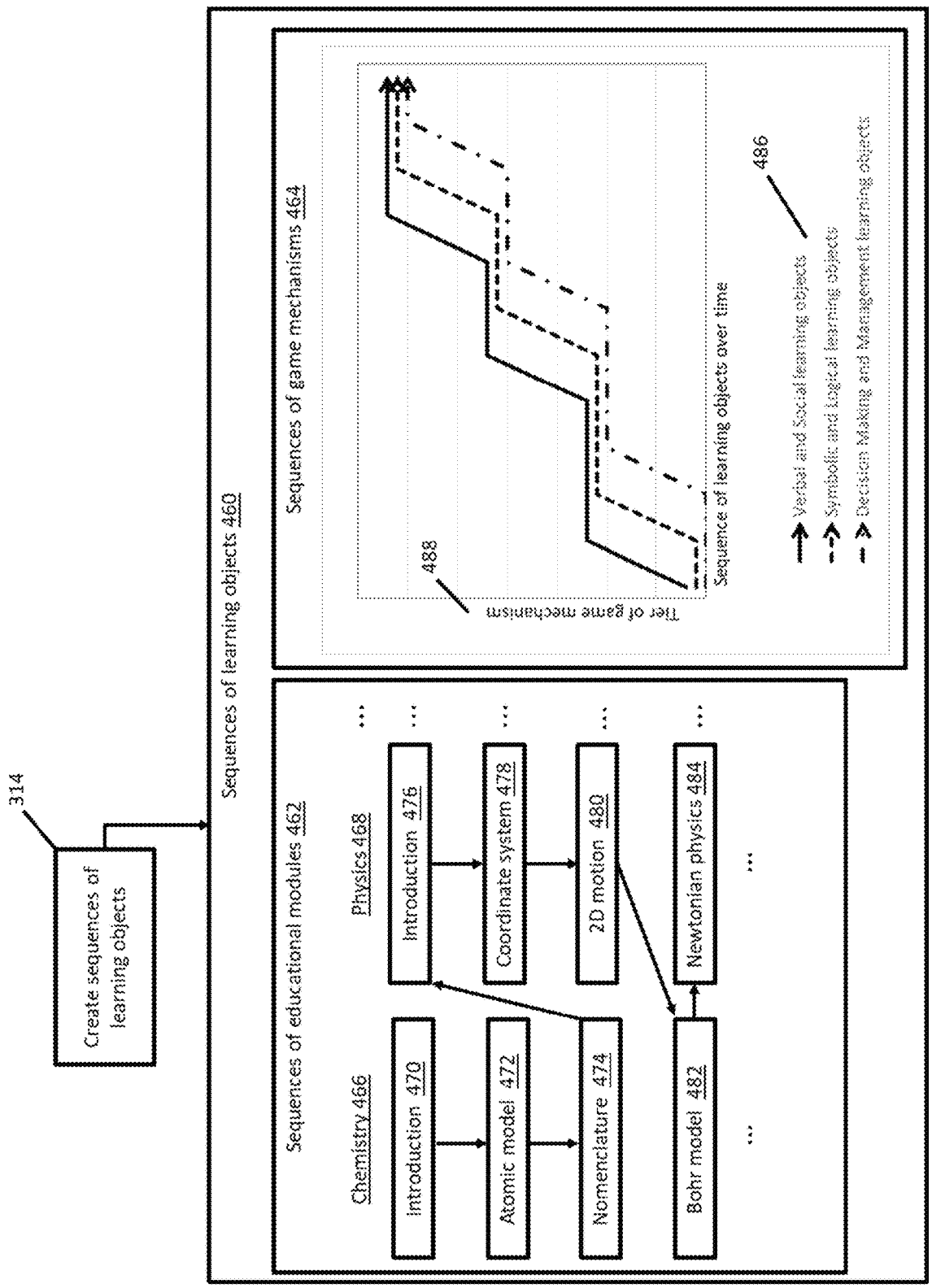
FIG. 9 is a block diagram of the step of creating sequences of learning objects for the method of FIG. 5.

Referring back to FIG. 5, the server 126 then creates sequences of learning objects 314. As shown in FIG. 9, sequences of learning objects 460 have two components that are iteratively coordinated: sequences of educational modules 462 and sequences of game mechanisms 464. The sequences of educational modules 462 transform the structured and, generally, linear educational modules of a traditional, siloed educational curriculum into a pan-subject series of educational modules. For example, the traditional educational curriculum for a first class, like chemistry 466, is integrated and sequenced with other classes, like physics 468. Starting with the chemistry 466 course, an introduction 470 to chemistry is presented, first. Then, additional curriculum like an atomic model 472 of chemical structures and a set of rules of nomenclature 474 of atoms and molecules are presented. Then, switching to the physics 468 class, an introduction 476 to physics is presented followed by information about coordinate systems 478 and fundamental equations of 2D motion 480. Then, switching back to the chemistry 466 curriculum, a set of instructions are presented on the Bohr model 482 of the atom before, switching back to the physics curriculum 468, another set of instructions are presented on Newtonian physics 484 in 3D space, and so on. Accordingly, multiple classes worth of curriculum is threaded together in a more intuitive and reinforcing sequence of educational modules 462.

The sequences of game mechanisms 464 add structure to how the game mechanisms are introduced and utilized to assess the user's comprehension of the sequences of learning objects. To illustrate this structure for a particular topic (e.g., the coordinate system 478), categories of learning objects 486 (e.g., Verbal and Social learning objects, Symbolic and Logical learning objects, and Decision Making and Management learning objects) are graphed as a sequence intended to be introduced to the user over time and through successful completion of prior learning objects, indicated on the horizontal axis. The vertical axis reflects tiers of game mechanisms 488, which are progressively more complex, detailed and challenging game mechanisms. As the plot gets higher on the vertical axis, the level of complexity, extent of information provided and difficulty of prompted user interaction increases. This is akin to an easy, medium and hard-mode of how the user must interact with the game mechanisms to achieve the desired result in game. For the sequence of learning objects regarding the coordinate system 478, the learning objects are arranged so that they, first, address verbal or social topics, second, symbolic or logical topics and, third, decision making or managerial topics. This pattern is repeated several times with successively more difficult material. It will be appreciated that the chart has been simplified and is merely illustrative; the sequence of learning objects over time and the tier of game mechanisms are tracked and recorded in a multi-factorial manner with more fine-grained scales.

Referring back to FIG. 5, the server 126 then scores the educational curriculum based on the pedagogical objectives 316, scores the educational curriculum based on the learning styles 318, scores educational curriculum based on the learning object 320, and scores the educational curriculum based on sequences of learning objectives 322. The server 126 assigns weights, values, metadata and associations to each item of the educational curriculum. This process is performed using a neural network, machine learning or artificial intelligence-based approach that builds on an initial, supervised instruction set that is updated and refined by user interaction with the educational game.

The server 126 creates a curriculum-based game mechanism for each educational module 324. As a reminder, the educational modules are the most critical and central principles of the educational curriculum that align to the educational standards and are foundational to the student's understanding of the field. The server 126 analyzes the scored data for each educational module and associates the educational modules with an appropriate game mechanism to create a curriculum-based game mechanism.

Figure 10:
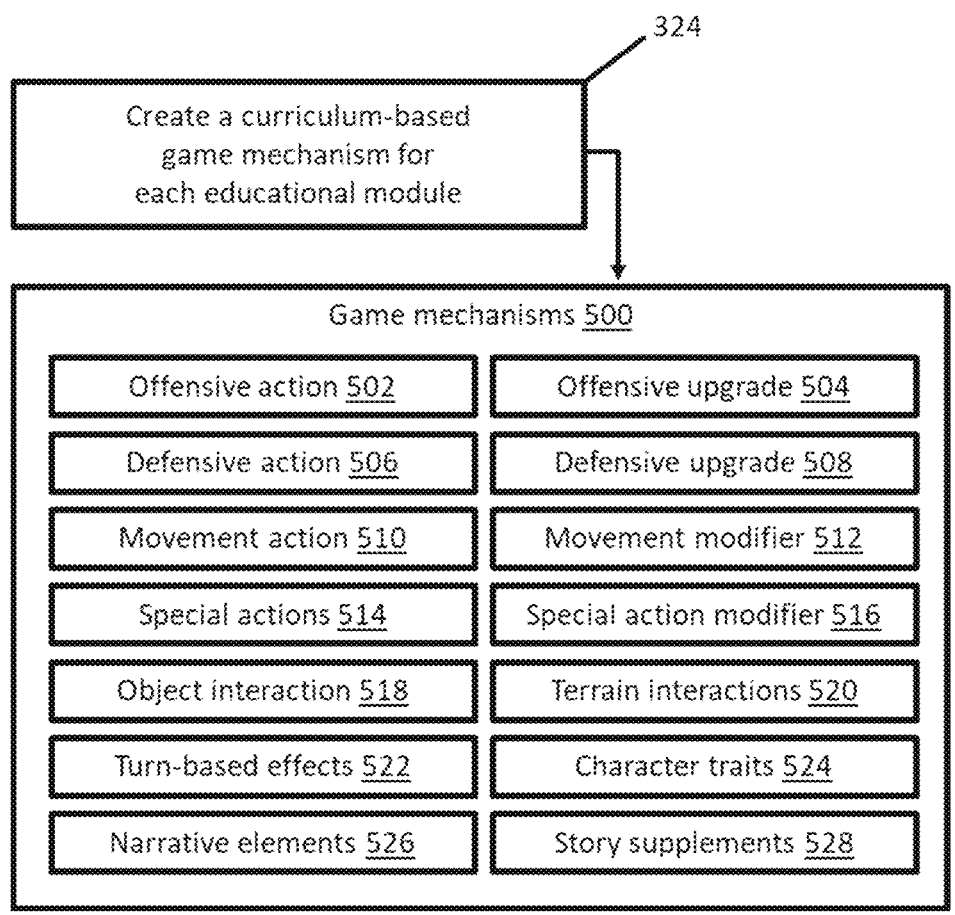
FIG. 10 is a block diagram of the step of creating a curriculum-based game mechanism for the method of FIG. 5.

Referring now to FIG. 10, a list of game mechanisms 500 is shown. The game mechanisms 500 are in-game actions that users take with the player characters (and that enemy elements take, in turn). The game mechanisms 500 are based on real scientific principles and mathematical relationships. The game mechanisms 500 interact collectively within a common simulation environment that is the field of play of the educational game. As will be described below, some game mechanisms 500 are well-suited for conveying certain learning objects and pedagogical objectives, like subject matter knowledge, while others are well suited to convey other learning objects and pedagogical objectives, like project management skills.

The game mechanisms 500 include offensive actions 502. The offensive actions 502 are user-initiated interactions by the user-controlled player characters (e.g., protagonist) against non-player characters (e.g., allies, enemy elements). The offensive actions 502 take a wide range of forms like the use of gadgets, guns, grenades, flamethrowers, catapults, drones, and other weapons, including mechanical, chemical, electrical, biological and other designs. The offensive actions 502 represent one half of an action-reaction pairing that is simulated based on real scientific and mathematical principles. The offensive actions 502 proxy and embody the underlying scientific principle or mathematical model in a way that is mathematically accurate and metaphorically true to the learning object. For example, within the chemistry educational curriculum, the Bohr model of the atom is modeled as an electro-magnetic radiation emitting gadget (e.g., a laser emitter), acid-base reactions are modeled as a liquid dispersing grenade, oxidation-reduction reactions are modeled as a flamethrower, and so on. Within the physics educational curriculum, Maxwell's equations and Lorentz force laws of electromagnetism are modeled as an electro-magnetic pulse gadget that induces current in metal circuits, Faraday's laws of induction and the laws of classical mechanics are modeled as a railgun that launches high speed projectiles at a physical structure, and analog and digital electronic circuits are modeled as electronic transmission devices and ASICs that transfer a target amount of voltage, current or wave pattern to a recipient device. In the life sciences educational curriculum, cell structure and function theory is modeled as single celled organisms and viruses that alter the function of a focal cell, and the differences between prokaryotic cells, plant cells and animal cells are modeled as resource generators and supply chains that deliver byproducts to the focal cells. Similar pairings of learning objects-to-actions grounded in real world science are made for other areas of science.

The game mechanisms 500 include offensive upgrades 504. The offensive upgrades 504 are modifiers, enhancements or improvements to the offensive actions 502, such as increased range of action inputs (e.g., a broader frequency range of inputs, increased range of energy output potential, or access to control of more electrons or electron shells), increased selection of materials (e.g., from the periodic table of elements), expanded design options (e.g., filters and nozzles), and catalysts, amplifiers and other accelerants. The offensive upgrades 504 are also based on real scientific principles and mathematical relationships. The offensive upgrades 504 embody the underlying scientific principles and mathematical relationships. For example, in the electrical arts, Ohm's law is modeled as the control system that enables peak output of the above systems (e.g., the electro-magnetic radiation emitting gadget), data storage and encryption is modeled as enemy profiles that allow targeted attacks, and so on. Similar pairings of learning objects-to-action enhancements grounded in real world science is made for other areas of science.

The game mechanisms 500 include defensive actions 506. The defensive actions 506 are preparations for or reactions to offensive actions 502. The defensive actions 506 take a range of forms, like equipping armor, erecting barriers, and neutralizing or negating the opponent's action. The defensive actions 506 represent the second half of the action-reaction pairing that is simulated based on real scientific and mathematical principles. The defensive actions 506 embody the underlying scientific principle or mathematical model in a way that is mathematically accurate and metaphorically true to the learning object. For example, within the chemistry educational curriculum, wearing armor made from metallic elements absorbs the radiation from the electro-magnetic radiation emitting gadget, applying a substance with opposite pH of an acid-base grenade will neutralize corrosive/caustic effects and leave a salt, and erecting a barrier of nonreactive material shields against the energy released by an oxidation-reduction flamethrower, and so on. Within the physics educational curriculum, mass and support structures is erected to dissipate and redirect forceful impacts, pullies and levers are repositioned to alter static properties, circuit elements are manipulated to alter system functionalities, and so on.

The game mechanisms 500 include defensive upgrades 508. The defensive upgrades 508 are modifiers, enhancements or improvements to the offensive actions 506, such as increasing the amount of armor (e.g., adding additional mass of a metal element or alloy), increased selection of materials (e.g., from the periodic table of elements), expanded design options (e.g., adding fins to armor that improve heat transfer rates), and buffers, filters, noise and other inhibitors. The defensive upgrades 508 are also based on real scientific principles and mathematical relationships. The defensive upgrades 508 embody the underlying scientific principles and mathematical relationships. For example, metal armor is upgradeable with cooling fins that improve heat transfer rates and thus cooling, and with polish treatments that increase the reflective threshold and reduce the armor's susceptibility to some forms of radiation.

The game mechanisms 500 include movement actions 510. The movement actions 510 are basic moves, like walking, as well as advanced moves, like sprinting and jumping with compressed air-packs. Player and non-player characters move around the field of play and, in so doing, are subjected to different environmental factors, like temperature, thermal coefficients, conduction, convection, pressure, catalysts, ionization levels, electro-magnetic fields, radiation, atmospheric attenuation and particulate matter (e.g., pollution), present in the environment that they pass through. For example, player characters that move through an area with high temperature may increase the player characters' temperature and thermal load, and enemy elements that move through cool water may rapidly dissipate thermal energy above the environment's ambient temperature. Player characters that utilize the compressed air-pack enabled jump expend compressed gas in accordance with the ideal gas laws, but then must wait for a compressor to refill the compressed gas chamber of the compressed-air pack before making another leap (e.g., cross-cutting chemistry and mechanical engineering concepts).

The game mechanisms 500 include movement modifiers 512. The movement modifiers 512 are environmental elements, like people movers, escalators and jump pads, that provide additional movement capabilities. The additional movement increases the character's exposure to additional environmental factors, which moderate the effect, like increasing the dissipation of excess thermal energy to the environment or reducing the amount of corrosion/caustic degradation that occurs.

The game mechanisms 500 include special actions 514. The special actions 514 are character-specific abilities that have significant in-game effects but are rare or limited relative to many of the other game mechanisms 500. The special actions 514 are used to accentuate the strategic tradeoffs in game, which increases user engagement. The special actions 514 embody real science processes and mathematical principles and are thematically sound to the backstory of the associated player character and enemy element. For example, a user that achieves certain objectives in game (e.g., executes an optimally efficient takedown of an enemy element) earn a charge of the special action 514 for one or more of the player characters. The user then commands a player character to make a special action 514 to expend the charge and call down an air strike that is configured using a related offensive action 502. The special actions 514 are well suited for encouraging users toward mastery of the learning object to gain strategic advantages and new tradeoffs in-game.

The game mechanisms 500 include special action modifiers 516. The special action modifiers 516 enhance or augment the special action 514 and add a second learning object to the use of the special actions 514. By presenting two (or more) learning objects within the same sequence of actions, special action modifiers 516 are well suited to enable the mash up disparate concepts (e.g., versus just cross-cutting them). For example, in the air strike described immediately before, the air strike (special action 514) are augmented with a telecommunications pack (special action modifier 516) that improves the accuracy of the air strike but requires the user to also demonstrate knowledge in concepts like data transmission, band pass filters, signal theory, and encryption to use the telecommunications pack. As a result, users learn how various areas of scientific knowledge fit together in the real world, and that many areas of endeavor have overlaps and interactions with one another. Moreover, the special action modifiers 516 embody real science processes and mathematical principles and are thematically sound to the backstory of the associated player character and enemy element. Thus, the special action modifiers 516 improve user engagement with the player characters, the player characters' careers, backgrounds and backstories.

The game mechanisms 500 include object interactions 518. The object interactions 518 are player character or enemy element activations of switches, power nodes and other in-game objects. Activating the objects causes changes to the accessible field of play of the game (e.g., by extending a ladder or bridge, or by opening a door), turning on and off enemy access points and spawn points, and opening the system of the field of play to external energy sources. The object interactions 518 are well suited to promote system-level strategic interactions that teach and test systems thinking, project management skills, and industrial engineering concepts. The object interactions 518 are also configured to capture an in-game decision or choice made by the user.

The game mechanisms 500 include terrain interactions 520. Terrain interactions 520 are player character or enemy element activation of or engagement with terrain elements in the field of play of the game, such as water, trees, walls and built structures, concrete barriers, piles of dirt, sand bags, tanks of compressed gas, oil canisters, and the like. Each terrain element is usable as cover. Terrain elements block line of sight, impede movement actions 510, and intercept some offensive interactions 502 and special actions 514. Each terrain element has different characteristics and properties, including a current state (e.g., temperature), that are based on real science principles for the associated real-world terrain. The terrain interactions 520 alter the terrain elements, and the characteristics and properties of the terrain elements based on real scientific principles. The terrain interactions 520 enable strategic tradeoffs in-game. The terrain interactions 520 also create a consistent backdrop across levels and subject matter, which facilitates cross-cutting of concepts.

The game mechanisms 500 include turn-based effects 522. The turn-based effects 522 are sequential, periodic and time-based interactions that occur between elements in the level or field of play. For example, at the end of each turn the thermal load of elements will dissipate from high temperature to low temperature elements, eventually stabilizing at the average level of system energy. As additional examples, chemical reactions occur over time with each update providing a new snapshot of the system relative to equilibrium, gasses in high pressure will move toward low pressure areas in the field of play, electric currents will flow from high voltage storage (e.g., batteries) to ground, (digital) electric circuits toggle to the next clock cycle and the gate logics and stored values are updated, Newtonian and Einsteinian estimates of an element's location, velocity, etc. are updated, and so forth. The turn-based effects 522 convey a sense of ordered process and balance, while teaching a sense of the rate and duration of reactions and effects.

The game mechanisms 500 include character traits 524. The character traits 524 are individual character-specific supplemental attributes or modifiers. For example, a specific player character protagonist enters the game equipped with a cooling pack or fire extinguisher that is utilized to dissipate heat and break the cycle of an exothermic reaction. As another example, an enemy element may be adept at building structures and erecting barriers and, as a result, extends the effect or benefit of terrain elements. The character traits 524 are triggered automatically in response to an action that targets the individual character or in response to the individual character's interaction with elements in the field of play. The character traits 524 enhance the strategic tradeoffs in the game and force players to engage more deeply with the scientific principles in the challenge. Specifically, the character traits 524 require users to pay attention to the details of player character and enemy element profiles to accurately assess strategic tradeoffs (e.g., rather than merely inferring relative strengths and weaknesses based on the type of character from its 3D model design).

The game mechanisms 500 include narrative elements 526. The narrative elements 526 are the overarching plot structure of the game. The narrative elements 526 provide context, anchor the learning experience in real world details. The narrative elements 526 also provide a setting for the protagonists' interaction with each other and the antagonists (and other characters). The narrative elements 526 embed the personalization of the game in meaningful experiences that relate to the learning experiences and real-world details. The narrative elements 526 are configured to facilitate communication of the learning objects and improve learning gains. The narrative elements 526 are also configured to buffer the rate of play to prevent overstimulation and vary the modes of interaction with the game, which sustains user engagement (or flow). Critically, the narrative elements 526 are configured to align game play with learning in a rich and compelling context. The educational game is configured so that users make decisions or choices that influence the direction of the story and the narrative elements 526.

The game mechanisms 500 include story supplements 528. The story supplements 528 are short in-game dialog elements and cues that build-upon or reiterate aspects of the educational curriculum 302, like educational modules 306, and game elements, like narrative elements 526. The story supplements 528 are configured to be delivered by the available protagonist who is most closely associated with the narrative elements 526 or educational modules 306 based on the character backstories, scientific expertise and personal values. The story supplements 528 further align the game play with the learning experience in a personalized and relatable context. The story supplements 528 promote the development of role models and improve gains on career awareness and interest.

The variety of game mechanisms 500 are configured to allow a new form of user assessment in educational games. Namely, the same educational material is presented and assessed in multiples ways as multiple related learning objects. For example, the Bohr model of the atom are taught and assessed in the context of a laser radiation gadget that simulates how energy is applied to excite gas molecules in a vacuum and how those molecules, then, emit radiation that transfers energy to a remote target. The remote target's metal armor absorbs the radiation, some of which is converted into heat and causes phase changes of the material makeup of the remote target. In addition, the Bohr model of the atom is taught and assessed in the context of a container of gas that is excited by the application of radiation that is, then, converted into energy, reversing the order of actions. In one embodiment, the educational game is configured to leverage these bi-directional presentation opportunities by engaging users with the same scientific concepts from multiple perspectives and in multiple directions.

Referring back to FIG. 5, the server 126 develops multiple tiers of each game mechanism 326. This step aligns the sequences of game mechanisms 464, which included tiers of game mechanisms 488, to the educational modules 306 based on the level of cognitive complexity or difficulty of the tiers of game mechanisms 488.

The server 126 receives game assets 328. The game assets are the maps, textures, character models, character skins, animations, user interfaces, voice overs, videos, and so on that constitute the stock of elements represented in the game.

The server 126 then associates learning objects with the game mechanisms 326 and game assets 330. In this step, a data structure associates, connects, sequences and frames rights access to tie together the various elements that make up the educational game.

Lastly, the server 126 creates user learning profiles 332. The user learning profiles are the record of the user's use and interaction with the educational game. The user learning profiles map the educational game data (including step 330) to a template user account that is copied for each individual user. The user profiles are configured to track licensing rights access and available data, user progress through the available content, characters and narrative sequences unlocked, in-game items and rewards that have been collected, and other user data that inform user preferences and learning styles, user engagement and flow, and so on.

Figure 11:
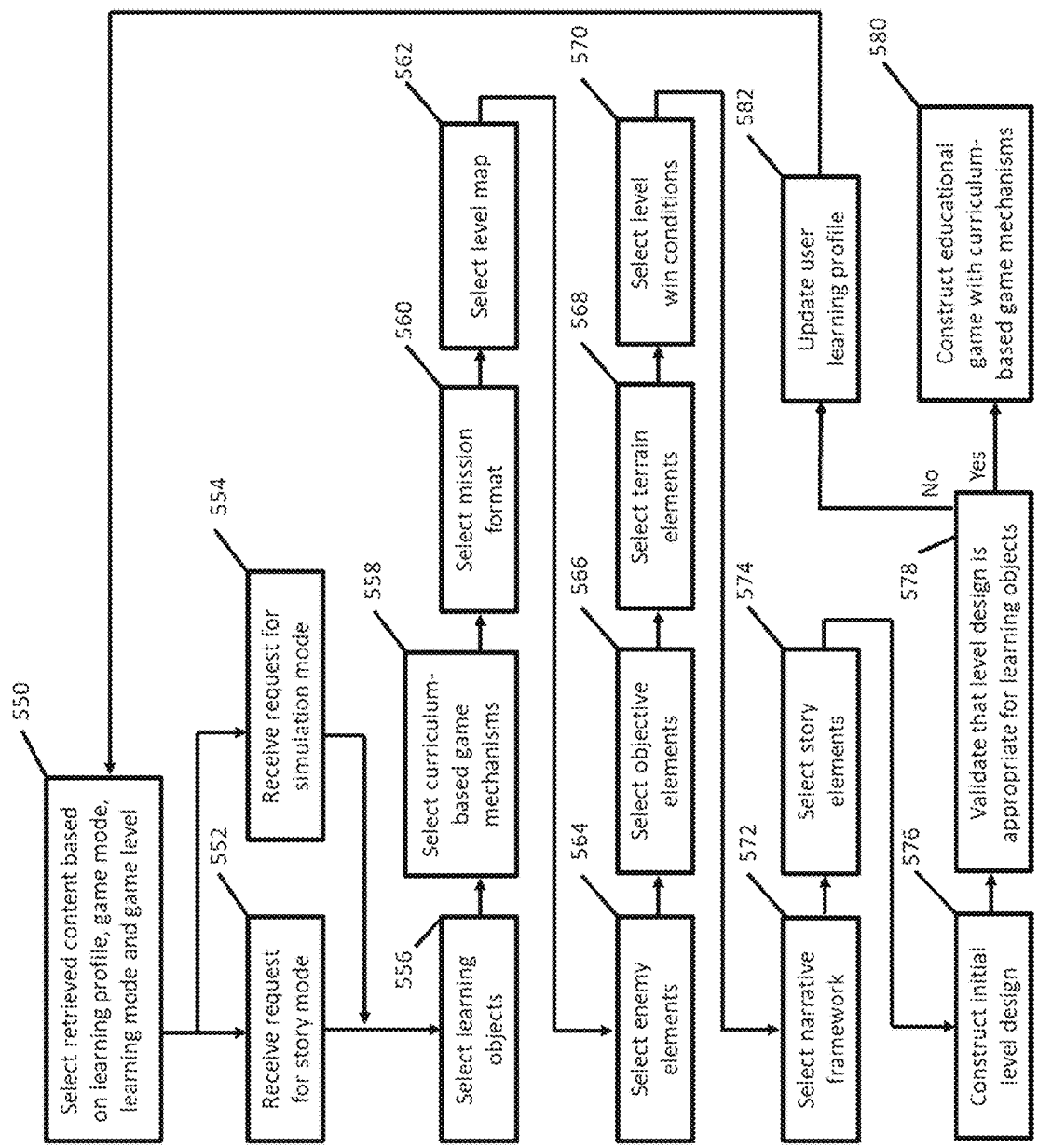
FIG. 11 is a flow diagram of a method of constructing the educational game using educational materials.

Referring now to FIG. 11, a method of constructing the educational game using educational materials is shown. The method starts by selecting retrieved content based on learning profile, game mode, learning mode and game level 550. The method extrapolates the step of selecting retrieved content based on the learning profile 226 as shown in FIG. 4, and, similarly, is performed using the server 126. The method describes how the educational game is generated via dynamic or procedural generation to tailor the learning experience and the game experience to individual users.

According to the method of FIG. 11, the server 126 either receives a request for a story mode 552 experience or receives a request for a simulation mode 554 experience. In the former, the user has selected to replay an existing, already played and completed level, but with variable (e.g., increased) difficulty. In the latter, the user has selected to play a custom level based on a set of inputs. In either case, the server 126 is configured to select a mix of learning objects and game elements to generate a custom game experience for the user.

The server 126 selects the learning objective(s) 556. In the case of a request for a story mode 552 experience, the learning objectives are selected, in part, based on the level selected from the story mode menu and, in part, based on the user's past experience with the game, the learning style preferences of the user and so on as captured by the learning profile of the user. In the case of a request for a simulation mode 554 experience, the user has more direct control over the learning objectives because the simulation mode is configured to permit the user to input which educational curriculum elements to crosscut. In addition, the server 126 selects additional learning objects based on the learning profile of the user (e.g., selecting sequentially appropriate learning objects). In either case, the server 126 caches a subset of learning objects.

The server 126 selects curriculum-based game mechanism(s) 558. Based on the selected learning objects, the server 126 caches the associated game mechanisms 558. Then, based on the selected learning style and curriculum difficulty mode, the server 126 selects the appropriate tier and sequence of the curriculum-based game mechanisms for the user.

The server 126 selects a mission format 560. In story mode, the mission format is primarily selected based on the level of the story mode that the user has chosen. In the simulation mode, the mission format is selected based on input from the user (including a Select Random mission format option, that makes a selection based on the configuration of other inputs and the user learning profile).

Figure 12:
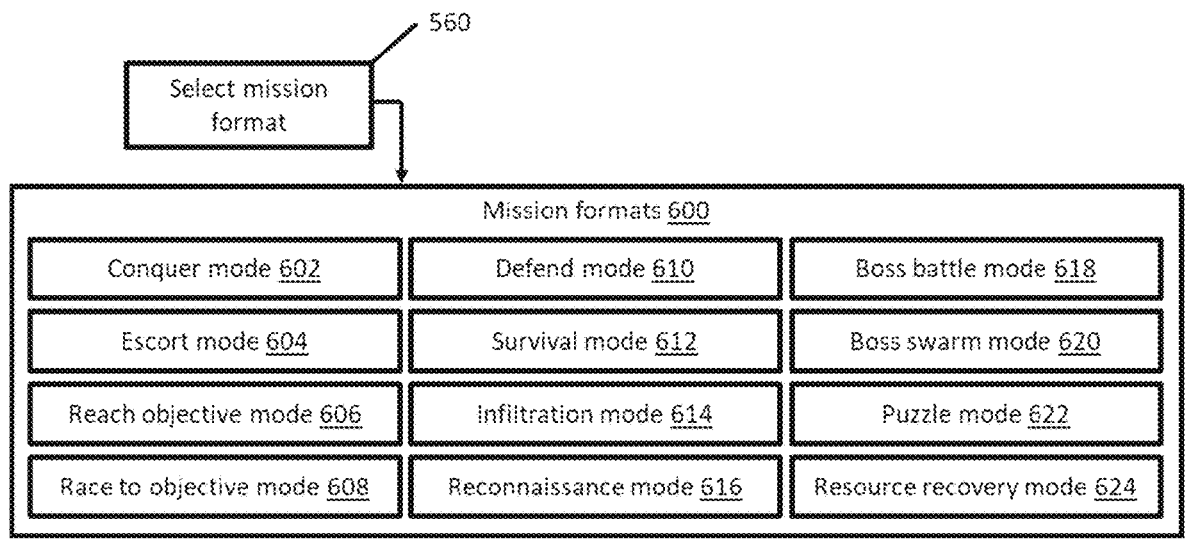
FIG. 12 is a block diagram of the step of selecting a mission format for the method of FIG. 11.

Referring now to FIG. 12, a list of mission formats 600 are shown. As will be appreciated from the following descriptions, the mission formats 600 are each suited to guiding the user's attention and learning to different game mechanisms and, thus, are differently suited to convey each learning object.

The mission formats 600 include a conquer mode 602. The conquer mode 602 requires the user to defeat all enemies to complete the level. The conquer mode 602 is well suited to direct the user's attention to the focal learning objects associated with the offensive mechanisms and defensive mechanisms present in the level. Specifically, the conquer mode 602 places emphasis on the use and mastery of the offensive mechanisms. In addition, the conquer mode 602 is well suited to direct the user's attention to the crosscutting of educational modules that are embodied by the offensive mechanisms.

The mission formats 600 include an escort mode 604. The escort mode 604 requires the user to protect a moving target, for instance, an important non-player character who needs to be guided across the field of play to an objective. For example, the objective may be toward the front-line of combat, across the engagement line or in the back ranks leading to safety. The escort mode 604 is well suited to direct the user's attention toward interactions with objective elements, terrain elements, and movement actions. The escort mode 604 also emphasizes time-based mechanisms and effects by requiring the user to stage and sequence actions in an optimal manner.

The mission formats 600 include a reach objective mode 606. The reach objective mode 606 requires the user to navigate the level map and arrive at a specific square or objective (e.g., stand next to and, then, activate a power node or switch). The reach objective mode 606 directs the user's attention to making tradeoffs between multiple game mechanisms and, thus, the associated learning objectives.

The mission formats 600 include a race to objective mode 608. The race to objective mode 608 requires the user to speed run the level or, in other words, complete the other level win conditions in less than a certain amount of time. As a result, the user is encouraged to both focus on taking optimally efficient actions to navigate the map, and to do so as quickly as possible. Thus, the race to objective mode 608 is well suited to drill a set of learning objectives from understanding to proficiency and from proficiency to mastery. The time limits or time targets are adjusted downward to increase the intensity and, therefore, ensure a greater level of mastery.

The mission formats 600 include a defend mode 610. The defend mode 610 requires the user to protect a stationary objective against waves of oncoming enemies. The defend mode 610 is similar to the conquer mode 610 in how it directs the user's attention to the offensive mechanisms and defensive mechanisms and crosscutting educational modules. However, the defend mode 610 places greater emphasis on the use and mastery of the defensive mechanisms.

The mission formats 600 include a survival mode 612. The survival mode 612 requires that the user defends the player characters for as long as possible against waves of enemies who may be insurmountable to engage directly. Accordingly, the survival mode 612 focuses the user's attention on movement actions and interactions with terrain elements and objective elements. The survival mode 612 also emphasizes time-based mechanisms and effects, including the conservation of offensive resources and the management of defensive resources.

The mission formats 600 include an infiltration mode 614. The infiltration mode 614 requires the user to navigate the level while utilizing movement actions, terrain elements, and switches to avoid the enemies, or, at least, to only selectively engage the enemy. As a result, the infiltration mode 614 is well suited to guide the user's attention to new actions and utilities within the game. The infiltration mode 614 also provides opportunities for slower pacing within the game, which allows a shift in focus toward the story, narrative, industry context, and career learning objectives.

The mission formats 600 include a reconnaissance mode 616. The reconnaissance mode 616 requires the user to navigate the level map to reach multiple objectives and/or harvest multiple resource elements. The reconnaissance mode 616 emphasizes scientific inquiry and scientific method learning objectives by directing the user's attention to exploration and sampling activities. The reconnaissance mode 616 also provides opportunities for slower pacing within the game, which allows a shift in focus toward the narrative, story, industry context, and career learning objectives.

The mission formats 600 include a boss battle mode 618. The boss battle mode 618 escalates the difficulty level of the level by including one or more bosses (e.g., enemies with significantly higher offensive and defensive capabilities). The boss is generally so formidable that the user must identify the appropriate strategic interactions that weaken, disable or overwhelm the boss. The boss battle mode 606 is well suited to promote inquiry-based learning and stochastic modeling because, like a good puzzle, the solution for defeating the boss may not be clear at first and may only be discovered through experimentation with competing courses of action (e.g., hypotheses about how to win).

The mission formats 600 include a boss swarm mode 620. The boss swarm mode 620 is another mode with escalated difficulty due, in part, to the introduction of one or more bosses. However, in contrast to the boss battle mode 618, the boss swarm mode 620 presents such an insurmountable enemy force that the user most, instead, focus on achieving an objective (e.g., reaching and activating a switch) rather than combating the enemy directly. Accordingly, the boss swarm mode 620 emphasizes systems thinking, project management skills, and a deep appreciation of all available modifiers and upgrades, like offensive upgrades, defensive upgrades, movement upgrades, special upgrades, and so on imparted by selecting nonplayer characters to join the team to impart the nonplayer characters' subject matter expertise.

The mission formats 600 include a puzzle mode 622. The puzzle mode 622 is designed as the greatest level of challenge in the game. The puzzle mode 622 demands mastery across multiple dimensions of learning objectives, as well as great familiarity with the game interface and an understanding of enemy behavior (e.g., AI/artificial intelligence). For instance, the puzzle mode 622 may only have one (or very few) set(s) of actions (including proper selection of player characters, weapons, armor, upgrades, etc.) that the user takes to successfully complete the level. The puzzle mode 622 promotes repetition of play and self-directed learning for mastery by drawing the user's attention to their knowledge gaps and providing a difficult but achievable challenge.

The mission formats 600 include a resource recovery mode 624. The resource recovery mode 626 is designed to facilitate the exploration of complex and multifaceted learning objects by pairing progressive exploration in the level with incremental reveals of learning objects. For instance, in the resource recover mode 626, the user is tasked with harvesting resources from resource elements and is presented with additional information about the learning objects along the way (e.g., either with some or every action taken to harvest resources). In this way, the user is incentivized with a minor in-game reward (e.g., additional resources) in exchange for exploring a STEM topic in greater detail. This format breaks up complex topics into smaller, more manageable increments with intervening rewards to sustain interest and engagement within a flow state. The resource recovery mode 624 is particularly well suited to convey historical perspective, industry knowledge and a greater depth and breadth of knowledge about complex learning objects.

Referring back to FIG. 11, the server 126 selects a level map 562. In story mode, the level map 562 is selected from memory based on the user's choice of level. In simulation mode, the level map 562 is selected based on the user inputs, which include an explicit request for a specific map or a map is chosen or procedurally generated based on the user's other inputs. For instance, the level map 562 is selected, in part, based on the selection of mission format 560. The level map 562 is also selected, in part, based on the learning objects.

The server 126 selects enemy elements 564. The enemy elements include the enemy types and the number of each enemy type to populate the level. For example, the enemy types include: basic foot soldiers, ranged combat experts, demolition experts, heavy weapons experts, resource gatherers, scientists and engineers who influence the level map and activate switches, and bosses. Each enemy type has different offensive and defensive capabilities and characteristics, which presents the user with different learning objects and challenges. The enemy elements' offensive and defensive capabilities and characteristics are adjustable. For example, the same enemy type may have a range of armor options with a range of masses of armor element. Similarly, the same enemy type may have a range of weapon options with a range of energy outputs. As a result, each enemy type, the number of each enemy type and the combination of enemies drives a different in-game interaction. In the story mode, the enemy elements are pre-defined for the selected level given the curriculum difficulty level and the game difficulty level. In the simulation mode, the enemy elements are selected based, in part, on the learning objects, the curriculum-based game mechanisms, the mission format and the level map.

Figure 13:
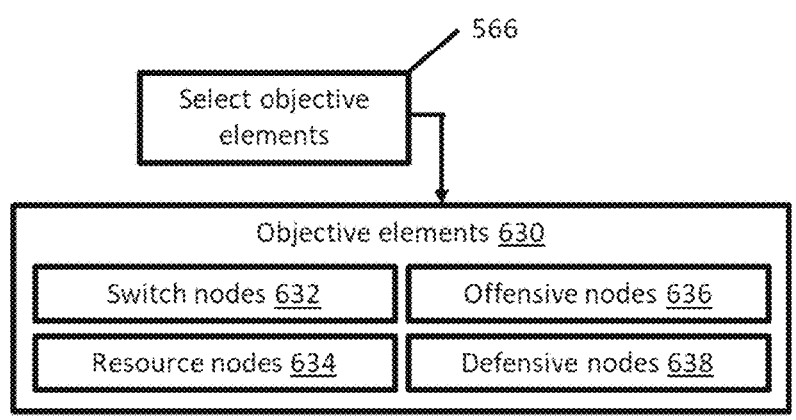
FIG. 13 is a block diagram of the step of selecting objective elements for the method of FIG. 11.

The server 126 selects objective element(s) 566. Referring now to FIG. 13, the objective elements 630 are in-game elements that the player characters and the enemy characters interacts with to achieve an in-game effect. The objective elements 630 are selected based, in part, on the learning objects and the level map. For example, the objective elements 630 include switch nodes 632 that are actuated to open or close doors, extend or retract a draw bridge, erect or remove a ladder, turn on or turn off an enemy spawning pad, and so on. The switch nodes 632 have multiple, impactful effects on game play and learning. First, switch nodes 632 are configured to alter the field of play to drive different strategic tradeoffs. For example, the user chooses to actuate a switch node 632 to increase or decrease the pacing of a level and/or the intensity of interactions with the enemy elements. Second, switch nodes 632 are configured to enable users to apply and test systems thinking, project management, decision making, critical thinking, and a variety of other learning objectives in a covert choice-based decision construct. For example, a user confronted with a choice to open one of three doors must analyze the situation, make an informed choice, observe what follows, and refine the user's thinking of the system. This involves meaningful in-game consequences (e.g., there may be an optimal way of opening the doors to defeat the enemies) that effectively convey systems thinking and experimental design learning objects. Third, switch nodes 632 enable covert decision trees in-game to drive different story elements and reveal different information. Fourth, switch nodes 632 increase the user's sense of autonomy and control over the learning environment, which promotes engagement and learning. Fifth, switch nodes 632 promote critical thinking and strategic thinking, particularly, in the context of puzzle mode and resource collection mode levels. Thus, switch nodes 632 intersect and drive tradeoffs between the educational or efficacy elements and the entertainment or enjoyment elements of the educational game.

The objective elements 630 include resource nodes 634. The resource nodes 634 are deposits of raw or processed resource, such as gasses, liquid solutions, minerals, metals, databases, terminals and other materials, that the user harvests or otherwise interacts with to gain access to or control over the resources. For example, users that harvest noble gasses increase the available moles of reactive material in an electro-magnetic radiation gadget. Users that harvest or purify acids (or bases) increase the concentration of available acids (and bases) that increases the efficacy of an acid (or base) grenade. Users that harvest metals increase the available moles of material for player character armor that increases defensive capabilities. Users that harvest wood, brick and stone increase the available materials to build barricades and defensive structures. Users that access computer terminals to acquire data and passcodes enable the actuation of other game elements, like activating a switch node 632. In each instance, the user can (e.g., probabilistically) gain access to new learning objects (e.g., both scientific subject matter knowledge and industry or career knowledge) through interacting and experimenting with the resource nodes 634. In addition, the resource nodes 634 are well suited to promote learning about the scientific process, experimentation, sampling, and statistical analysis.

The objective elements 630 include offensive nodes 636. The offensive nodes 636 are interactive elements that increase the range, power or efficacy of offensive actions. For example, a user may move to a square adjacent to an offensive node 636 to gain access to additional energy (e.g., from a power socket) or resources (e.g., already refined gas for the electro-magnetic radiation gun) to boost the efficacy of an offensive game mechanism. The interaction with the offensive nodes 636, like the underlying offensive game mechanism, is based on real science principles and augments the underlying game mechanism (or acts like an upgrade or modifier game mechanism). This interaction is multi-factorial and, at times, complex. However, through progressive reveals of information and incremental increases in control, the user is able to make sense of the new knowledge and make more of past knowledge as the user proceeds through the educational game. For example, in chemistry, the melting temperature materials is determined by the composition of the material, the bond strength, the number of bonds, the shape of the molecular structure, as well as the mass of the nuclei. This is a lot of information to pick up and model at once. As a result, traditional teaching formats have struggled to empower students with this knowledge until more advanced classes. However, the educational game is configured to reveal these properties one at a time and encourage the student to explore the tradeoffs and interactions of these properties through progressive engagement of simulated game actions that rely upon the properties.

The objective elements 630 include defensive nodes 638. The defensive nodes 638 are interactive elements that repair, maintain or enhance the efficacy of defensive game mechanisms. For example, a user may move to a square adjacent to a defensive node 638 to transfer excess heat and thermal loads from armor to the defensive node 638, to repair or replenish moles of the materials that constitute the armor, to erect an electro-magnetic barrier that inductively counteracts, redirects or attenuates incoming radiation, and so on. The defensive nodes 638 facilitate learning and understanding of complex learning objects within a hierarchical presentation of the broader concept. In particular, the defensive nodes 638 are well suited to demonstrate advanced or niche topics, like the photoelectric effect, that build upon foundational topics. The defensive nodes 638 are configured to present varied strategic tradeoffs to promote deeper engagement with the learning objectives. The interaction with the defensive nodes 638, like the underlying defensive mechanism, is based on real science principles and augments the underlying game mechanism (or acts like an upgrade or modifier to a game mechanism).

Figure 14:
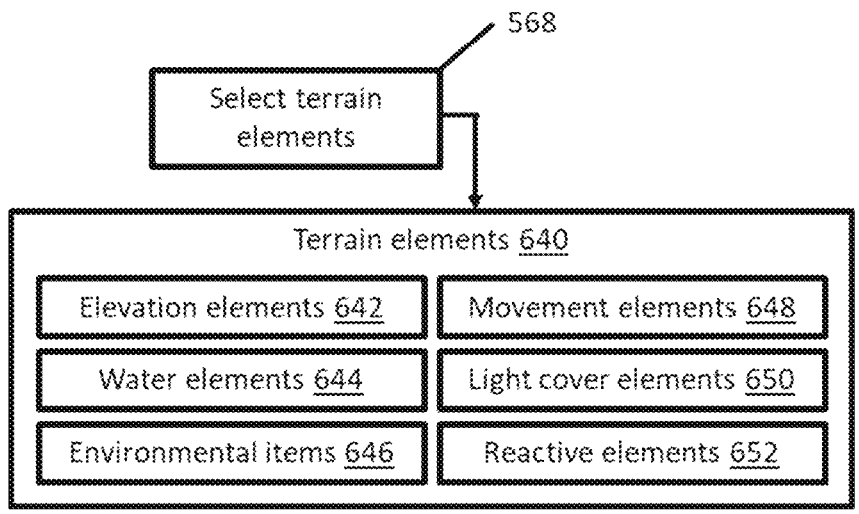
FIG. 14 is a block diagram of the step of selecting terrain elements for the method of FIG. 11.

Referring back to FIG. 11, the serve 126 selects terrain elements 568. Referring now to FIG. 14, terrain elements 640 are shown. The terrain elements 640 include elevation elements 642. The elevation elements 642 include hills, cliffs, buildings, scaffolding, walls, bridges, trees, large rocks and other natural and built objects that add a vertical dimension to the field of play. The elevation elements 642 are configured to have different ambient environmental properties and characteristics. For example, a character that is on elevated terrain may be exposed to higher winds and, thus, greater thermal transfer rates than a character on non-elevated terrain. The elevation elements 642 are configured to obstruct or impede movement across the field of play. For example, a character that climbs or descends a hill may move at half speed (rounded down), a character that tries to climb a steep hill or cliff may require access via a ladder or the use of a compressed air jetpack, and a character that attempts to climb a tree may find it outright impassable. The elevations elements 642 are also configured to obstruct line of sight (e.g., not just act like intervening terrain for the purposes of cover). By obstructing line of sight, the elevation elements 642 alter the strategic tradeoffs that are present on the field of play and make a non-uniform battlefield. For example, a character that takes refuge behind an elevation element 642 may avoid detection, reduce exposure to enemy interactions, slow down the pace of play and allow time to pass in order to recover via time-based game mechanism (e.g., by venting excess thermal energy to the environment over a number of turns). The elevation elements 642 are an important influencer of strategic tradeoff across the field of play.

The terrain elements 640 include water elements 644. The water elements 644 include rivers, ponds, lakes, waterfalls, tubs, vats, tanks, and other natural and built features designed to hold water and aqueous solutions. The water elements 644 are configured to impede movement across the field of play. For example, the water elements 644 are configured to be: shallow (e.g., navigable), medium depth (e.g., navigable but impeded or requiring assistance, equipment or movement modifiers) or deep (e.g., not navigable). Characters may travel above most of the water elements 644 with the use of a compressed air jetpack or other equipment. The water elements 644 generally do not obstruct line of sight.

The terrain elements 640 include environmental items 646. The environmental items 646 include ambient environmental properties and characteristics that are specific to each space of the field of play. For example, the field of play is made up of a large rectangle of 30×50 square spaces (or a similar hexagonal grid map). Each square has individual characteristics and properties, including: atomic, molecular, organic or other material compositions (e.g., grass, mud, stone, steel); mass; temperature; pressure; state of matter; specific heat associated with that material; pH; moles of reactants; electrical conductivity properties; electrical charge or ion density; magnetic field strength; reflectivity; wind speed; fluid flow rates; precipitation (e.g., rain, snow); and other material properties, as applicable. Some of the environmental items 646 represent changes to the level map (e.g., an addition or subtraction of an element or energy from the system of the field of play) that are likely shared by many if not all spaces of a level map, like precipitation and wind that affect all squares substantially evenly. The environmental items 646 are configured to update and react to activities and player behaviors within the game. Some of the environmental items 646 are also configured to have harmful time-based effects, such as high humidity or water features causing iron to turn to rust more rapidly, acid rain causing corrosion of metals and plants (and plant- or organic-based armors) to wither, and other effects (e.g., that reduce the mass of armor and, thus, defensive capabilities). Some of the environmental items 646 are also configured to have beneficial time-based effects, such as rain water that dilutes a strong acid or base, rain that replenishes plants and encourages the plants to grow, thermal vents that provide warmth in cold level maps or fans that dissipate excess heat in hot level maps, and other effects (e.g., that moderate offensive abilities and defensive abilities, or otherwise other game mechanisms).

The terrain elements 640 include movement elements 648. The movement elements 648 include ladders, bridges, extendable or moving walkways, conveyor belts, elevators, lifts, vehicles, teleportation devices (e.g., based on alien technology), and other people movers. The movement elements 648 are configured to enable characters to move around the field of play more freely or relocate the characters between turns. The movement elements 648 are configured to modify the turn-based effects that impact characters. For example, characters that are moved by a moving walkway are treated as moving a certain number of additional spaces during a turn, which may cause additional thermal transfer between the characters' armor and the environment. The movement elements 648 present users with additional choices and a variety of tradeoffs to balance while strategically navigating the field of play.

The terrain elements 640 include light cover elements 650. The light cover elements 650 include small rocks, tree stumps, bushes, crates, canisters, barricades, sand bags, tables, boxes, and other roughly human-scale objects found in the natural and built environment. The light cover elements 650 are configured to occupy space within the field of play, impact character mobility and partially block line of sight. The light cover elements 650 are also configured to intercept, be targeted by and interact with offensive game mechanisms and special game mechanisms. For instance, the light cover elements 650 each have: atomic, molecular, organic or other material compositions (e.g., grass, mud, stone, steel); mass; temperature; pressure; state of matter; specific heat associated with that material; pH; moles of reactants; electrical conductivity properties; electrical charge or ion density; magnetic field strength; reflectivity; and other material properties, as applicable. The properties of the light cover elements 650 are updated in response to offensive game mechanisms and special game mechanisms, as well as turn-based game mechanisms. For example, a tree stump that is hit by a thermal grenade catches fire, burns over a number of turns, and, during that time, reacts with airborne oxygen and emits water vapor, other gasses, heat and radiation.

The terrain elements 640 include reactive elements 652. The reactive elements 652 share many of the characteristics of light cover elements 650. For instance, the reactive elements 652 occupy space within the field of play, impact character mobility and partially block line of sight. The reactive elements 652 are also configured to intercept, be targeted by and interact with offensive game mechanisms and special game mechanisms. In addition, the reactive elements 652 have: atomic, molecular, organic or other material compositions (e.g., grass, mud, stone, steel); mass; temperature; pressure; state of matter; specific heat associated with that material; pH; moles of reactants; electrical conductivity properties; electrical charge or ion density; magnetic field strength; reflectivity; and other material properties, as applicable. However, unlike the light cover elements 650, the reactive elements 652 are configured (and specifically intended) to interact with via offensive actions, special actions and object interactions. In this way, the reactive elements 652 are a hybrid between the light cover element 650 and an enemy element. For example, the reactive elements 652 include containers of a certain mass of a solid element or compound, vats of a certain volume of solution, canisters of a certain pressure of gas, as well as erected structures with a certain structural composition, a circuit board of electronic elements with a certain functionality, a computer terminal possessing certain code, or a biological system embodying a certain process. Users are tasked with interacting with the reactive elements 652 to achieve a certain objective in-game. For example, the user may need to use an object interaction to close the lid on a vat of a liquid compound, creating a seal, and, then, use a laser radiation emitting gadget or an oxidation-reduction sprayer to transfer energy to the now-closed system of the vat until the temperature is increased enough that pressure builds and the vat to explode. Thus, the reactive elements 652 are a complex interactive element that present new challenges and combinations of challenges to the user, crosscutting concepts and driving strategic tradeoffs.

Figure 15:
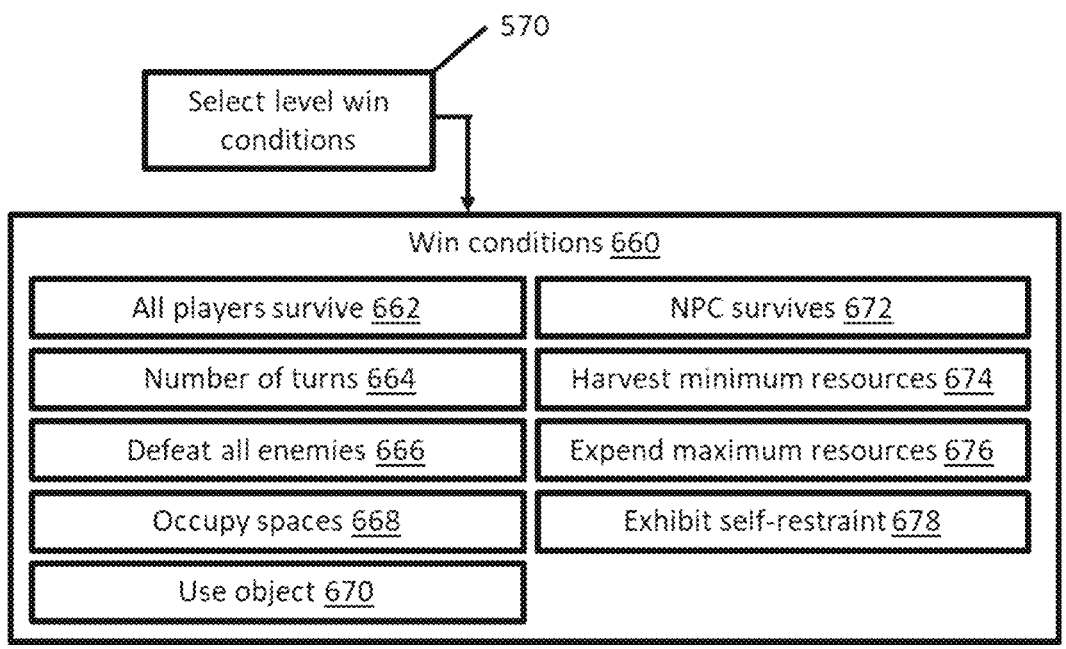
FIG. 15 is a block diagram of the step of selecting win conditions for the method of FIG. 11.

Referring back to FIG. 11, the server 126 selects level win condition(s) 570. Referring now to FIG. 15, win conditions 660 are a set of scenarios or level objectives that a user must accomplish in order to: first, successfully beat a level and, thus, unlock the next level or challenge; and, second, achieve a mastery score for the level and, thus, unlock upgrades, achievements, and additional learning objects. In the story mode, the win conditions 570 are pre-defined for the selected level based on the difficulty levels of the level. In the simulation mode, the win conditions 570 are selected procedurally based on the other inputs, and in view of the user's learning profile.

The win conditions 660 include a requirement that all players survive 662. The all players survive 662 scenario requires that all player characters sustain no deaths or grievous wounds or become disabled through the course of the level. If all user-controlled player characters survive through the end of the level (e.g., which may have a variety of other constraints and win conditions 660 that triggers the end), then the user successfully achieves the all players survive 662 win condition 660. The all players survive 662 forces the user to achieve a minimum combination of knowledge mastery and strategic interaction mastery in-game.

The win conditions 660 include a number of turns 664 scenario. The number of turns 664 scenario has two variants, including a maximum number of turns version (e.g., that are permissible to complete the other win conditions) and a minimum number of turns version (e.g., to survive). Each variant emphasizes a different level of mastery. In the maximum variant, the number of turns 664 scenario forces the user to achieve a significant mastery ability and complete the level quickly through cunning and mastery of movement actions, offensive actions, object interactions, character traits, narrative elements and story supplements. In the minimum variant, the number of turns 664 scenario forces the user to operate efficiently or survive through cunning and mastery of movement actions, defensive actions, terrain interactions and turn-based effects. In both cases, the number of turns 664 imposes a constraint that intensifies the game play experience, drives strategic tradeoffs and ensures a minimum amount of interactions with learning objectives.

The win conditions 660 include a defeat all enemies 666 scenario. The defeat all enemies 666 scenario requires the user to overtake and conquer all enemy characters on the level map. While users may find that it is convenient, easier and/or enjoyable to clear a level and defeat all enemies, the defeat all enemies 666 scenario is not one of the win conditions 660 for all levels and, in fact, attempting to best all enemies may be impossible, incredibly difficult or frustrate other scenarios. The defeat all enemies 666 scenario drives the user to interact with offensive actions and defensive actions.

The win conditions 660 include an occupy spaces 668 scenario. The occupy spaces 668 scenario requires the user to move one or more of the player scenarios into one or more of the spaces on the level map. For example, the user may be tasked with moving a single player character onto a single square (e.g., on the far side of the level map), or the user may be tasked with moving multiple characters into an area of the map (e.g., moving all player characters through a door and onto squares on the other side of the threshold). The occupy spaces 668 scenario drives the user to interact with movement actions.

The win conditions 660 include a use object 670 scenario. The use object 670 scenario requires the user to navigate the level map and, then, use one or more object elements via an object interaction. For example, in the use object 670 scenario, the user is tasked with moving a player character next to a switch and, then, activating the switch (e.g., to turn off a piece of enemy equipment or disable an enemy spawn point). Activating the switch may immediately end the level, in which case the user will need to achieve any other win conditions 660 prior to the object interaction, or it may merely be an intermediate step in the level. The use object 670 scenario drives the user to interact with object elements and engage with learning objects such as scientific process objects and context objects.

The win conditions 660 include an NPC survives 672 scenario. The NPC survives 672 scenario requires the user to intercept, defeat or redirect enemies away from an NPC character in a way that the NPC character survives to the end of the level. The NPC survives 672 scenario creates an additional target that the user needs to defend, increasing the player characters' vulnerabilities to attack and necessitating mastery of strategic tradeoffs. In some embodiments, the NPC survives 672 scenario involves an NPC that is relatively static on the map (e.g., working on some scientific experiment in a lab). In other embodiments, the NPC survives 672 scenario involves an NPC that moves across the map autonomously (e.g., requiring an escort). Based on the level map, the location of terrain features, objective elements, enemy elements and so on, the NPC survives 672 scenario is well suited to intensify the game play experience and force deeper engagement with the learning objectives.

The win conditions 660 include a harvest minimum resources 674 scenario. The harvest minimum resources 674 requires the user to gather a minimum quantity of energy (e.g., electrical, chemical, kinetic, potential, etc.) and/or resources (e.g., elements, molecules and compounds, generally specified as being in solid, liquid or gaseous form; data inputs or samples; biological materials; and other objects) from enemy characters, terrain elements and object features. The harvest minimum resources 674 scenario forces the user to repeatedly take measurements and sample resource extraction efficiency, promoting engagement with learning objects such as the scientific process objects.

The win conditions 660 include an expend maximum resources 676 scenario. The expend maximum resources 676 scenario requires the user to minimize and efficiently take actions that expend resources. For example, the use of offensive actions (e.g., electro-magnetic pulse grenade, an oxidation-reduction sprayer, etc.) are configured to expend resource reserves (e.g., electrical charge, moles of reactant atoms, etc.). In the expend maximum resources 676 scenario, the user is tasked with thinking creatively and operating analytically in order to achieve high levels of efficiency. The expend maximum resources 676 scenario is a heightened constraint that drives the user to engage with the learning objectives more deeply and achieve mastery. The expend maximum resources 676 scenario is configured to task the user with demonstrating great mastery of enemy behavior (e.g., game AI), often developed through extensive experimentation and discovery.

The win conditions 660 include an exhibit self-restraint 678 scenario. The exhibit self-restraint 678 scenario requires the user to voluntarily refrain from using certain actions. The exhibit self-restraint 678 scenario is explicitly issued as a way to enhance the challenge of the level, or the exhibit self-restraint 678 scenario is provided through subtle cues from the narrative elements, in-game dialog and story elements, character backgrounds and other information that indicate the user should avoid taking certain actions (e.g., not taking a single offensive action during a level, avoiding the use of interactive elements, etc.) to engage users with learning objects like the student engagement objects and the context objects.

The win conditions 660 are generally presented in groups of three. One or more of the win conditions 660 is a primary scenario which must be accomplished to unlock the next level. The other win conditions 660 are secondary scenarios, which are optional. However, the educational game is configured so that a user who successfully achieves the other win conditions 660 will unlock learning objects, unlock achievements or receive other benefits and bonuses.

For example, a given level may require that the user activate a switch to open a door per the use object 670 scenario, navigate across the level map and clear the threshold of the door per the occupy spaces 668 scenario, and do so in under five turns per the number of turns 664 scenario. Upon activating the switch and clearing the door threshold, the user is granted access to the next level. However, if the user successfully navigates the level map in under five turns, an achievement like a new career profile for a character is unlocked. Thus, the win conditions 660 drive different strategic tradeoffs and different game play choices that crosscut concepts and drive deeper engagement with the learning objectives. The incremental difficulty of achieving all win conditions 660 to unlock achievements and learning objects also drives repeat play, promotes experimental thinking and creates additional opportunities for systems thinking and learning.

Referring back to FIG. 11, the server 126 selects narrative framework 572. The narrative frame 572 is a dynamically configurable hierarchy of topics that need to be conveyed to the user as they play the educational game. The narrative frame 572 adapts, based on the user learning profile, to ensure that the game experience remains fresh and engaging so that the user is not subjected, on the one hand, to redundant and stale content or, on the other hand, to unfamiliar challenges or confusing content. The narrative frame 572 is unified across story mode and simulation mode. For example, when a new user starts playing the story mode, the narrative frame 572 is configured to explain how to interact with the interface, how to navigate the level map and what the player character's motivation is to proceed through basic plot elements that provide context and meaning. This includes cut-scenes and out-of-game supplemental narration to cover the significant scope of topics in a minimal footprint. Once the user progresses in the game and successfully demonstrates an understanding or mastery of this initial knowledge, the narrative frame 572 is updated to focus more on what the broader context of the game universe is, why the characters are important and what deeper scientific knowledge or understanding will help the user succeed and progress toward mastery of the learning objectives. As another example, if the user selects a simulation mode challenge that necessitates the use of an item, object or game mechanism that the user has not unlocked in story mode (e.g., if assigned by a teacher out of order from the story mode), the narrative frame 572 will be updated to include, at least, minor tutorials to explain the new item, object or game mechanism. After the narrative frame 572 has conveyed topics enough times (e.g., two three times depending on the user's successful demonstration of understanding), then the narrative frame 572 adjusts to present new narrative frame 572 elements to avoid redundancy and explain more of the game and the game world. Accordingly, the narrative frame 572 progresses and matures with the user's progress to reveal deeper aspects of the game world, the characters and the learning objects. In addition, the narrative frame 572 is configured to guide the user into and sustain a flow state, thereby, promoting longer and more focused game play with greater learning outcomes.

Next, the server 126 selects story elements 574. The story elements 574 are a dynamically configurable hierarchy of game information and learning objects, including student engagement objects (and, in particular, game story objects like dialog), context objects, scientific method objects, prioritization objects, and subject matter knowledge objects, presented as lines of character dialog and character reactions (e.g., triggered by an activity in game) in-game. The story elements 574 are selected based, in part, on the user learning profile, the narrative frame 572, the selected level mode 552, 554, the selected mission format 560, the selected level map 562 and the selected level win conditions 570. The story elements 574 are configured to embody the narrative frame 572 and embed it within the context of the player characters' backgrounds and personalities and the game world. The story elements 574 are also configured to guide the user into and sustain a flow state, thereby, promoting longer and more focused game play with greater learning outcomes.

The server 126 selects an initial level design 576. The initial level design 576 is the compilation of all of the previously selected items from the learning objects through the story elements in the form of a built level map with initial starting locations for the player characters and situated enemy elements, objective elements, terrain elements and so on. The initial level design 576 is compiled based on the mission format and win conditions and is narratively framed with story elements that the user will experience while playing the designed level.

Figure 16:
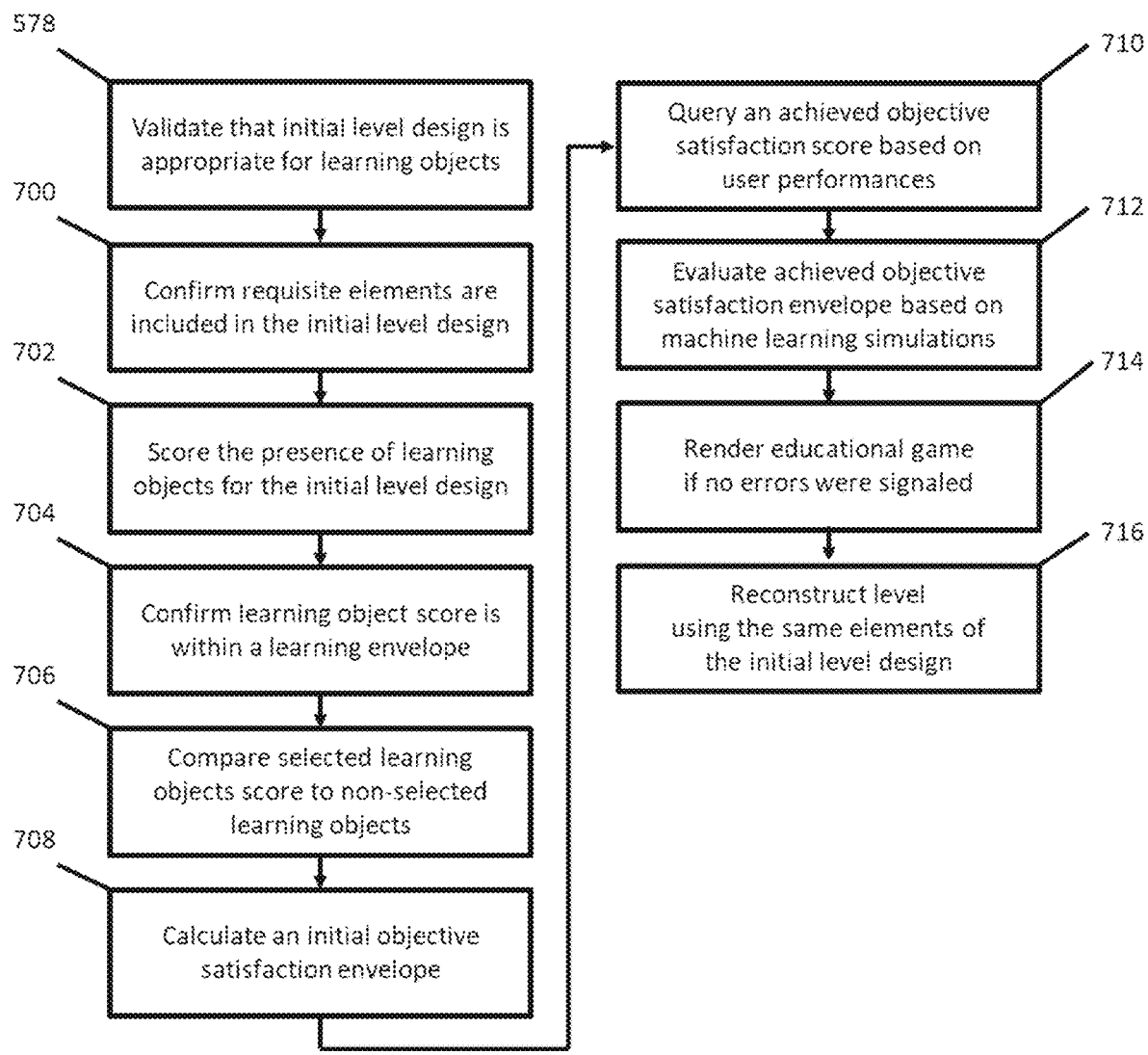
FIG. 16 is a flow diagram of the step of validating dynamically generated levels of the method of FIG. 11.

Next, the server 126 validates that the level design is appropriate for the learning objective(s) 578. Referring now to FIG. 16, a method of validating that the initial level design is appropriate for the learning objects 578 is shown.

The server 126 confirms requisite elements are included in the initial level design 700. Any given level requires certain minimum conditions hold, such as the presence of a minimum or maximum number of elements. This includes the retrieval of at least one level map, at least one player characters, at least one enemy element, at least one objective elements, and so on. For any given level, there are minimum and maximum thresholds defined. In addition, specific elements impose other constraints that refine the minimum and maximum thresholds, like a specific level map requires between 2 and 10 elements and another level map requires between 20 and 40 elements to ensure that the constructed level is appropriately populated to create an engaging and effective game experience based on the size of the level map. Moreover, the requisite elements include narrative framework elements and story elements (e.g., combined to form a story arc) that must be touched upon in the given level in story mode to ensure continuity of story and appropriate context. Similarly, some enemy elements impose constraints like aquatic enemies are only allowable in levels with water-based environmental elements, and fire-based enemy elements are only allowable in levels with combustion-related learning elements. The confirmation step 700 is a computationally efficient and fast means to ensure that the retrieved elements have a high likelihood of constructing an educational game experience that is fun, engaging and effective at conveying the learning objects.

The server 126 scores the presence of learning objects for the initial level design 702. Each retrieved element in the level design is assigned a multi-factor weighted matrix of values for the retrieved element's presence and proximity in the game. The matrices from all retrieved elements are then aggregated using a scoring algorithm to form a master matrix score for the level design. For example, the inclusion of one basic enemy element (e.g., a grunt) is worth a few points of challenge or difficulty, a few points of user engagement, and a few points of engagement with certain learning objects, but more advanced enemy elements (e.g., super grunts) are worth more points of challenge and engagement with some dimensions of those learning objects. Objective elements, terrain elements, and other game elements, as well as the respective positioning of those elements and the formation of bottlenecks or imbalanced line of sight and cover are similarly scored. The proximity and interaction between elements is also scored. The master matrix score creates a baseline assessment of difficulty, engagement and learning efficacy of the level design that is also a computational efficient and fast means to ensure a reasonable likelihood of constructing an appropriate implementation of the educational game.

The server 126 confirms that a learning object score is within a learning envelope 704. Since the educational game is primarily intended to educate, it is of primary importance to evaluate the level design for its learning qualities. This step 704 compares the aggregated score from the master matrix to the learning envelope (e.g., a minimum and maximum score) in view of the learning profile of the user.

The server 126 compares selected learning object scores to non-selected learning objects 706. Since the educational game is primarily intended to educate the user about a specific learning object, it is also important to evaluate the level design for its dominant, perceived learning qualities in relation to all possible learning objects and learning outcomes. For example, this step 706 compares the scores from the master matrix for the focal (or targeted) learning object to the scores of other learning objects. If the score of the focal learning object is not the highest scored learning object by at least twice, then an error signal is issued. And, if the score of the focal learning object is not at least equal to the sum of all other learning objects, then an error signal is generated. This step 706 ensures that the user experiences a progression of focused and incrementally building content.

The server 126 calculates an initial objective satisfaction envelope 708. The initial objective satisfaction envelope is an estimated range of the user's efficiency scores for successfully completing the level via use of and engagement with the focal learning objects. The initial objective satisfaction envelope can be set in a lax manner (e.g., to be wide) or an aggressive manner (e.g., to be narrow and biased toward optimal level performance) based on the selected difficulty level. This step 708 ensures that the user experiences the focal learning objects and does not leverage strategic alternatives in the game that could allow the user to avoid the focal learning objects.

The server 126 queries an achieved objective satisfaction score based on user performances 710. This step 710 crowdsources the play of the level design to a pool of users to gather accurate data on how the level is experienced by real users. The efficiency scores of the users are then compared to the initial objective satisfaction envelope in view of the learning profiles of the users. If too great a percentage of the efficiency scores fall outside of the initial objective satisfaction envelope or too great a percentage of efficiency scores fall outside of one side of the initial objective satisfaction envelope, an error signal is issued. This step 710 stochastically validates that the user (e.g., based on the user's learning score) is likely to experience the focal learning objects of the level design, while allowing some flexibility to exceed expectations or fail to complete the level.

The server 126 evaluates the achieved objective satisfaction envelope based on machine learning simulations 712. Given the large number of potential permutations of level designs, the levels are also tested using simulated objective scores achieved by machine learning proxy players. The machine learning approach enables thousands of simulations to be run and compared to identify minimum/maximum score potential that are consolidated into highly efficient algorithms or rules of evaluating level designs. The machine learning algorithms are conditioned on a training set that includes the master matrix, scoring algorithms and the achieved efficiency score for a level. The machine learning algorithms are supervised using the crowdsourced user data of actual user play from the pool of users. And the machine learning algorithms are deployed in simulated play of level designs to mature and refine the game play strategy via reinforcement learning. If too great a percentage of the efficiency scores achieved from the simulated trials fall outside of the initial objective satisfaction envelope or too great a percentage of the efficiency scores fall outside of one side of the initial objective satisfaction envelope, an error signal is issued. This step 712 stochastically validates that the user (e.g., based on the learning profile of the user) is likely to experience the focal learning objects of the level design, while allowing some flexibility to exceed expectations or fail to complete the level.

The server 126 checks for the issuance of error signals and proceeds to render the educational game if no errors were signaled 714. However, if any errors were signaled by the preceding steps (e.g., steps 700 through 712), then the server 126 will attempt to reconfigure or redraw the level design until an acceptable and appropriate configuration is achieved. For instance, the server 126 reconstructs the level using the same elements of the initial level design 716. This step 716 reallocates elements around the level map to find a configuration that is better suited to the user. For example, if the initial level design was too difficult or strenuous, the enemy elements are spaced further apart or the elevation elements are placed more centrally to buy the user more time to recover between waves of interactions with enemy elements. Alternatively, if the initial level design was too easy or fails to engage the user with enough of the learning objects, the enemy elements is spaced closer together and light cover elements are repositioned to the outside of the level map. Reconstructing the level using the same elements of the initial level design 716 enables a fast and minimal compute means to reconfigure the level design to make it appropriate for the user. Then, the server 126 repeats the selection of retrieved content 720. This step 720 redraws the elements and configures the elements in a new manner until an appropriate level design is achieved. Once a satisfactory result is achieved, the server 126 constructs an educational game with curriculum-based game mechanisms 580.

It will be appreciated that the level construction process is iterative and self-updating. While the number of dynamically generated levels is large, there are commonalities and parallels across formats and combinations of game elements that emerge. The use of three interrelated approaches (e.g., scoring algorithms, crowdsourced play behaviors of many users and machine learning algorithms) provides feedback between the approaches to refine the level design process, reduce compute loads and expedite the validation process. Each approach considers and balances game difficulty with learning difficulty per the method of creating sequences of learning objects (see FIG. 9). The three interrelated approaches also impose a combination of designer-driven constraints, user behavior-driven constraints and mathematically-driven constraints, respectively. Combined, the three interrelated approaches present a novel means of validating instances of the educational game that is, itself, dynamic and adaptive to individual user needs and capabilities.

Referring once again to FIG. 11, if the server 126 cannot successfully validate that the level design is appropriate for the learning objects(s) (step 578), the server 126 updates the learning profile 718. The learning profile of the user is updated 718 to note that a prior attempt to create an appropriate level design failed to yield a satisfactory result. Accordingly, a seed value is updated or other data is added to the learning profile so that a new draw of game elements will be achieved by the next level design. Then, the server repeats the step of selecting retrieved content 550.

However, if the level design is appropriate for the learning objects (step 578), the server 126 constructs an educational game with curriculum-based game mechanisms 580 as previously described (e.g., see FIGS. 4 and 5).

Figure 17:
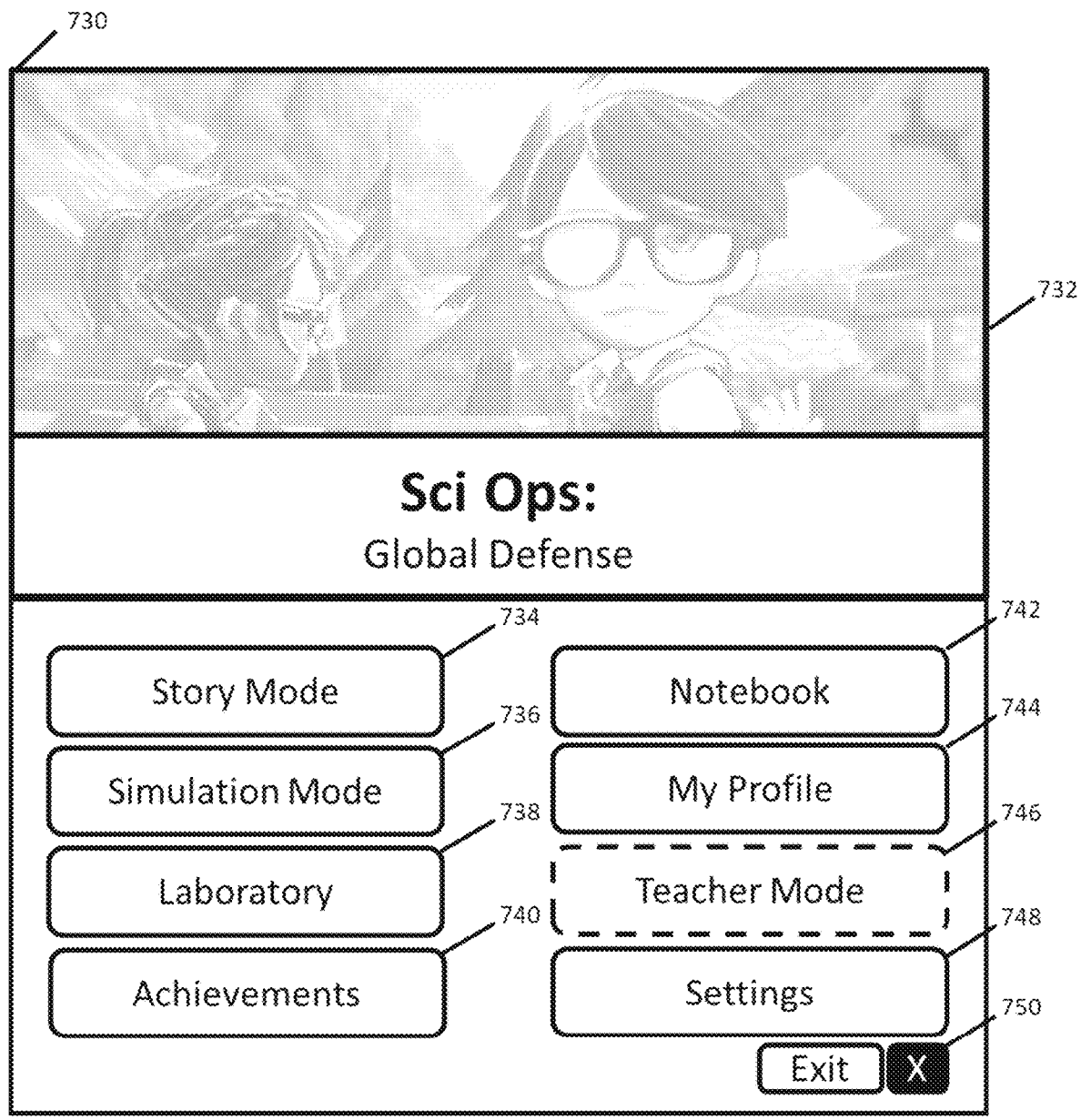
FIG. 17 is an illustration of a user interface of a start menu for the educational game.

Referring now to FIG. 17, an illustration of a user interface of a start menu 730 for the educational game is shown. The start menu 730 includes a title panel 732. The title panel includes a graphic and a title name. The title panel 732 is configured to display first and to require a user input (e.g., "Press any key to continue") to reveal the other menu options.

The start menu 730 includes a story mode 734 button. The story mode 734 initiates the educational game in a primary play mode in which the user is provided a combination of narrative frameworks and story elements, game play and learning objects. As the user plays through the story mode 734, new game mechanisms, learning objects, achievements, and other items are unlocked.

The start menu 730 includes a simulation mode 736 button. The simulation mode 736 initiates the educational game in a secondary play mode in which a user is able to select from a number of challenge levels with complex puzzles and game interactions, and to generate custom levels and procedurally generated levels to test the user's skills and abilities. In one embodiment, the simulation mode 736 is disabled until the user completes a minimum portion of the story mode 734 to ensure that the user is familiar with enough of the game mechanisms and game elements to provide compelling, but not overwhelming, game experiences.

The start menu 734 includes a laboratory 738 button. The laboratory 738 is the primary repository of learning objects in the educational game. In the laboratory 738 area, the user learns about scientific principles, historical trends and other information related to the learning objects of the educational game. The laboratory 738 area also includes unlocked narrative elements and unlocked story elements from the educational game so the user can repeat the story arc of the educational game without replaying all of the levels. The laboratory 738 is configured to display only some of the items and game mechanisms based on what the user has unlocked (e.g., from in-game play). The laboratory is also configured to allow the user to select a team of player characters, equip gear and upgrade items and so on.

The start menu 734 includes an achievements 740 button. The achievements 740 button is configured to load the achievements area, which is the primary repository of industry and career information in the educational game. In the achievements 740 area, the user learns about different kinds of scientists, engineers, computer programmers, mathematicians, statisticians and other professionals who support technical roles in the STEM fields (e.g., patent attorneys) who contribute to the scientific process and help deploy technology. The achievements 740 area is integrated with narrative frameworks and story elements from the educational game to explain the achievements 740 area to the user and to tie the content of the achievements 740 area to the game world. The achievements 740 area is configured to display only some of the content items based on what the user has unlocked (e.g., from in-game play). The achievements 740 are also configured to allow the user to select upgrades and modifiers. For example, once the user has unlocked a career profile from the achievements 740 area, the user selects up to three career profiles at the beginning of a level. By selecting the career profiles, the user chooses which STEM professionals from the extended network of the player characters are helping the player characters in the level ahead. In terms of in-game effect, the player characters are imparted with certain benefits, bonuses or modifiers that relate to the career profiles of the STEM professionals. For example, the achievements 740 area is configured so that a user can select (e.g., equip) the career profile of: a laser scientist to improve the range or maximum energy potential of a laser radiation gadget (e.g., offensive modifiers); a mechanical engineer with a background in material science to augment or modify armor with thermal fins or a polish (e.g., defensive modifiers); or a turbine engineer to improve the movement range or refresh rate of a compressed air jetpack (e.g., movement modifiers).

The laboratory 738 area and the achievements 740 area have a number of interactions. For example, the laboratory 738 area and the achievements 740 area are configured so that user activity in one unlocks new content items and features in the other. The laboratory 738 area and the achievements 740 area are configured to include links and references to one another to guide user exploration across both areas. The user's performance in the educational game and ultimate mastery of learning objects from the educational game is determined, in part, on the user's engagement with and mastery of the content within the laboratory 738 area and achievements 740 area.

The start menu 734 includes a notebook 742 button. The notebook 742 area is configured to provide the user with space to record notes, pin learning objects, copy formulas and the like. For example, the notebook 742 is configured with word processing and calculator functionality so that the user can engage with the learning objects and transmit that engagement to outside of the game, for example to study from or share with parents and teachers.

The start menu 734 includes a user profile 744 button ("My Profile"). The user profile 744 button leads to the user profile area which includes information about the user and the user's performance within the educational game. For example, the user profile area reports information about total time played, levels completed, efficiency scores achieved, energy and resources harvested, enemies defeated, percentages of learning objects unlocked, learning styles, possible career interests, and so on. In one embodiment, the user profile area lacks any account reset capabilities so that the account is locked-to and grows-with the user. The educational game is configured so that the user can access and revisit the story arc and learning objects through other means (e.g., in the laboratory area). If the user wishes to replay the educational game from scratch, the user is required to create a new account. The second account can then be compared to the first account to see how the user's performance and learning style has changed over time.

The start menu 734 includes a teacher mode 746 button. The teacher mode 746 button and the teacher mode are disabled for most users and require a special teacher account to access. The educational game is configured so that teachers (as well as tutors and homeschool parents, and other parents who sign up for this access) can access the teacher mode 746 to create class profiles, invite students to join a class, send notifications to users in the class, issue assignments or challenges to users in the class, track student performance (individually and by class), and explore student information such as learning style preferences and at risk indicators.

The start menu 734 includes a settings 748 (or options) button. The settings 748 button leads to a settings area that is configured to allow the user control over visual or graphic display options (e.g., resolution), audio options (e.g., music mix), notifications and the like.

The start menu 734 also includes an exit 750 button, which is configured to allow the user to exit the educational game and return to the desktop of the user device.

Figure 18:
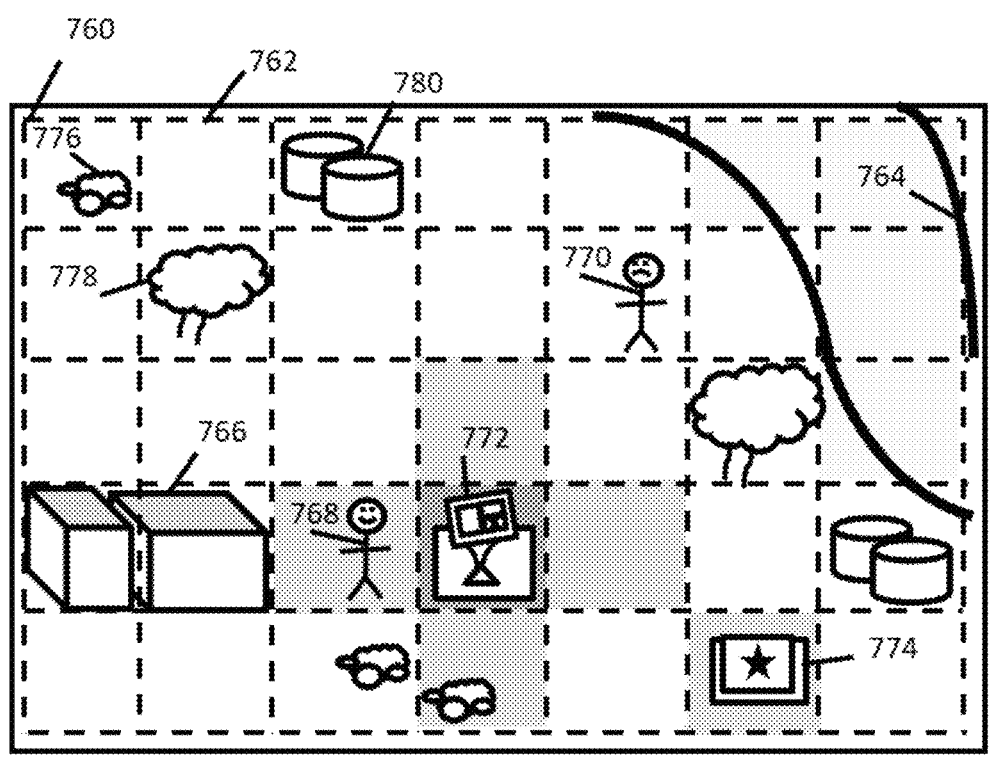
FIG. 18 is an illustration of a game level for the educational game.

Referring now to FIG. 18, an illustration of a game level 760 for an educational game is shown. For example, if a user selected the story mode option from the start menu, the game level 760 would be displayed. The game level 760 includes a number of game elements, such as a level map 762 made up of a grid of spaces (e.g., 5×7). In one embodiment, the spaces are square. However, the spaces can also be configured to be hexagonal and other shapes. Each space of the level map 762 is configured with separate but interacting characteristics and properties based on real scientific principles. The educational game can also have a freeform level map (e.g., without squares), but the incremental nature of a space-based level map improves the clarity and ease of comprehending the complexity of the simulated level and mitigates the computational complexity of a freeform level map.

The game level 760 includes environmental elements, like a river 764 and hills 766, that occupy certain spaces. Some of the environmental elements occupy spaces, render the spaces impassable and block line of sight. Other environmental elements partially impact the space and, thus, modify movement and line of sight. Each environmental element is configured with certain characteristic and property modifiers based on real scientific principles.

The game level 760 includes a player character 768. The player character 768 is a user-controlled protagonist that is configured to navigate the level map 768 and interact with other game elements using actions and game mechanisms based on real scientific principles.

The game level 760 includes an enemy element 770. The enemy element 770 is computer-controlled and operates according to enemy-type specific artificial intelligence and behaviors. The enemy element 770 is configured to navigate the level map 762 and interact with other game elements using actions and game mechanisms based on real scientific principles.

The game level 760 includes interactive elements, including a power node 772 and a switch 774. The power node 772 is configured to modify the interactions of a player character in an adjacent space (e.g., player character 768). For example, the power node 772 is configured to provide the player character 768 with additional energy reserves while the player character 768 is within the range of interaction with the power node 772. The switch 774 is configured to modify the field of play by activating or deactivating various game elements. The switch 774 is configured to be actuated by a player character or enemy element only when the player character or enemy element is in the same space. For example, the switch 774 is unoccupied by either the player character 768 or the enemy element 770 and, thus, neither can activate the switch 774 without navigating across the level map 762 to where the switch 774 is located.

The level map 760 includes terrain elements, like dirt piles and rubble 776 and trees 778. Each terrain element is configured to occupy a space, partially block line of sight and, thus, intercept offensive mechanisms as cover, and so on. Each terrain element is configured with certain characteristic and property modifiers based on real scientific principles.

The level map 760 includes light cover elements, like oil drums 780, crates and canisters. Each light cover element is configured to occupy a space, partially block line of sight and, thus, intercept offensive mechanisms as cover, and so on. Each light cover element is configured with certain characteristics and property modifiers based on real scientific principles.

The level map 760 shown in FIG. 18 is merely an illustration of how the educational game is laid out. Much more complex level maps with larger fields of play, more game elements and more potential interactions is envisioned.

Figure 19:
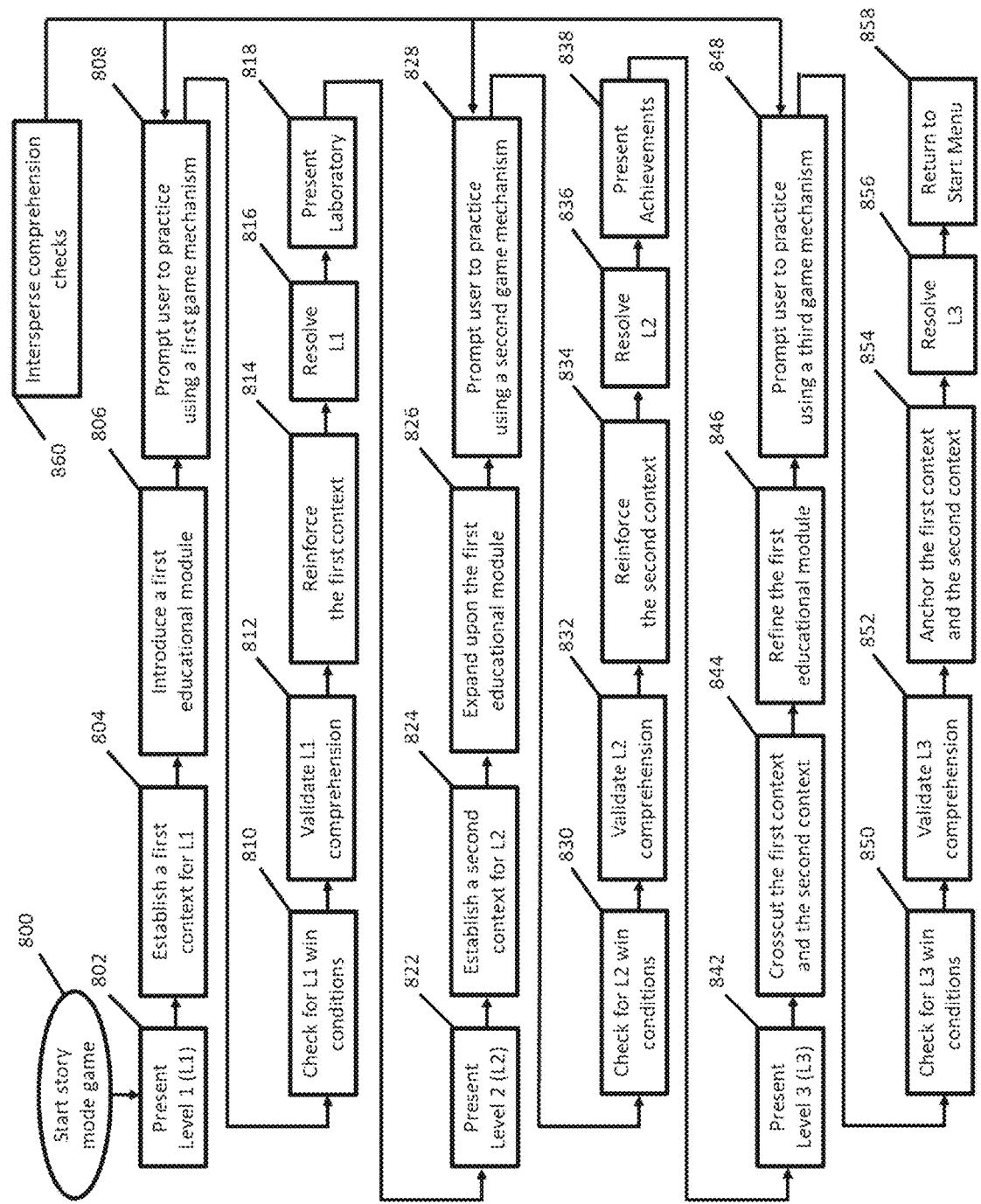
FIG. 19 is a flow diagram of a method of teaching educational curriculum using multiple levels in the educational game.

Referring now to FIG. 19, a method of teaching educational curriculum using multiple levels in an educational game is shown. The method is performed by the server 126 through the educational game it presents to the user on the user device. For illustrative purposes, the method starts when a user selects and starts a story mode game 800. The story mode is initiated from the start menu or from the end of a prior story mode game.

The server 126 presents a first level, Level 1 (L1) 802, to the user via the user device. Level 1 is a level with a level map, player characters, enemy elements and a variety of game other elements. Level 1 also includes narrative framework elements and story elements that are selected and constructed as previously discussed.

In Level 1, the server 126 establishes a first context for the first level 804. The first context provides a motivation for the game level and, in particular, the learning object of the first level. The first context is configured to embed the learning object within the narrative framework and story elements that are thematically aligned to and grounded in real world examples, industry context and career applicability. For example, the first context is a grand challenge, like climate change.

The sever 126 introduces a first educational module 806. The first educational module is one of the core learning objectives of the educational curriculum as embodied by the educational standards. For example, the first educational module is a high-level definition of the atomic model with an illustration or simulation of the Bohr model of the atom.

The server 126 prompts a user to practice using a first game mechanism 808. Specifically, the user is prompted to start playing the first level, Level 1. As the user plays through Level 1, the user is confronted with enemy elements and other game elements that will force the user to interact with the game mechanisms aligned to the first educational module. Strategic tradeoffs embedded in Level 1 encourage the user to think systematically and strategically about the utility and application of the first educational module based on how the game mechanisms allow the player characters to navigate Level 1. For example, the user is presented with a set of game mechanisms that include an offensive action to invoke an electromagnetic radiation laser gadget that embodies the properties of the Bohr model of the atom and related scientific principles.

Then, the server 126 checks for the first level win condition(s) 810. If the user has failed to successfully utilize the first game mechanism correctly and failed to clear the challenges of the first level, the server 126 will prompt the user to retry the first level. Otherwise, if the user was successful, then the educational game will proceed.

The server 126 validates comprehension of the first level 812. The user is presented with a question and prompted to make a response based on the first context and/or the first learning object. The server 126 provides feedback based on the response. For example, in-game dialog confirms the response of the user or provide corrective input.

The server 126 reinforces the first context 814. The educational game draws parallels between the user's use of the first game mechanism (and, by association, the learning object), the win condition for the first level (the in-game effect), and the first context (the broader context). This step 814 ties the learning objects to the overall game experience.

Then, the server 126 resolves the first level 816. The narrative framework and story elements are advanced with a degree of closure for the story arc of the level, such as through end-of-level dialog, and the educational game continues.

The server 126 then presents the laboratory 818 area. In one embodiment, the educational game is configured to unfold one level after the next without a break outside of the levels. However, during the earliest levels of the game as part of the tutorial, the educational game is configured to direct users to other game modes and areas, like the laboratory area, to introduce the user to the laboratory area, explain what information and features are accessible in the laboratory screen, and show how to navigate in and out of the laboratory area.

Next, the server 126 presents a second level, Level 2 (L2) 822. The second level is, in general, consistent in setting, aesthetic and auditory tone with the first level in order to create an immersive and resonant experience that is configured to have sufficient continuity to keep the user's attention on the learning objects of the educational game. For example, if the first level is a lightly forested field with small creek, the second level is also forested with a water element. The music and sound effects also remain consistent and similar.

The server 126 establishes a second context for the second level 824. The second context provides a motivation for the game level and, in particular, the learning object of the second level. The second context is configured to embed the learning object within the ongoing narrative frame and story elements that are thematically aligned to and grounded in real world examples, industry context and career applicability. The second context is related to or intentionally contrasted from the first context. For example, the second context is a more approachable issue (i.e., as compared to the enormity of climate change) like localized pollution of watersheds and habitat.

The server 126 expands upon the first educational module 826. The first educational module is a complex and multi-faceted learning object that requires significant explanation to cover, fully. Expanding upon the first educational module through successive explanation allows the complexity and nuance to be broken down into smaller increments. Moreover, when informed by user preferences based on the learning profile of the user, the successive explanations are configured to the specific learning style needs and preferences of the user, thereby, providing a personalized learning experience. For example, the first educational module is expanded with more broader discussion of the atomic model, more information about the Bohr model and its historical discovery, and examples of how the Bohr model differs for different focal elements (e.g., Helium vs. Hydrogen).

The server 126 prompts the user to practice using a second game mechanism 828. In view of the expanded knowledge of the educational module, the second game mechanism is generally a more elaborate, more complex or more functional version of the first game mechanism. For example, the second game mechanism is an electro-magnetic radiation gadget that expands the controllable range of the Bohr model to include higher electron shells (e.g., n=5 and n=6), improving the maximum energy output and the precision of the offensive action. In this example, the second game mechanism has in-game effects such as different visual cues and animations to reinforce how the second game mechanism differs from the first game mechanism, even though they are closely related and building from each other.

The server 126 checks for the second level win condition(s) 830. If the user has failed to successfully utilize the second game mechanism and failed to clear the challenges of the second level, the server 126 will prompt the user to retry the second level. Otherwise, if the user was successful, then the educational game proceeds.

The server 126 validates comprehension of the second level 832. The user is presented with a question and prompted to make a response based on the second context and/or the second learning object. The server 126 provides feedback based on the response. For example, in-game dialog confirms the response of the user or provide corrective input.

The server 126 reinforces the second context 834. The educational game draws parallels between the user's use of the second game mechanism (and, by association, the learning object), the win condition for the second level (the in-game effect), and the second context (the broader context). This step 834 ties the learning objects to the overall game experience.

Then, the server 126 resolves the second level 836. The narrative frame and the story elements advance with a degree of closure to the second level, such as through end-of-level dialog, and the educational game continues.

The server 126 then presents the achievements area 838. As discussed above, in one embodiment, the educational game is configured to unfold one level after the next without a break between or departure from the levels. However, during the earliest levels of the educational game as part of the tutorial, the educational game is configured to direct users to other game modes and areas, like the achievements area, to introduce the user to the achievements area, explain what information and features are housed in the achievements area, and show how to navigate in and out of the achievements area.

Next, the server 126 presents a third level, Level 3 (L3) 842. The third level is, in general, consistent in setting, aesthetic and auditory tone with the second in order to create an immersive and resonant experience that is configured to have sufficient continuity of experience to keep the user's attention on the learning objects of the educational game. However, with each additional level, the educational game diverges further from the first level, creating a tonal arc to the level designs and the game experience.

The server 126 crosscuts the first context and the second context 844. Crosscutting the first context and the second context draws forth parallels between the subjects and illuminates differences. In the examples used above, the first context (climate change) and the second context (pollution) are tied together to demonstrate how they are both major issues facing society that are substantiated with similarly vast research and support, but also contrasted in terms of tangible immediacy, scale of impact and ease of intervention.

The server 126 refines the first educational module 826. The first educational module is a complex and multi-faceted learning object that requires significant explanation to cover, fully. Refining the first educational module 826 allows for in-depth consideration of the focal concept, the contextualized presentation of complex formulae and introduction of scientific variables and constants after the user has achieved a minimum understanding of the first educational module from the prior levels. Refining the first educational module 826 also provides an opportunity to draw connections back to prior related concepts or learning objects and to foreshadow future, related concepts or learning objects. Moreover, when informed by user preferences based on the learning profile of the user, the final explanations is configured to the specific learning style needs and preferences of the user, thereby, providing a personalized learning experience that delays the most complex materials or most difficult presentation of materials based on the user's learning styles. For example, the first educational module is refined with detailed equations of Bohr's model of the atom, the relation of energy to wavelength and frequency, and the introduction of Plank's constant.

The server 126 prompts the user to practice using a third game mechanism 848. In view of the refined knowledge of the educational module, the third game mechanism is generally a more demanding version of the first game mechanism. For example, the third game mechanism is an electromagnetic radiation gadget that requires the user to calculate the amount of energy required to excite atoms within the gadget or the amount of energy irradiated by the excited atoms of the second game mechanism.

The server 126 checks for the third level win condition(s) 850. If the user has failed to successfully utilize the third game mechanism and failed to clear the challenges of the third level, the server 126 prompts the user to retry the third level. Otherwise, if the user was successful, then the educational game proceeds.

The server 126 validates comprehension of the third level 852. The user is presented with a question and prompted to make a response based on the crosscutting of the first context and the second context, and/or the learning objects. The server 126 provides feedback based on the response. For example, in-game dialog confirms the response of the user or provides corrective input.

The server 126 reinforces the third context 854. The educational game draws parallels between the user's use of the game mechanisms (and, by association, the learning object), the win condition for the third level (the in-game effect), and the third context (the broader context). This step 854 ties the learning objects to the overall game experience.

Then, the server 126 resolves the third level 856. The narrative frame and the story elements advance with a degree of closure to the third level, such as through end-of-level dialog, and the educational game continues.

While the user practices the game mechanisms 808, 828, 848 throughout the first level, the second level and the third level, the server 126 is configured to intersperse comprehension checks 860. The comprehension checks ensure that the user is engaged and understands the learning object or the interface of the educational game. The educational game is configured to intersperse the comprehension checks based on the learning objects of the level, the learning profile of the user and the output of the engagement module. For example, the engagement module may indicate that the user is stuck in the laboratory and unable to navigate back to play the second level. In this instance, a notification is generated to check if the user would like to return to the story mode and show the user how to do so. In one embodiment, some comprehension checks are built into the initial levels of the game in the form of tutorials. After the tutorial period, the comprehension checks are infrequent. However, if the user has not logged into the game in a while (as indicated by the engagement module), the comprehension checks are re-activated to provide intervention and guidance to get the user back into the flow of the educational game.

In one embodiment, the comprehension checks are configured to test the user's knowledge of the learning objects in advanced difficulty modes. For example, the educational game prompts the user with a knowledge-based comprehension check between every few actions or at the end of every level. In this way, the rate of testing of comprehension is quite high, while sustaining the engagement of the user through the game play experience. The user is incentivized to engage in these comprehension checks by rewards of higher potential efficiency scores, greater resource harvesting opportunities, or in-game bonuses and buffs.

In view of the sequencing of learning objects and the progressive reveal of educational modules and learning objects across the illustration of three levels, it will be appreciated that the educational game is configured to selectively foreshadow learning objects, giving the user a glimpse of concepts-to-come while still practicing and mastering the current learning objects and the associated in-game tradeoffs.

Figure 20:
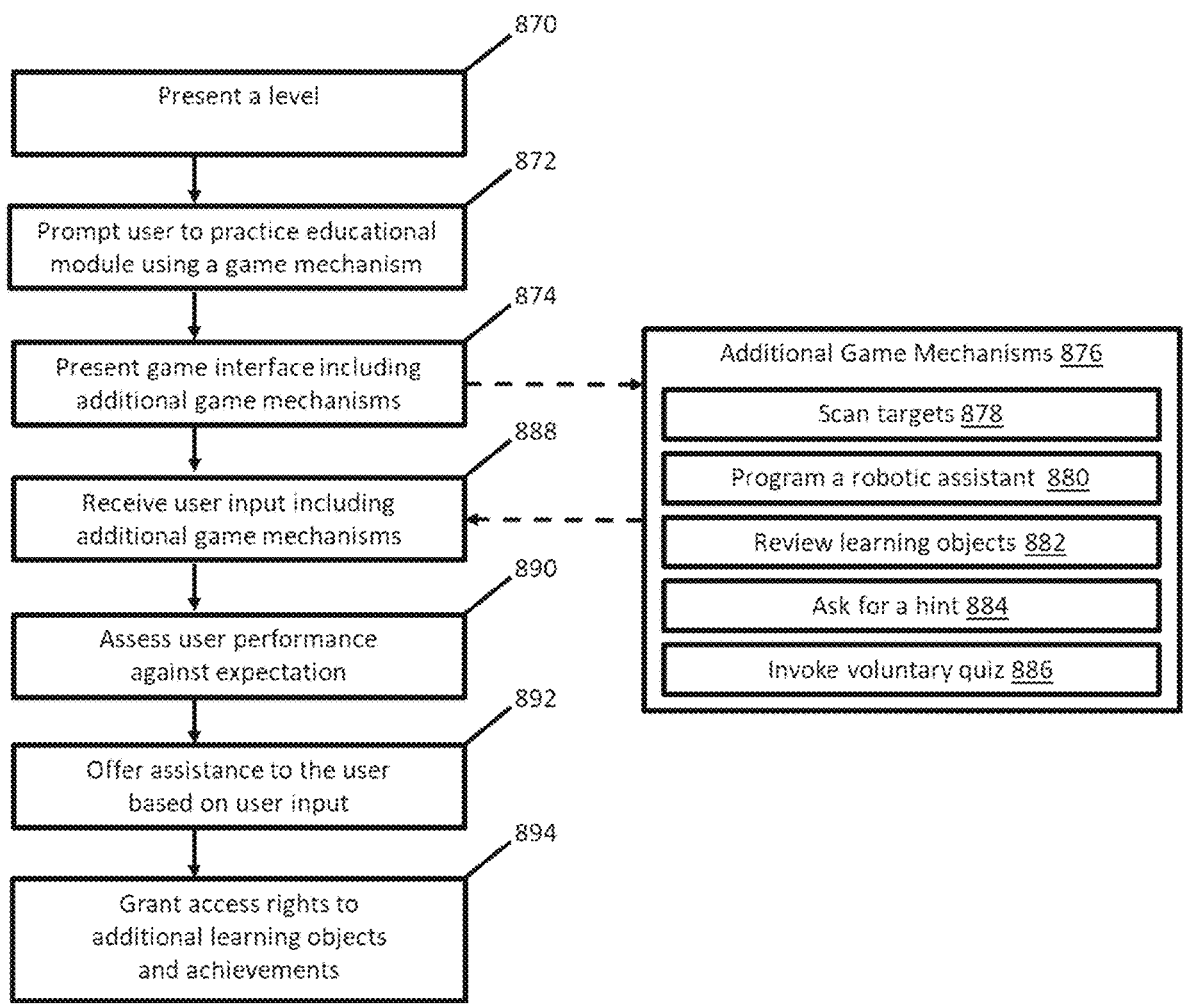
FIG. 20 is a flow diagram of a method of teaching educational curriculum using game mechanisms in the educational game.

Referring now to FIG. 20, a method of teaching educational curriculum using game mechanisms in an educational game is shown. It will be appreciated that the method shown in FIG. 20 has many commonalities to the method shown in FIG. 20. The method shown in FIG. 20 is also performed by computer network with the server 126, and so on. However, this method is directed to how feedback and comprehension checks are embedded into the game mechanisms and how engagement with learning objects are incentivized and rewarded in the educational game. In one embodiment, the method shown in FIG. 20 is reserved for more difficult play modes which are, in turn, reserved for users who have demonstrated advanced knowledge and game skill. Accordingly, the additional game mechanisms 876 present an added layer of complexity and challenge (or opportunity) that may impede learning up to a minimum threshold of knowledge or understanding of the learning objects but may encourage or inspire mastery of the knowledge or understanding of the learning objects beyond the minimum threshold.

The server 126 presents a level 870, and the server 126 also prompts the user to practice an educational module using a game mechanism 872, as discussed above. The server 126 then presents a game interface including additional game mechanism 874. The additional game mechanisms 876 are supplemental to the game mechanisms 500 as shown in FIG. 10.

The additional game mechanisms 876 include an action to scan targets 878. The scan targets 878 action is configured to allow a user to make measurements of enemy elements, terrain elements, interactive objects and other game elements in order to ascertain the scanned targets characteristics and properties based on real science principles. The scan targets 878 action take three forms, including: limited (e.g., usable against one individual target at a time), moderated (e.g., usable against all targets in line of sight) or broad-based (e.g., usable against all targets currently on the field of play). The scan targets 878 action has variable resource tradeoff requirements, including: low (e.g., requiring no action tradeoffs), medium (e.g., requiring one action per scan action) or high (e.g., requiring one action per scan action and the expenditure of a reactant resource) costs. The scan targets 878 action results in intelligence that takes three forms, including: exact (e.g., providing measurements with great certainty), imprecise (e.g., providing measurement ranges) or stochastically improvable (e.g., providing purposefully imprecise measurements that can be refined though further scan actions and sampling). The scan targets 878 action is configured according to these factors based on the selected level difficulty of the game and in view of the learning profile of the user, and is configured for sequentially increasing complexity, challenge and tradeoff costs. For example, in more difficult play modes, the educational game is configured to limit the amount of information presented to the user, such as limited knowledge about the armor or equipment of enemy elements. The user can choose to use the scan targets 878 action to gather data about the type of armor an enemy element has equipped including elemental composition, the mass of the armor, the other equipment of the enemy element, and other properties. The user is then able to use this data to decide how to strategically interact with the level and the enemy element. It is important to note that the user can also forgo the scan targets 878 action and proceed directly to experimental observation by which the user can choose to take offensive actions on enemy elements and calculate the armor characteristics and properties of the enemy element based on the user's knowledge and mastery of the learning objects. Similarly, the user can choose to expose player characters to the risk of using defensive actions and determine the equipment of the enemy elements based on the observed impacts using the user's knowledge and mastery of the learning objects, yet again. The presence of the scan targets 878 action presents new tradeoffs in resource allocation and creates opportunities to teach the user about experimental design, the limitations of observation and sampling, and statistical analysis. Moreover, the scan targets 878 action, like the other additional game mechanisms 876 is well suited to spur the play from comprehension to mastery through sequentially increased challenge that sustains engagement.

The additional game mechanisms 876 include a program robotic assistant 880 action. The program robotic assistant 880 action is configured to allow the user to command a robotic assistant (e.g., a drone) to move across the level map to attract the attention of the enemy elements, expand line of sight for the player characters (e.g., reducing the fog of war), make a scan target action on behalf of the player characters, gather resources or search for hidden resources or power nodes. In the process, the robotic assistant allows the user to gain information about the level without exposing the player characters to threats from the enemy elements. However, the robotic assistant is configured to be costly (e.g., in terms of in-game resources required to deploy and use the robotic assistant) and generally vulnerable (e.g., with weak defensive capabilities) to ensure adequate strategic tradeoffs in-game. The program robotic assistant 880 action is configured to introduce users to the foundation of computer science and digital information and transmission learning objects. The robotic assistant is also configured to be customizable by the user via selecting unlocked achievements. This creates an additional linkage between the industrial and career information and the in-game actions, while increasing user excitement and engagement. The robotic assistant 880 action also creates new strategic tradeoffs and encourages repeat plays of the same level.

The additional game mechanisms 876 include a review learning objects 882 action. The review learning objects 882 action is configured to allow the user to access the contents of the laboratory area or achievements area from within the game modes as a point of reference. In one embodiment, the user only accesses learning objects from the user notebook or outside of the flow of the game mode (e.g., in the laboratory mode) to promote engagement with the game experience and use of already communicated and digested knowledge. However, in more difficult game modes, the user may need to refer to equations or other information in the laboratory area or achievements area. The review learning objects 882 action enables the user to pause the game mode and interact with the learning objects in a limited manner.

The additional game mechanisms 876 include an ask for a hint 884 action. The ask for a hint 884 action is configured to allow the user to request assistance within the game mode. Accordingly, the user can turn on notifications and guidance that can help the user navigate the level. The user can also request a tutor (e.g., another person or chatbot assistant that provides input on game play and learning object issues in-game).

The additional game mechanisms 876 include an invoke voluntary quiz 886 action. The invoke voluntary quiz 886 action is configured to allow the user to request one or more explicit questions (e.g., a quiz) or puzzle challenges (e.g., a mosaic game to build a hierarchy of concepts) about the user's comprehension of the learning objects. If the user answers correctly, the player characters are provided with a minor benefit associated with the learning objects of the question-answer pairing, such as temperature reduction or resource replenishment of armor (defensive actions) of the player characters, or energy and resource replenishment of the weapons (offensive actions) of the player characters. Invoking voluntary quizzes 886 next to power nodes and interactive objects is also a level win condition (e.g., a variant of the use object 670 scenario), and/or can be used to unlock additional learning objects in the laboratory and career profiles in the achievements.

The server 126 receives a user input including the additional game mechanisms 888. Then, the server 126 assesses user performance against expectation 890. Since the additional game mechanisms are designed for limited use in more advanced or difficult game modes, the educational game is configured to restrain the use of the additional game modes. Accordingly, the server 126 validates whether the user is utilizing the additional game mechanisms in good faith and in-line with the user's knowledge and skill level. If not, the server 126 throttles access to the additional game mechanisms and provides feedback to encourage the user to try alternative courses of action. Otherwise, the server 126 offers assistance or takes action in accordance with the associated outcome of the additional game mechanism 876.

As a reward or incentive for use of the additional game mechanism 876, the server 126 grants access rights to additional learning objects and achievements 894. Accordingly, the educational game is configured to dynamically, selectively and conditionally offer the additional game mechanisms 876 and restrict or incentivize the use of the additional game mechanisms 876, as is appropriate based on the learning profile of the user.

Figure 21:
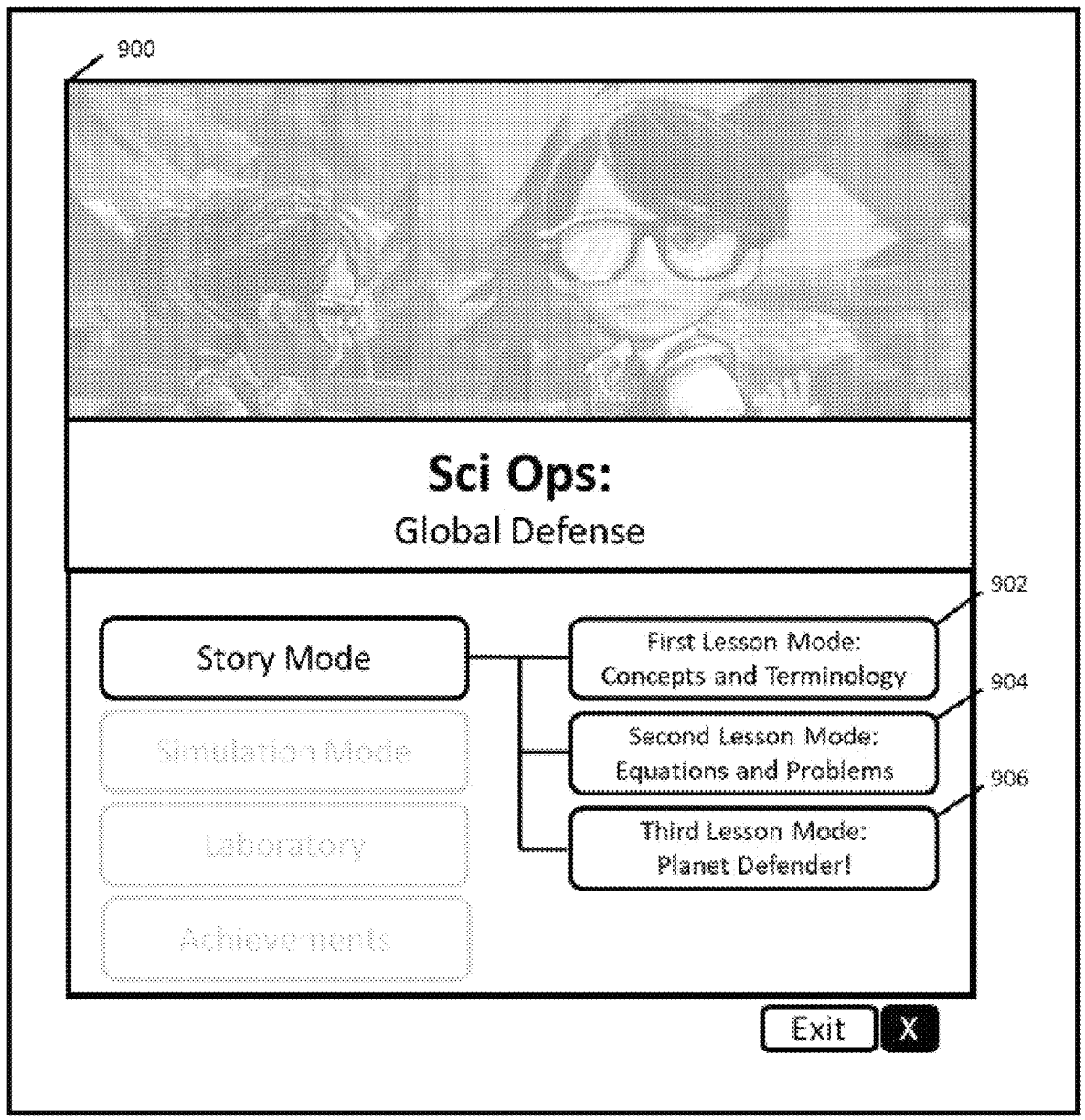
FIG. 21 is an illustration of a user interface of a sub-menu featuring multiple lesson modes of the start menu of FIG. 17.

Referring now to FIG. 21, a user interface of a sub-menu featuring multiple lesson modes of the start menu of FIG. 17 is shown. In one embodiment, the educational game is configured to have multiple lesson modes, with each lesson mode presenting a different challenge level or difficulty and testing the user's level of knowledge or mastery at varying levels of detail and complexity. As illustrated in FIG. 21, when a user selects the story mode, a sub-menu is presented that is configured to allow the user to select between varying difficulty levels.

For example, the educational game is configured to have a first lesson mode 902. If the user selects the first lesson mode 902, the server 126 will present an instance of the educational game that is simplified to convey and test high level understandings of concepts and terminology. More advanced or complicated presentations of the learning objects are restricted. The educational game rendered in the first lesson mode 902 also includes a limited set of game mechanisms to simplify the game play experience. Accordingly, the educational game rendered in the first lesson mode 902 is well suited to convey some learning objects to users, for example, to teach high school-level science curriculum concepts to middle school students who may not have sufficient science knowledge or mathematical skills to tackle harder difficulty levels, yet.

The educational game is configured to have a second lesson mode 904. If the user selects the second lesson mode 904, the server 126 will present an instance of the educational game that is of medium complexity. In addition to conveying and testing concepts and terminology, the educational game will also convey and test equations and require the user to solve moderately complex problems. The educational game rendered in the second lesson mode 904 includes the full set of game mechanisms. Accordingly, the educational game rendered in the second lesson mode 904 is well suited to convey the majority of the learning objects to users, for example, to teach high school-level science curriculum to average high school students (e.g., not advanced placement or college credit-certified level classes).

The educational game is also configured to have a third lesson mode 906. If the user selects the third lesson mode 906, the server 126 will present an instance of the educational game that is of high complexity and challenge. In addition to conveying and testing the concepts, terminology, equations and problem-solving approaches, the educational game will also convey and test in-depth knowledge and mastery of the learning objects by limiting the availability of information and game mechanisms while requiring the user to solve complex problems. Accordingly, the educational game rendered in the third lesson mode 906 is well suited to convey deep appreciation of the learning objects to users, for example, to teach high school-level science curriculum to advanced placement and college students at a college-level.

The educational game with multiple lesson modes is configured to adapt and grow with each user. Users can replay the educational game at different points in the user's education journey (e.g., in middle school, in high school and in college) to delve deeper into the subject matter and be exposed to more mature and complex presentations of the learning objects. Moreover, the educational game is capable of delivering a customized and personalized educational experience with each play-through of the game experience by tracking the user over long-periods of time (e.g., several years) and adjusting to the progress of the user.

Figure 22:
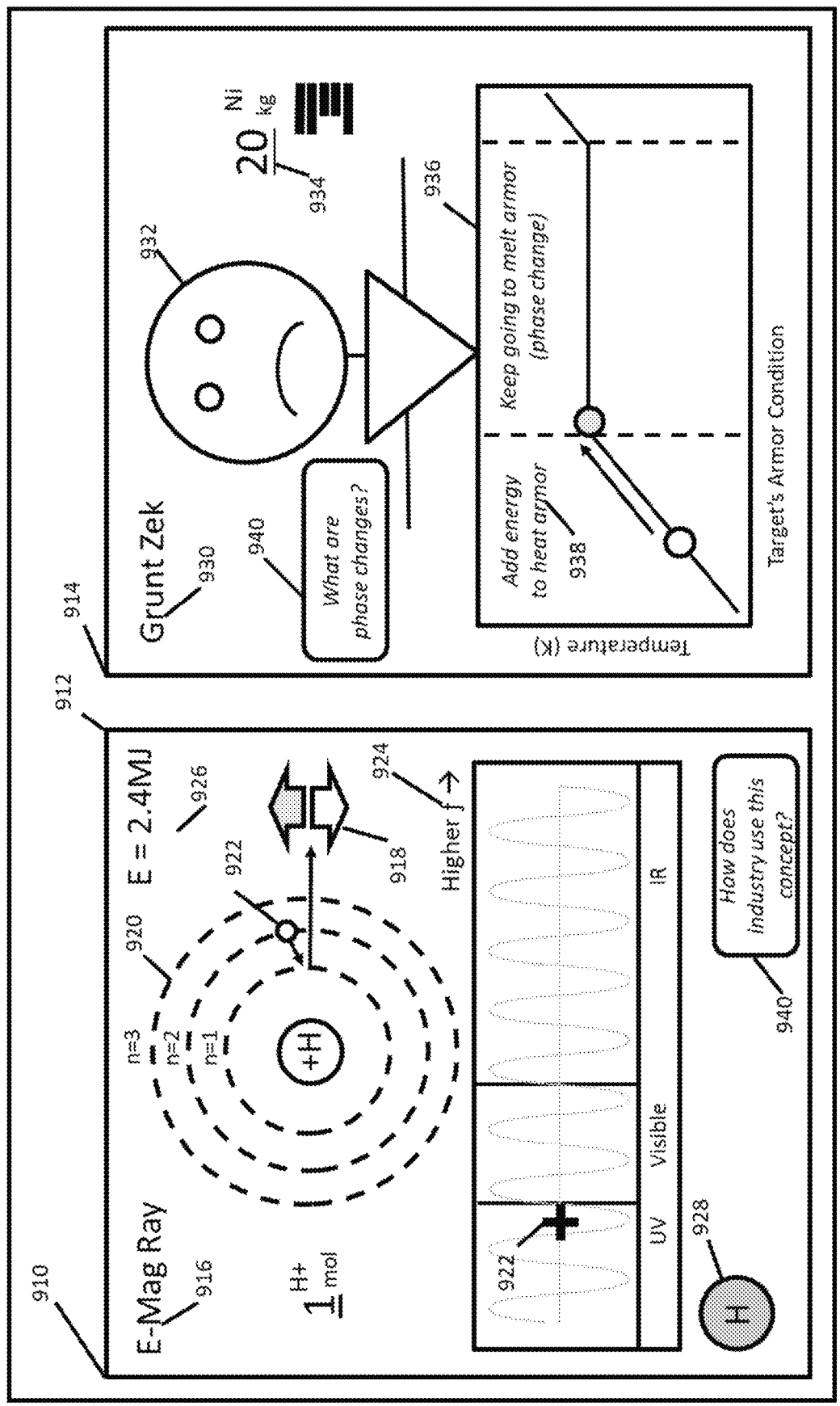
FIG. 22 is an illustration of a user interface for a first offensive game mechanism according to a first lesson mode of the sub-menu of FIG. 21.

Referring now to FIG. 22, an illustration of a user interface for a first offensive game mechanism according to a first lesson mode of the educational game (hereinafter the first offensive game mechanism 910) is shown. The first offensive game mechanism 910 includes two panels: an action panel 912 and a reaction panel 914. The user interface of the educational game is configured so that a pop-up window emerges when the user hovers over various part of the first offensive game mechanism 910. The pop-up windows explain the learning object underlying the hovered-over part of the user interface. The user interface of the educational game is further configured so that the user can click on or select the pop-up window to probe down a level to see additional explanation about the learning object underlying the pop-up window. Accordingly, the user can drill down into the learning objects presented by the first offensive game mechanism 910, as well as other user interfaces of the educational game.

The action panel 912 depicts the user-controlled portion of the game mechanism. The action panel 912 includes an action title 916, which indicates which game mechanism the user has selected. As shown in FIG. 22, the user has selected an offensive action, namely, the electro-magnetic radiation gadget that embodies the Bohr model of the atom.

The action panel 912 includes a user control 918. The user control 918 is an interactive element that is configured so that the user can select, adjust or input values into in order to manipulate the configuration of the action panel 912. As shown in FIG. 22, the user control 918 is a simple up/down arrow that allows the user to increase or decrease the amount of energy applied to the electro-magnetic radiation gadget and, thus, the level of excitation of the electrons of the focal atoms.

The action panel 912 includes a simulation graphic 920. The simulation graphic 920 includes a visual presentation of the learning objects associated with the game mechanism. The simulation graphic 920 is interactive and includes some information about how the game mechanism is configured, such as the number of moles of matter. As shown in FIG. 22, the simulation graphic 920 is an interactive graph of the atomic model with an output of the emitted frequency of energy at the bottom.

The action panel 912 includes status indications 922, which depict the current configuration of the simulation graphic 920. For example, the indications 922 include a circle that represents an electron occupying a shell of the atomic model and a cross-hair that represents a frequency of radiation emitted by exciting the electron.

The action panel 912 includes a first set of explanations 924 of learning objects related to the first game mechanism 910. The first set of explanations 924 enrich the interface and provide supplemental information about related learning objects. In one embodiment, the first set of explanations 924 are updated periodically during game play, exposing the user to a small and readily digestible amount of new information over time that incentivizes the user to pay attention to the action panel 912.

The action panel 912 includes an output value 926. The output value 926 represents the culminating value of the configuration of the first game mechanism 910 as depicted in the simulation graphic 920. As shown, the 2.4 mega-joules of energy is the amount of energy to be transmitted by the electro-magnetic radiation gadget at the current configuration.

The action panel 912 also includes upgrade indicators 928, which depict the available upgrades to the game mechanism that the user has unlocked. As shown in FIG. 22, the user has only unlocked one embodiment of the electro-magnetic radiation gadget, namely, the use of a Hydrogen-based gadget.

The reaction panel 914 depicts the game-determined portion of the game mechanism. The reaction panel 914 includes a reaction title 930. The reaction title 930 indicates the game element that is currently selected and being targeted by the game mechanism. As shown in FIG. 22, the reaction title 930 shows that an enemy element named "Grunt Zek" has been targeted.

The reaction panel 914 includes a visual representation 932 of the game element that has been targeted. As shown in FIG. 22, the visual representation 932 shows Grunt Zek's torso and, specifically, front-facing armor.

The reaction panel 914 includes a set of properties 934 of the game element that has been targeted. As shown in FIG. 22, the set of properties 934 indicates that Grunt Zek is wearing 20 kilograms of nickel armor, which has a set of reactive characteristics indicated by horizontal bars.

The reaction panel 914 includes a simulated effect 936, which represents how the game element will react to the current configuration of the game mechanism. As shown in FIG. 22, the armor of Grunt Zek will absorb the 2.4 mega-joules of energy emitted by the electro-magnetic radiation gadget and, as a result, will increase in temperature over the phase change point between solid and liquid for nickel, at which point the armor will start to melt. In one embodiment, player characters and enemy elements are not killed, and, instead, the player characters and enemy elements are exhausted, disabled or taken out of combat (e.g., beamed back to the alien mothership) when the armor of the player character or enemy element is fully melted, broken, dissolved, or otherwise critically impaired. The simulated effect 936 is dynamically adjusted and updated to reflect how the user has currently configured the action panel 912. As a result, the reaction panel 914 with simulated effect 936 provides real time simulations of the scientific principles of the game mechanisms that the user interacts with to explore the underlying science.

The reaction panel 914 includes a second set of indications 938, which explain the learning objects underlying the reaction panel 914. The second set of explanations 938 enrich the interface and provide supplemental information about related learning objects. In one embodiment, the second set of explanations 938 are updated periodically during game play, exposing the user to a small and readily digestible amount of new information over time that encourages the user to pay attention to the action panel 914.

The first offensive game mechanism 910 also includes reflection bubbles 940. The reflection bubbles 940 are configured to pop-up intermittently to enrich the interface and provide supplemental information about related learning objects. The user can clickthrough the reflection bubbles 940 to reveal information about the learning object or make a note that will be transcribed in the notebook of the user. In exchange for clicking on the reflection bubble, the user is rewarded with a minor incentive, like a boost to the efficiency score on the current level. The reflection bubbles 940 promote engagement with the first offensive game mechanism 910 and the learning objects that are presented by the first offensive game mechanism 910.

The first offensive game mechanism 910 according to the first lesson mode is simple, includes few controls, limited information and prioritizes concepts and terminology over mastery of the scientific principles of the educational module underlying the game mechanisms. Based on the user's control and interaction with the action panel 912, the educational game simulates the action-reaction pairing with graphics and special effects. For example, according to the photo-electric effect, exposing a metal to electro-magnetic radiation in a specific frequency band will cause the metal to emit electrons that glow red, part of the visible light spectrum. When this effect is simulated based on the user configuration of the first game mechanism, the educational game depicts the photo-electric effect on the armor of the targeted enemy element in the form of a red glow of emitting electrons.

Figure 23:
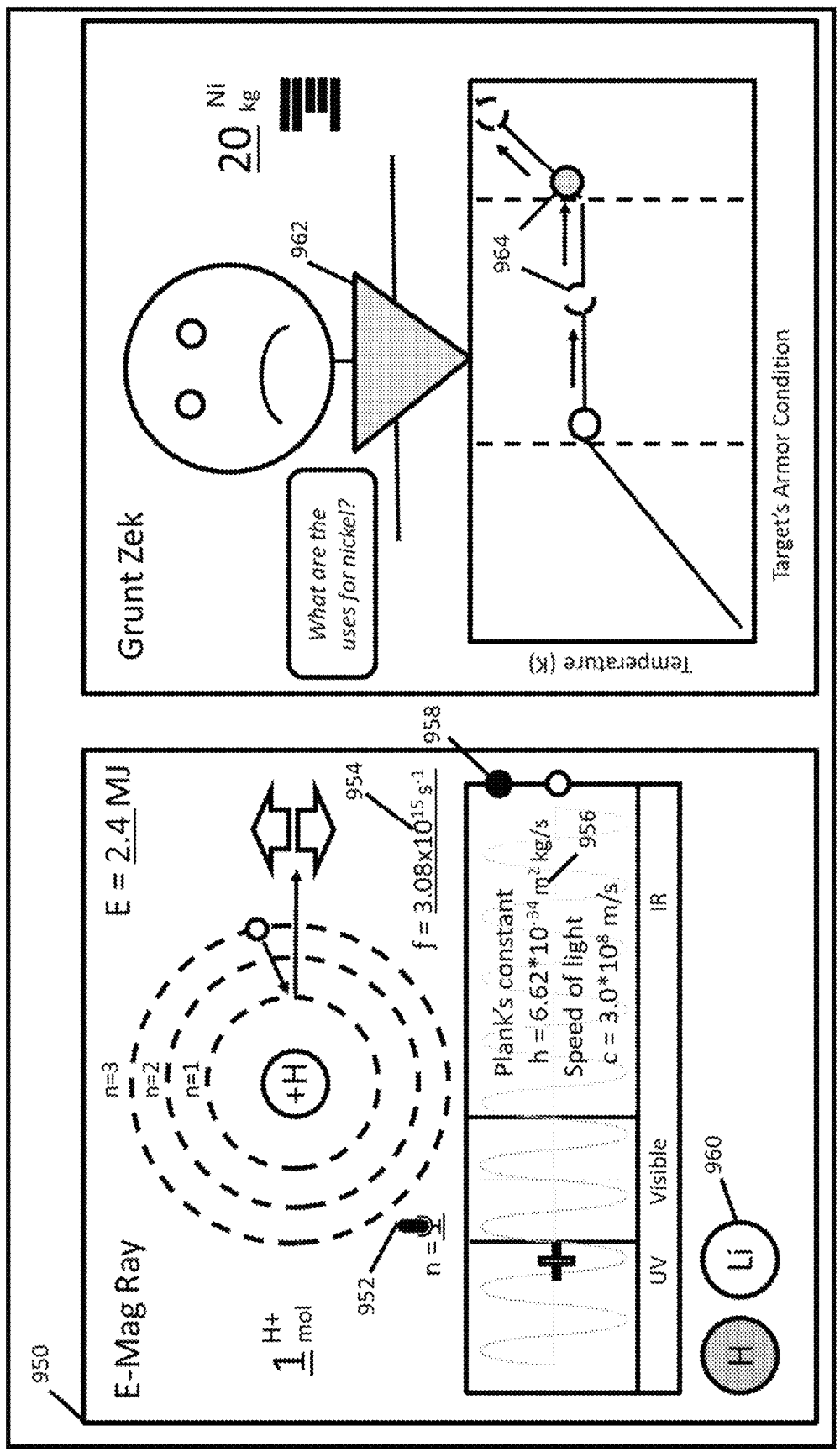
FIG. 23 is an illustration of a user interface for the first offensive game mechanism according to a second lesson mode of the sub-menu of FIG. 21.

Referring now to FIG. 23, an illustration of a user interface for a first offensive game mechanism according to a second lesson mode (hereinafter the second offensive game mechanism 950) is shown. The second offensive game mechanism 950 is similar in layout to the first offensive game mechanism 910 of FIG. 22 but has some new features. For example, the second offensive game mechanism 950 has a user control 952 that is more complex. According to the first lesson mode of FIG. 22, the user could interact with the game mechanism by simply clicking arrows up and down. But, according to the second less mode of FIG. 23, the user is prompted to enter the shell number for the simulation into the user input 952 (although the up/down arrows are still available and active) via a voice-to-text capture feature. For example, the user is tasked with clicking on the microphone button and stating, "excite the electron to the fourth electron shell" to properly calibrate the second game mechanism 950. This invokes a different learning style, namely, verbal explanation, and can require the user to demonstrate an understanding of the concept and how to calculate the desired results as well as communicate those results. It will be appreciated that any of the user controls can test or utilize any of the learning styles. In one embodiment, the user controls of more complex variants of the game mechanism randomly or dynamically rotate learning styles based on the learning styles module to prompt deeper and more rounded learning.

In addition, the second offensive game mechanism 950 includes a configuration check 954. The configuration check 954 is configured to test the user's knowledge and understanding of the educational module by properly calibrating the second offensive game mechanism 950. As shown in FIG. 23, the user is prompted to input the frequency of emitted radiation for the simulation into the configuration check 954. If the user does not input the appropriate response into the configuration check 954, the game mechanism will not be properly calibrated and, as a result, the gadget will only output a fraction of the maximum potential amount of energy. The rest of the energy will be wasted, negatively impacting the user's efficiency score on the level. The configuration check 954 is configured to change periodically to ensure the user has a robust understanding of the educational module underlying the game mechanism.

In order to be able to properly input values into the configuration check 954, the second offensive game mechanism 950 includes equations and constants 956. The equations and constants 956 empower the user to make the necessary calculations and leverage the appropriate scientific principles. In one embodiment, the equations and constants 956 are displayed on or near the simulation graphic to convey a sense of relation and attachment. In the event that the equations and constants 956 cannot all fit on the available space, the user interface 950 is configured to include radial buttons 958 to enable multiple panels of equations and constants 956 to be displayed on the second offensive game mechanism 950.

As shown in FIG. 23, the upgrade indicators 960 have two available options: hydrogen gas and lithium gas. In one embodiment of the second learning mode, only the available upgrade options are shown to reduce distractions and clutter in the second offensive game mechanism 950.

The second offensive game mechanism 950 includes a visual representation 962 that is enriched. In particular, the armor of the enemy element is graphically portrayed with details, textures and the like that indicate nuances of the armor's characteristics and properties. For example, the armor is portrayed as molten and dripping, providing an indication that the armor has heated up to the phase change region of the graph.

In addition, the second offensive game mechanism 950 includes multiple simulated effects 964 that are the outcomes for each of the user inputs 952 that are possible as modified by the configuration check 954 entry.

Figure 24:
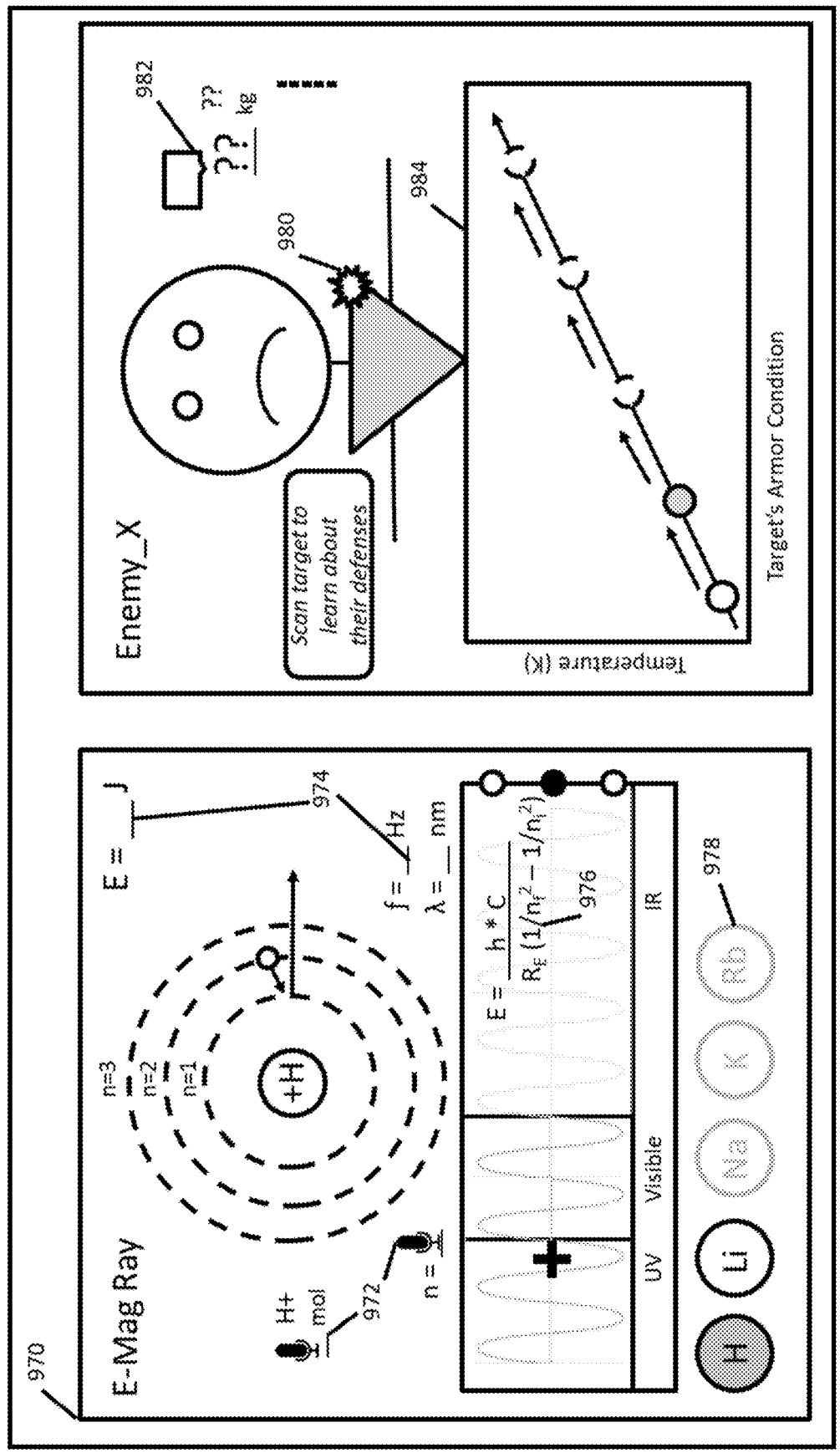
FIG. 24 is an illustration of a user interface for the first offensive game mechanism according to a third lesson mode of the sub-menu of FIG. 21.

Referring now to FIG. 24, an illustration of a user interface 970 for the first offensive game mechanism according to a third lesson mode (hereinafter the third offensive game mechanism 970) is shown. The third offensive game mechanism 970 is similar in layout to the first offensive game mechanism 910 of FIG. 22 and the second offensive game mechanism 950 of FIG. 23 but has some new features. For example, the third offensive game mechanism 970 has a user control 972 that is more complex. As shown in FIG. 24, the user control 972 requires the user to input two values: the number of moles of gas simulated and the number of the electron shell to excite the electrons up to. Specifically, the user control 972 requires the user to input those values using a voice-to-text capture feature, which invokes a different learning style, namely, verbal explanation. For example, the user may be prompted to state into a microphone, "configure the laser radiation gadget with 2.3 moles of hydrogen gas, and excite the electron to the third electron shell" in order to properly calibrate and utilize the third offensive game mechanism 970. This explanation leverages the user's knowledge of the concept and calculations (as conveyed by the first game mechanism 910 and the second game mechanism 950) while testing the user's ability to make sense of the material across multiple dimensions and communicate results.

The third offensive game mechanism 970 includes a configuration check 974 that is more complex. As shown in FIG. 24, the configuration check 974 requires the user to input three values: the frequency of the emitted radiation, the wavelength of the emitted radiation, and the energy output of the electro-magnetic radiation gadget.

The third offensive game mechanism 970 includes equations and constants 976 that are more complex. As shown in FIG. 24, the equations and constants 976 includes the Rydberg formula for calculating the energy of photons emitted by the hydrogen atom (e.g., used to calculate the energy output value).

The third offensive game mechanism 970 includes an upgrade indicator 978 that is more complex. For example, prior to utilizing the third learning mode, the user will likely have completed the educational game according to the first learning mode or the second learning mode. Accordingly, the user will likely have unlocked numerous items and equipment upgrade that are too advanced or too powerful for a given level. Therefore, the educational game is configured to disable the use of items and upgrades that are too powerful for a given level. A visual representation of this is provided to remind the user that the other items and upgrades are currently unavailable to mitigate stress.

The third offensive game mechanism 970 includes a visual representation 980 that is further enriched. In particular, the armor of the enemy element is graphically portrayed with details, textures and the like that indicate nuances of the characteristics and properties. For example, the armor is portrayed as luminous after the armor has received a hit from the electro-magnetic radiation gadget that fell below the minimum threshold frequency, providing an indication of the photo-electric effect.

The third offensive game mechanism 970 is further configured to throttle the presentation of a set of properties 982 and simulated effects 984. By not showing the set of properties 982 and the simulated effects 984 of the user's action prior to taking it, the user is confronted by a choice to take a scan target action to determine this information or experimentally take offensive actions and calculate the information from observed reactions. This reinforces lessons of the scientific method and the nature of experimentation, data collection and systems thinking. In one embodiment, the user is prompted to enter the value of throttled data points in order to achieve an optimal efficiency score. For example, the user may be prompted via a text box for written explanation (e.g., "Grunt Zek is wearing 20 kg of Nickel armor") to confirm that the user was thoughtfully experimenting to determine the type of armor (e.g., based on the melting temperature) and the amount of armor (e.g., based on the observed temperature changes for a given energy output and the specific heat of the material). This escalates the complexity to a very high level that is on par with college science and engineering classes. This presentation of the game interface also incorporates and promotes learning objects relating to the scientific method.

As shown, the first offensive game mechanism 910, the second offensive game mechanism 950 and third offensive game mechanism 970 incrementally increase in interface complexity, learning difficulty, computational difficulty and learning style difficulty. For example, the interface of the first offensive game mechanism 910 is simple and requires little of the user. This provides the user with a soft introduction that focuses the user's attention on learning the educational concept and how to utilize the game mechanism to interact with enemy elements. However, after the user achieves a certain level of mastery (or invokes a more difficult game mode), the game mechanism is made more complex by adding more user inputs, requiring more calculations and testing a variety of learning styles (e.g., the second offensive game mechanism 950). Then, after the user achieves an even higher level of mastery (or invokes a more difficult game mode), the game mechanism is presented in an even more complex manner by adding even more user inputs, requiring calculations and validations, and requiring the user to leverage additional learning styles in new ways (e.g., the third offensive game mechanism 970). It will be appreciated that this incremental increase in complexity of the game mechanisms across multiple dimensions is staged to grow with the user to introduce new concepts and new challenges at a manageable rate that promotes replay and deeper engagement, while allowing the educational game to grow and scale with users at multiple points in their educational journey (e.g., in middle school, high school and again in college).

Figure 25:
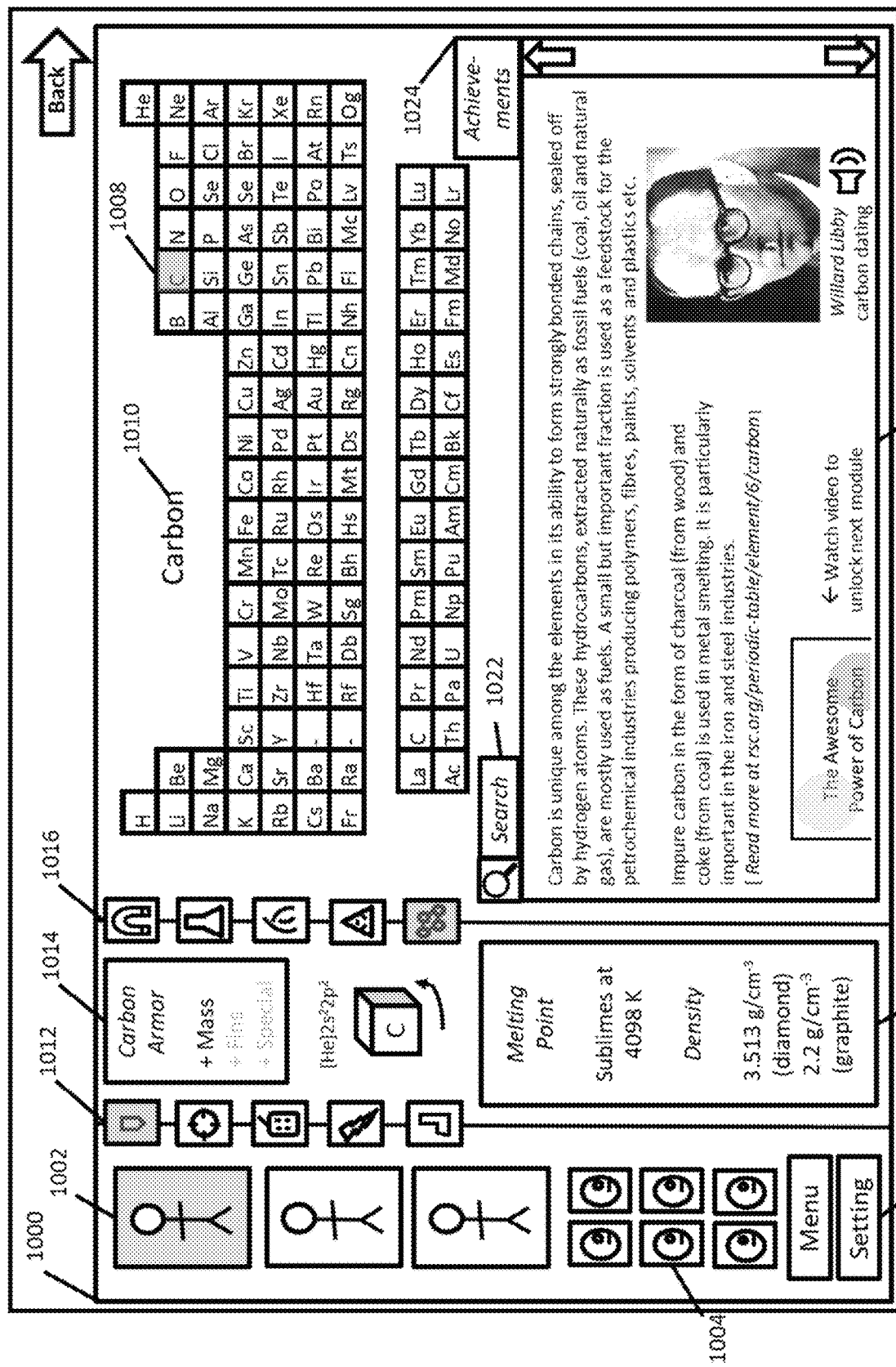
FIG. 25 is an illustration of a user interface of a laboratory area of the educational game.

Referring now to FIG. 25, a user interface for a laboratory area 1000 of the educational game is shown. The laboratory area 1000 of the educational game is the primary repository of scientific knowledge and learning objects. The laboratory area 1000 is configured with hover overs and click-throughs to see additional information.

The laboratory area 1000 has an active team member 1002 and a backup team member 1004 selection feature. The educational game is configured to allow users to swap team members between the active team member 1002 list and the backup team member 1004 list. Hovering over the active team member 1002 and the backup team member 1004 lists will reveal additional information about the player characters. As shown in FIG. 25, the active team member 1002 list includes three player characters, the top one of which is selected (grayed out). The backup team member 1004 list shows six player characters, none of which is selected. Below the active team member 1002 and backup team member 1004 selectors are menu controls 1006, for example, a menu button that will load the main menu again and a settings button that will pull up additional screens of information and user controls specific to the laboratory area (e.g., font size, number of learning objects to display, white background vs. black background reading modes, and other user preferences).

The laboratory area 1000 has a periodic table of elements 1008 with a selected element title 1010. As shown in FIG. 25, the carbon atom is selected (grayed out). In one embodiment for physical science, chemistry and physics subjects, the periodic table of elements 1008 makes up the backbone of both the offensive actions and defensive actions; users learn about inorganic material, subjects and trends in the periodic table through repeated interaction with and selection of elements from the periodic table to equip the player characters and overcome enemy elements. In one embodiment for biology, ecology, earth sciences and organic chemistry, organic matter makes up the backbone of both the offensive actions and defensive actions.

The user interface includes an action bar 1012. The action bar 1012 has icons for each of the primary categories of game mechanisms and associated embodiments of items. For example, the action bar 1012 has icons for: defensive actions which are associated with armor items and upgrades (depicted as a small shield); offensive actions which are associated with primary weapons like the electro-magnetic radiation gadget and secondary weapons and gadgets like electro-magnetic grenades (depicted as a crosshair of a rifle scope, and a grenade, respectively); specials action which are associated with satellite blasts (depicted as a lightning bolt); and movement actions which are associated with boots (depicted as a boot). As shown in FIG. 25, the defensive actions are selected (grayed out).

The laboratory area 1000 has an item status bar 1014. Based on the selection of element from the periodic table 1008 and the action bar 1012, the item status bar 1014 displays the characteristics and properties of the items of the user, including what has been unlocked and what upgrades are currently equipped. In one embodiment, the status bar 1014 depicts a graphic of the player character's selected items, and the user can hover over and click-through the item status bar 1014 to see information about those items (shown) and then open up an item selector interface with even more information and scientific data, respectively.

The laboratory area 1000 has a material property bar 1016 and a material property window 1018. The material property bar 1016 has icons for each of the primary categories of material properties, such as electro-magnetic properties, chemical reactivity, combustibility, radioactivity, and bulk state of matter information. Based on the selection of the element from the periodic table 1008 and the selection of the category from the material property bar 1016, the material property window 1018 displays relevant scientific knowledge and data, as well as a rotating 3D model of the selected element. As shown in FIG. 25, the bulk state of matter category is selected (grayed out) from the material property bar 1016 and, therefore, items like the melting point of carbon-armor are displayed in the material property window 1018. The user can hover over and click through the material property bar 1016 and the material property window 1018 for additional information.

The laboratory area 1000 also has a content window 1020. The content window 1020 is the primary place where learning objects are displayed and made available for the user to consume. The content window 1020 is populated with educational curriculum that are modularized and constructed into learning objects based on a hierarchy of access rights. The educational game is configured to progressively reveal learning objects to the user as the user progresses through the educational game. The educational curriculum is configured to have learning objects for each concept in all learning styles (when possible or applicable). The educational game is configured to reveal learning objects based on the learning profile of the user, which includes learning styles and preferences.

The laboratory area 1000 includes a search bar 1022 that is configured so that the user can search, sort and organize the learning objects of the content window 1020 by a variety of factors, including: keywords, concept or topic, educational standard, pedagogical objectives, learning objective, game mechanism and most relevant episode and level. The laboratory area 1000 also includes a link to the achievements area 1024.

Figure 26:
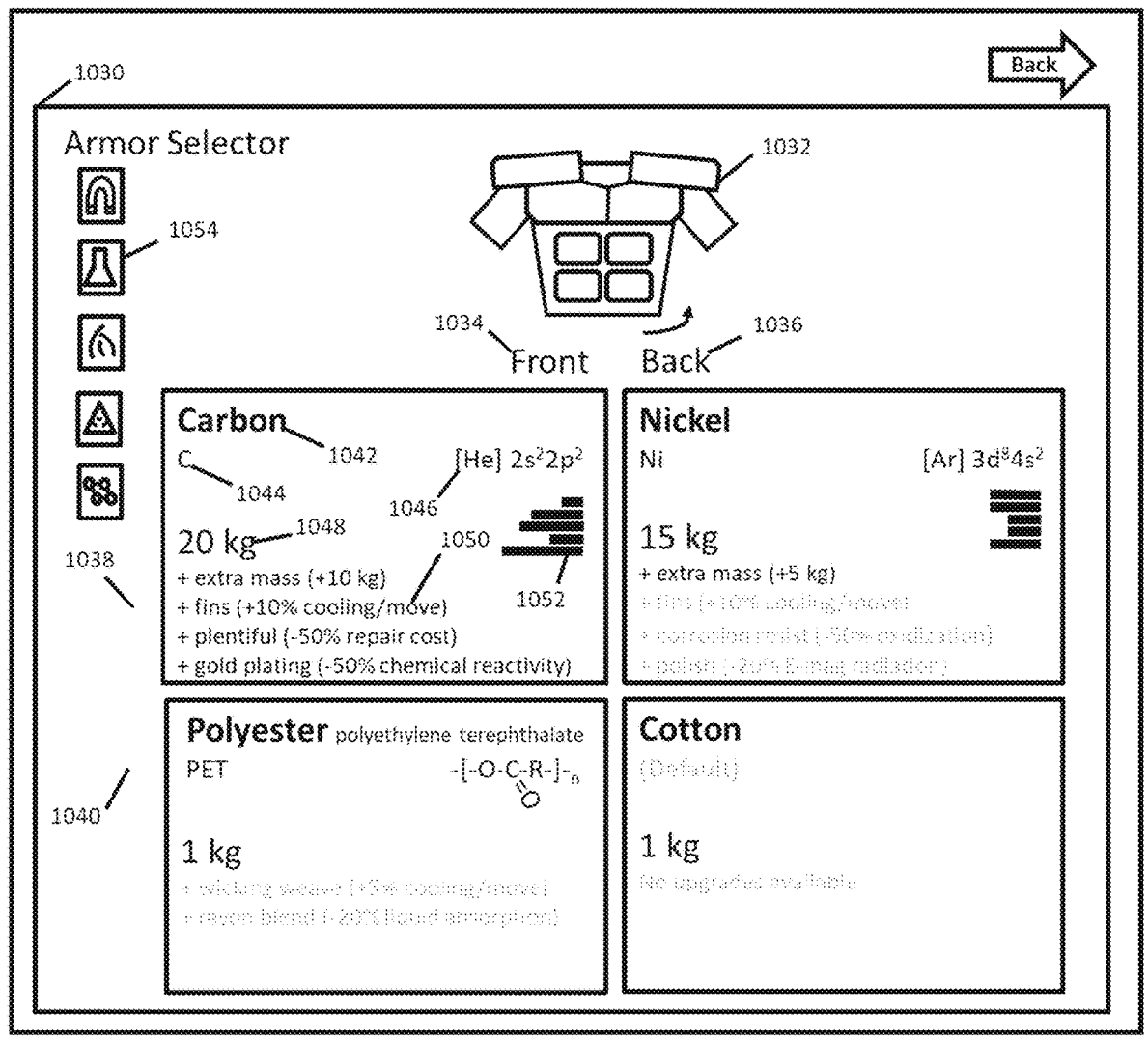
FIG. 26 is an illustration of a user interface of an armor selector screen of the laboratory area of FIG. 25.

Referring now to FIG. 26, a user interface of an armor selector 1030 screen of the laboratory area is shown. The armor selector 1030 includes a bust 1032. The bust 1032 is a 3D representation of armor of a player character. As the user configures the armor by selecting different elements and materials, the bust 1032 is updated so that the user can see how the armor looks and, thus, how the selected elements appear based on real science principles.

The armor selector 1030 includes a grid of selections, including a front 1034 and a back 1036 armor option, as well as an outer layer 1038 and an inner layer 1040 armor option. The armor selector 1030 is configured so that the user can select a different armor for each quadrant of the grid. For example, the user has selected carbon 1042 for the front 1034, outer layer 1038 of armor. The name of the selected element is displayed as an element title 1042. An abbreviation 1044 for the element or material is provided along with a scientific notation 1046 of the element or material, such as the electron shell configuration (if applicable) or chemical formula (if applicable). A mass value 1048 of the armor is provided for each armor item. In addition, upgrades 1050 and a description of the associated in-game effect are provided. The upgrades 1050 are based on real scientific principles. For example, one such upgrades 1050 is carbon armor that has added mass, which increase the amount of reactive material and, thus, the amount of defensive capabilities of the armor. Other examples of upgrades 1050 include adding fins to boost thermal transfer rates, using plentiful materials which are easier or cheaper to repair and replace, coating the outside of the armor with specific materials like gold or corrosion resistant polymers that are less reactive with some chemical processes, polishing metal armors to expand the photoelectric threshold range and reduce the rate of electro-magnetic radiation that is absorbed, improving the wicking properties of textiles to increase personal cooling rates, altering the blend of materials to provide other woven material properties like decreased water absorption, and so on.

In one embodiment, upgrades 1050 that involve thresholds (e.g., the photoelectric effect and its associated threshold) are particularly compelling because thresholds are typically difficult to teach and convey a sense of proportion or significance to in a meaningful way. However, in the context of the educational game disclosed herein, thresholds become a comparable and optimizable concept.

Enemy elements are also configured with similar armor options, including front and back armor types, multiple layers of heterogenous armor, and upgrades. Some enemy elements are configured to have many layers of overlapping armor, necessitating a varied offensive action strategy to break through each layer.

The net characteristics and properties of the armor item with all applicable items is provided as a material properties chart 1052. The material properties chart 1052 concisely summarizes the effectiveness of the armor against the various modes of interaction. The details of the material properties chart 1052 are viewed by selecting from a material property bar 1054. The material properties are based on real science principles.

Figure 27:
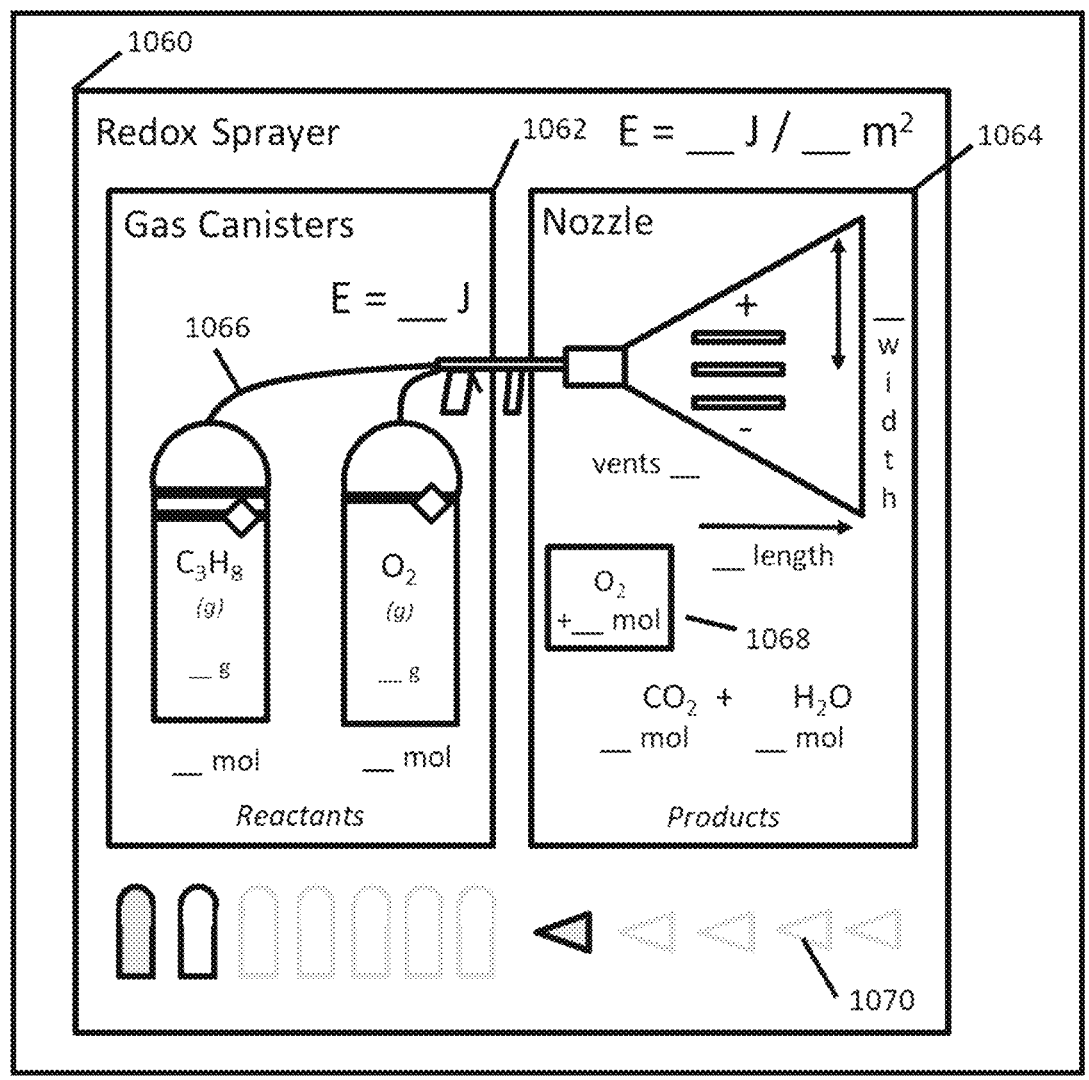
FIG. 27 is an illustration of a user interface of a second offensive game mechanism of the educational game.

Referring now to FIG. 27, a user interface of another offensive game mechanism (hereinafter the fourth game mechanism 1060) of the educational game is shown. The fourth offensive game mechanism 1062 is a redox sprayer that harnesses the power of oxidation-reduction reactions to interact with various game elements. The fourth offensive game mechanism 1060 has two components or stages: a gas canister 1062 portion and a nozzle 1064 portion. The gas canister 1062 portion is configured so that the user can control the amount of reactants that are mixed and passed to the nozzle 1064 portion. The gas canister 1062 portion conveys and tests the user's knowledge of oxidation-reduction reactions, stoichiometry and energy transfer.

The nozzle 1064 portion is configured so that the user can control design elements of the nozzle 1064, which impacts the amount of oxygen 1068 (or other airborne elements) drawn into the sprayed gasses, the spray pattern and intensity of reaction under the spray pattern. The nozzle 1064 conveys and tests the user's knowledge of mechanical design, aerodynamics, and stoichiometry.

The fourth offensive game mechanism 1060 also includes upgrade indicators 1070 for both the gas canister 1062 and the nozzle 1064.

The fourth game mechanism 1060 illustrates how the educational game is configured to crosscut concepts from disparate areas of scientific endeavor—just like science does in the real world. As shown in FIG. 27, chemical reaction concepts are combined with mechanical design concepts. Users are presented with conflicts and tradeoffs that must be balanced and navigated. As a result, the fourth game mechanism 1060 exemplifies how the educational game disclosed herein is configured to teach multi-factorial incorporation of real science principles that span multiple domains of science and multiple process disciplines and, thus, connect more students with more of the learning objects. The complexity of materials across the multiple domains of science is incrementally increased and balanced against the user learning rate, like increases in the interface complexity, learning difficulty, and learning style difficulty.

Figure 28:
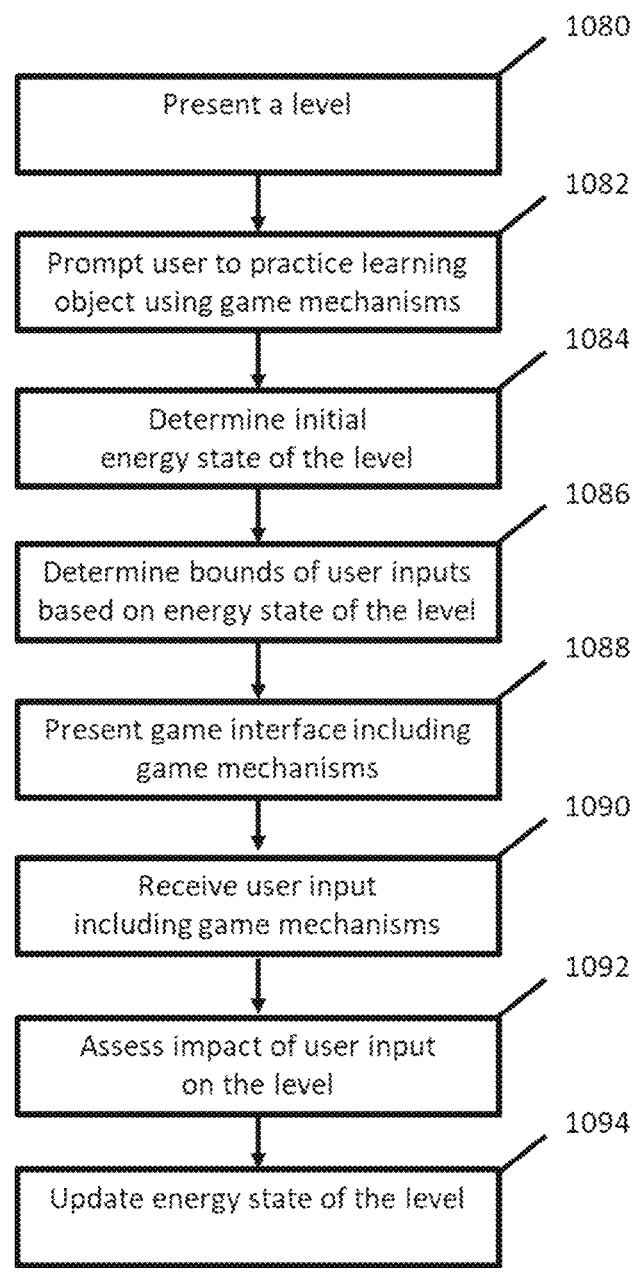
FIG. 28 is a flow diagram of a method of simulating actual scientific principles using user inputs including game mechanisms according to the educational game.

Referring now to FIG. 28, a method of simulating actual scientific principles using user inputs including game mechanisms is shown. The method starts when the server 126 presents a level 1080 to the user and prompts the user to practice learning objects using game mechanisms 1080. Then, the server determines an initial energy state of the level 1084. The initial energy state is determined on a per-space (e.g., per-square) basis across the level map and for all game elements in those spaces. Each space and each game element has thermal (e.g., conduction and convection), chemical, nuclear, electrical, magnetic, combustion, kinetic, potential, etc. energies assessed. Each space and each game element also has ambient gasses, available solutions and other reactant materials assessed. In one embodiment for biological sciences, each space and each game element has organic molecular properties, protein properties, cell structure properties and biological functions assessed.

The server 126 determines bounds of user inputs based on the energy state of the level 1086. Since the level is being simulated as a real-world environment governed by real science principles, the initial energy state may impede the range of actions that a user can take. For example, if a level takes place in a level map with no ambient gaseous oxygen present (e.g., in a vacuum or under water), the player characters may not be able to utilize combustion-based actions effectively. As another example, if a level is highly ionized, the player characters may not want to risk interacting with electronic equipment or computer terminals until the player characters dissipate the free electrons from the environment. In each of these examples, the initial energy state constrains the actions that the user can take in the level.

The server 126 presents a game interface including game mechanisms 1088. The game interface is updated in view of the bounds determined in the prior step 1086. The user then plays the educational game, and the server 126 receives user input including game mechanisms 1090. For example, the user selects a player character in a space and commands the player character to make an offensive action against an enemy element in another space.

The server 126 assesses an impact of user input on the level 1092. Each action taken in the educational game transforms and transfers energy around the simulation of the level. The server 126 then updates the energy state of the level 1094 to account for the impact assessed.

In one embodiment, the method of simulating actual scientific principles using user interactions including game mechanisms is performed between each action to ensure accuracy of the energy state of the system and to immediately reflect the consequences and effects upon subsequent game play.

Figure 29:
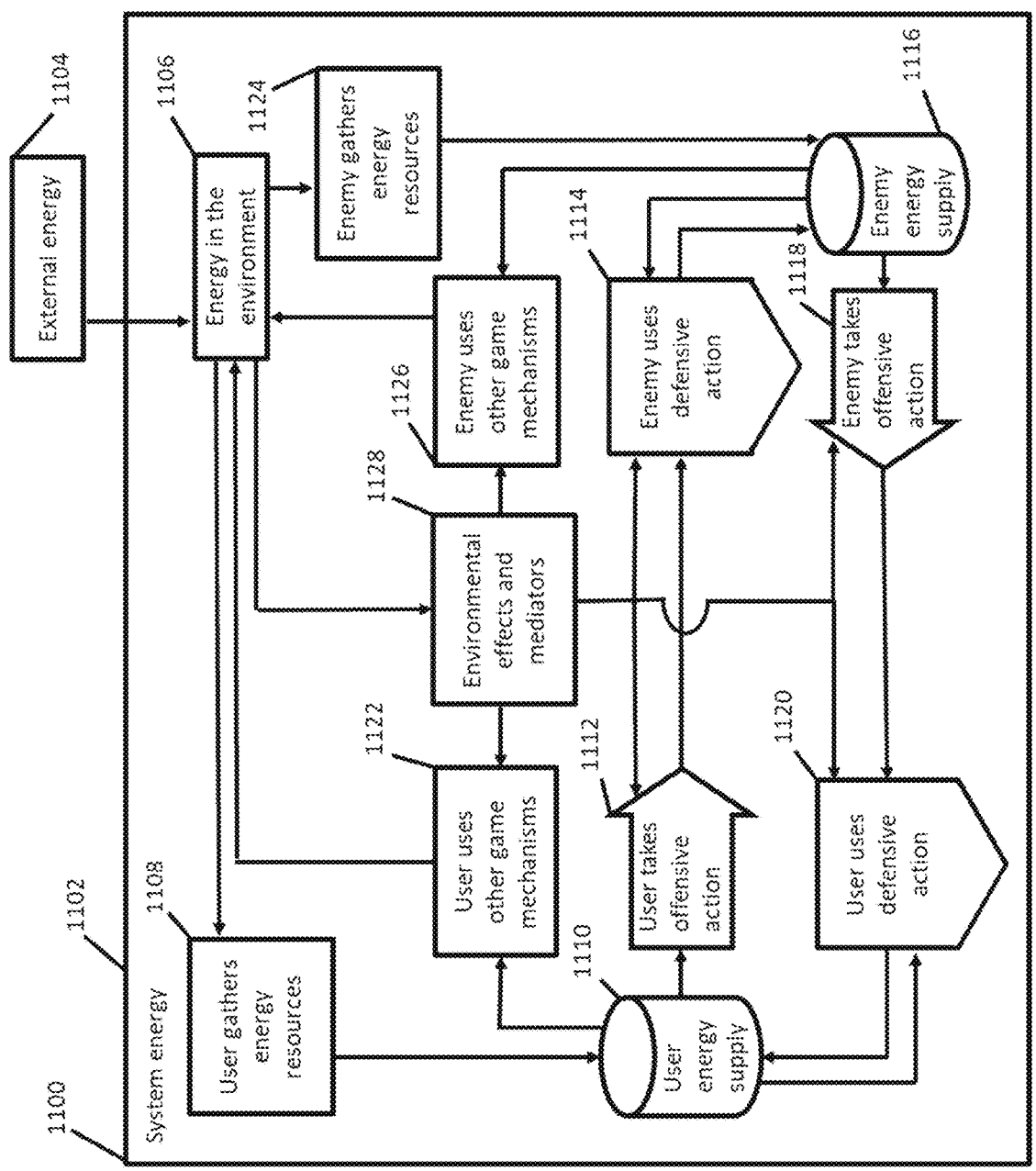
FIG. 29 is a flow diagram of a system that simulates energy conservation and conversion using real science principles of the educational game.

Referring now to FIG. 29, a system 1100 that simulates energy conservation and conversion using real science principles is shown. Each level of the educational game is modeled as the system 1100. Specifically, the system-level energy and interaction between user-controlled player characters and computer-controlled enemy elements and how those interact with energy in the environment (e.g., level map and located elements) is shown for illustrative purposes.

Each level is simulated to have a system energy 1102. In one embodiment, the system energy 1102 is fixed for a level and does not change, with the exception being an external energy 1104 is called upon to add energy to the system energy 1102. In one embodiment, the external energy 1104 is rarely utilized, for example, only to model special actions like satellite blasts. Most of the system energy 1102 occurs as energy in the environment 1106. The user can gather energy resources 1108 from the energy in the environment 1106 to add to a user energy supply 1110. The user energy supply 1110 is drawn upon when the user commands player characters to take offensive actions 1112 on a targeted enemy elements. In response, the enemy elements use defensive actions 1114 to react to the player characters' actions, which causes an enemy energy supply 1116 to change. The enemy elements take offensive actions 1118 during the enemy turn and, in response, the player characters use defensive actions 1120 and the user energy supply 1110 is updated.

In addition, the user can command the player characters to use other game mechanisms 1122. The enemy elements are also configured to gather energy resources 1124 from the energy in the environment 1106 and the enemy can use other game mechanisms 1126.

Lastly, there are environmental effects and mediators 1128 that, based on real science principles of environmental factors and the energy of the environment 1106, can influence the interaction between offensive and defensive actions (1112 and 1114, and 1118 and 1120) as well as impact the use of other game mechanisms (1122, 1126). For example, the environmental effects and mediators 1128 can simulate loss factors that dissipate a remainder of the energy from a focal interaction into the energy in the environment 1106. Loss factors are a important area of education for STEM subjects, yet loss is rarely discussed. Accordingly, the educational game disclosed herein provides a rich context to explore loss and entropy.

In a model of one embodiment, energy presents a common constraint to all in-game actions and interactions, which are modeled according to real scientific processes. Scientific realism and proportionate effects are central to effective communication and learning of scientific subjects using the educational game disclosed herein.

Figure 30:
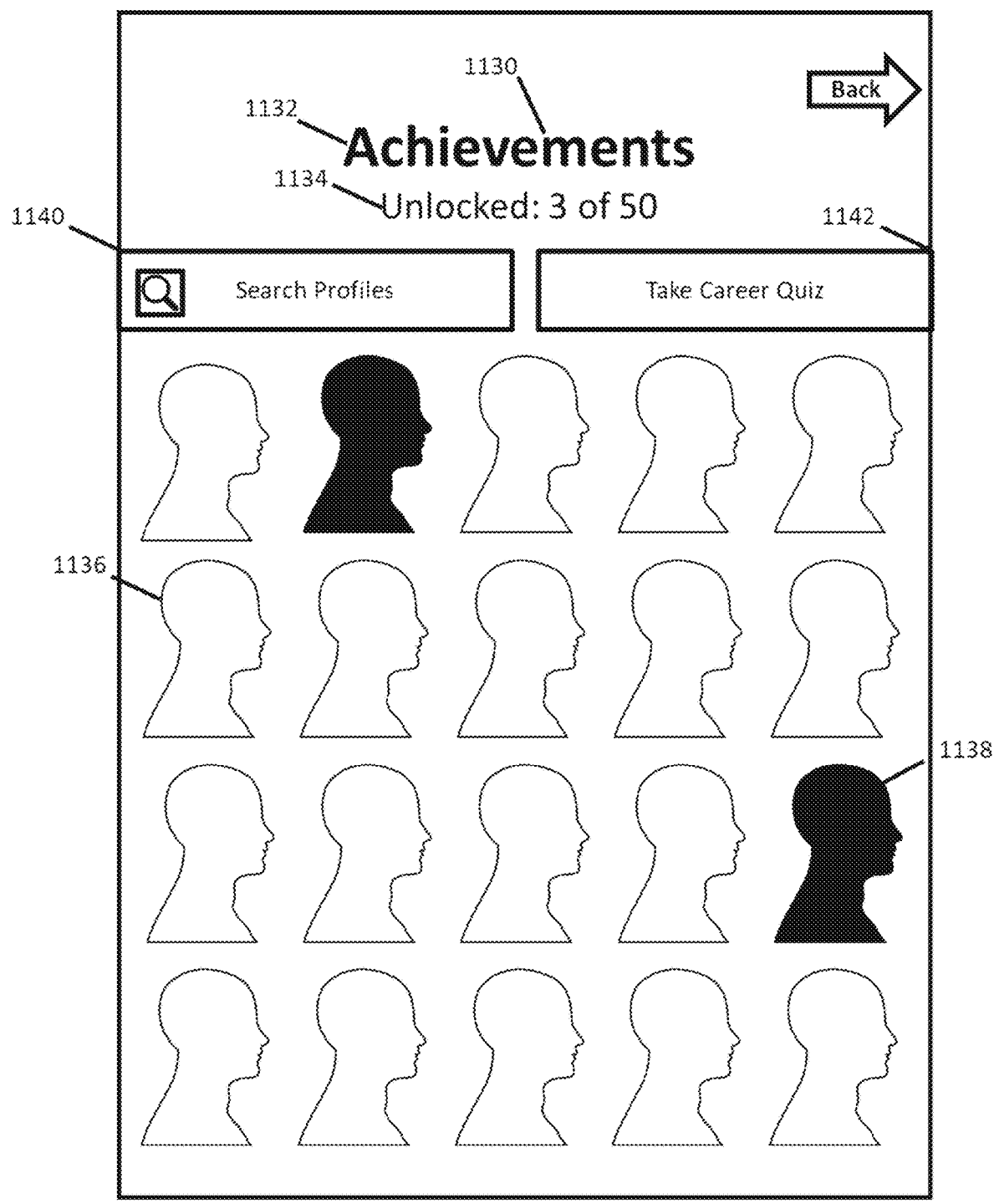
FIG. 30 is an illustration of a user interface of an achievements area of the educational game.

Referring now to FIG. 30, a user interface of an achievements area 1130 of the educational game is shown. The achievements area 1130 includes a title 1132 for the achievements area, and an achievements status indicator 1134 of the number of achievements available and unlocked by the user. The achievements area 1130 also includes career profiles, such as locked profiles 1136 and unlocked profiles 1138, of engineers, scientists and STEM industry professionals. The unlocked profiles 1138 are configured so that the user can clickthrough the unlocked profiles 1138 to review information about the scientists, engineers, mathematicians and other STEM industry professionals presented. The achievements area 1130 also includes a search profiles 1140 feature that allows the user to search, filter and sort the unlocked profiles 1138 based on: industry, salary, personal details, environmental impact, social impact, and other factors. The search profiles 1140 feature also allows the user to stack rank the unlocked profiles 1138 based on the learning profile of the user, which can provide indications about the sort of fields and roles the user finds most interesting or has the greatest aptitude in based on indications from the engagement module. The user interface 1142 also includes a take career quiz 1142 feature that allows the user to take a personality and interests assessment that, in conjunction with the learning profile of the user, provides an indication of which career paths and industries may be of greatest interest to the user. The output of the take career quiz 1142 links to the unlocked profiles 1138 that are most in line with the user's interests and abilities.

Referring now to FIG. 31, a user interface of a career profile 1150 for an unlocked STEM professional of the achievements area is shown. The career profile 1150 includes a name 1152 and an image 1154 of the engineer, scientist or other STEM professional portrayed. The career profile 1150 also includes profile controls 1156 to save the career profile 1150 as a favorite and share the profile (e.g., via e-mail, social media, etc.). The career profile 1150 includes a first panel 1158 that features career information 1160, an impact assessment 1162 and job perks 1164 of the career portrayed. The career information 1160 is made up of information that would generally be found on a resume or curriculum vitae, such as current job title, current employer, past job titles, past employers, education and schools and salary. The impact assessment 1162 is an estimated measurement of the amount of environmental and social contributions that the unlocked profile has on the world, as well as estimated measures of the challenge or difficulty of the role and the amount of fun that the person portrayed gets to have on the job. The job perks 1162 are a short detail about specific advantages of the job, the employer or something else that is probably not known or readily appreciated about the profession from the perspective of the average user (e.g., teenagers).

The career profile 1150 includes a second panel 1168 of personal and professional details that are grounded in career information 1158 and the game world of the educational game. The second panel 1168 is configured to have a narrative arc or biography that paints a compelling and rich picture of the portrayed character, their motivations, the work they do, the equipment they use, what an average day looks like, and so on. The second panel 1168 is configured to have a narrative arc that grounds the character in the game world, indicating how the unlocked profile contributes and what is at stake to them, personally. For example, the educational game is configured so that the user unlocks career profiles by completing levels and achieving in-game results, like rescuing non-player characters. The rescued non-player characters are engineers, scientists and STEM professionals that join the player characters or help in future adventure.

The career profile 1150 also includes an in-game effect 1170. The in-game effects 1170 are based on real science principles and grounded in the career information, expertise and backstory of the displayed person. For example and as shown in FIG. 30, the educational game is configured so that the user can equip or activate the unlocked profile of "Sheila" at the beginning of a level in order to receive a bonus or boost in-game tied to her expertise, namely, an increase in the rate of reaction of oxidation-reduction reactions (whether tied to the redox sprayer of FIG. 27 or other items that use oxidation-reduction reactions).

The career profile 1150 includes a link 1172 to the laboratory area, tying the achievements area to the laboratory area and increasing engagement between the two areas.

The career profiles 1150 of the achievements area of the educational game are all dynamically constructed for users to match the user's demographic, region and interests. For example, the career information is configured to be dynamically constructed for the user based on the gender of the user, the location of the user (e.g., determined based on IP address, school affiliation and so on) and the learning profile of the user. As a result, the names and genders of the unlocked profiles are generated to match the demographics of the user; the name of the employers, the academic institutions, and the job titles are generated to match real institutions and options in the state or region of the user; and the personal details of the unlocked profiles are aligned to inferred interests of the user based on the learning profile of the user. Like other aspects of the educational game, the career profiles include numerous terms and objects that the user can hover over and click-through to learn more about the element. For example, the unlocked profiles include many references to companies, tools, processes, and educational curriculum that are supported by a hierarchy of data elements.

Figure 32:
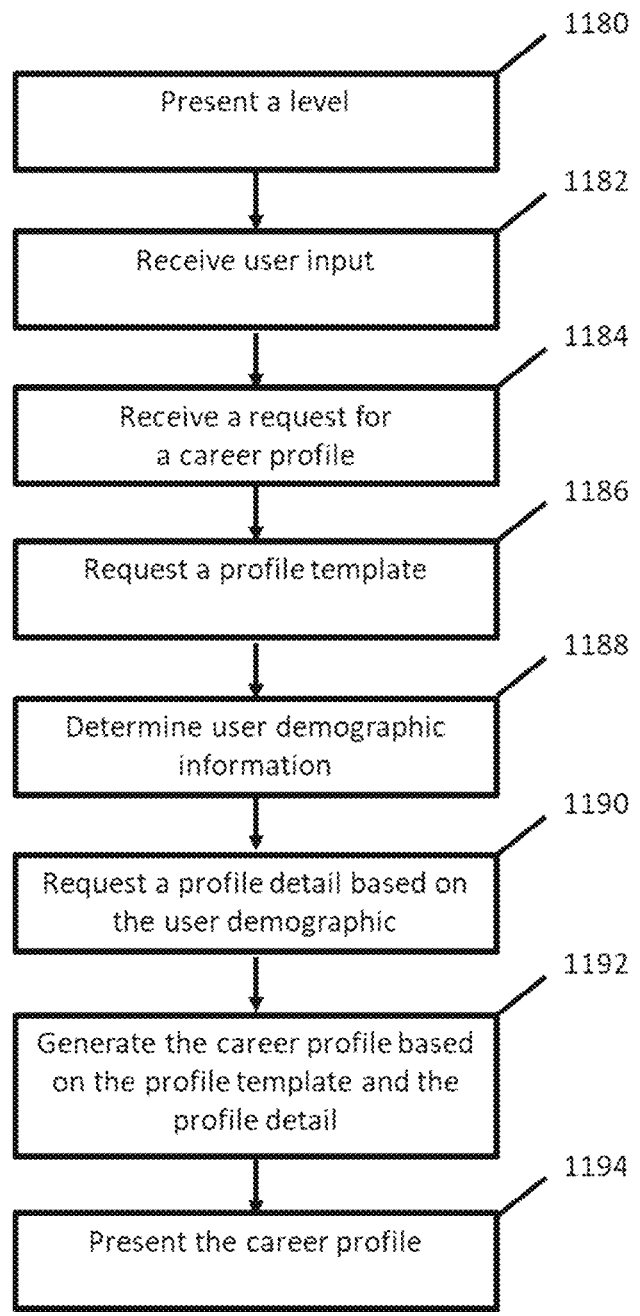
FIG. 32 is a flow diagram of a method of generating a career profile for the achievement area of the educational game.

Referring now to FIG. 32, a method of generating a career profile is shown. The method starts with the educational game, namely, with computer network with the server 126 presenting a level 1180 and receiving user input 1182. As the user succeeds and progresses through the educational game, the user will unlock achievements. When the server 126 receives a request for a career profile 1184. The server 126 requests a profile template 1186 based on the achievement or progress achieved in the educational game. The server 126 determines user demographic information 1188 for the user, based on data entered by the user such as gender, age, school, location, etc., IP address look-ups and the learning profile of the user. The server 126 requests a profile detail based on the user demographic 1190. Then the server 126 generates the career profile based on the profile template and the profile detail 1192 and presents the career profile 1194 to the user via the user device.

The career profiles are generated to align to user demographics to increase the engagement of the learning profiles and convey information about local and regional institutions, industry trends, career activities and the like. Nearly all aspects of the career profile are generated in this manner; even story-driven components of the career profiles are crafted based on the learning profile of the user. For example, a career profile is generated for a mechanical engineer in-game to reflect information about a user from North Carolina. The educational background of the mechanical engineer is set to North Carolina State University (a local university), the employer background information is set to Siemens (which has a moderately large office in the area), the personal details are set to beach related activities (since North Carolina has a long coast line) and hobbies are set to coastal activities, like kitesurfing (which is a popular local activity). These details are selected and integrated into the career profile for the requested mechanical engineer to match a user from North Carolina. Additional details about the user's demographics and the career profiles are aligned.

Figure 33:
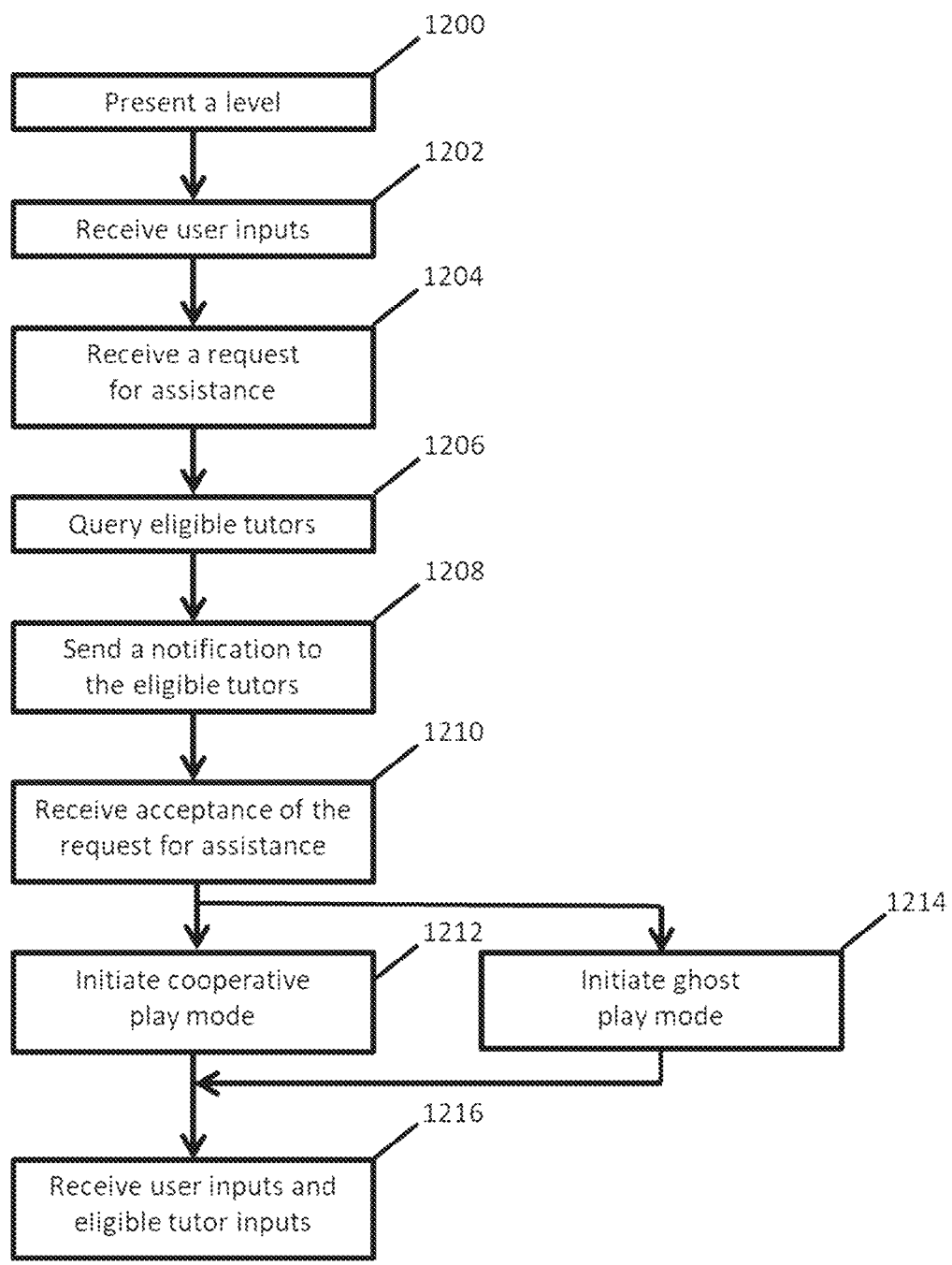
FIG. 33 is a flow diagram of a method of rendering in-game assistance in the educational game.

Referring now to FIG. 33, a method of rendering in-game assistance in the educational game is shown. The method starts with the educational game, namely, with the server 126 presenting a level 1200 and receiving user input 1202. If the user gets stuck or desires assistance, the server 126 receives a request for assistance 1204. The server 126 then queries eligible tutors 1206. The eligible tutors include student users, teachers and customer service representatives who are currently logged-in to the educational game and have indicated a willingness to act as a tutor. In one embodiment the student-users are pre-screened based on success in the educational game as indicated by the learning profile of the user, an affidavit or pledge to behave ethically and try to help others learn, and approval by a teacher of the user. The student-user pre-screen is in place to prevent trolling and other forms of harassment and ensure that the student users have been vetted by an accountable adult, the teacher. The server 126 sends a notification to the eligible tutors 1208. When one of the eligible tutors 1208 responds in the affirmative, the serve 126 receives an acceptance of the request for assistance 1210. Any number of match making and queueing approaches are envisioned within the scope of the tutoring feature.

The server 126 then initiates one of two tutor modes, including: initiating a cooperative play mode 1212, or initiating a ghost play mode 1214. The cooperative play mode 1212 is configured so that the eligible tutor takes control of one of the player characters in the level and a communication platform is opened. The eligible tutor can then talk with and type to the user who requested assistance while controlling one of the player characters to work through the issue. When it is the eligible tutor's turn in the educational game, the user who requested assistance will see the eligible tutor's use of game mechanisms. The ghost play mode 1214 is configured so that the eligible tutor takes the form of an ethereal scientist (e.g., a translucent NPC model) and a communication platform is opened. The eligible tutor can then talk with and type to the user who requested assistance while the user screen is shared to the device of the eligible tutor. The eligible tutor can maneuver in the level and control a sprite that highlights aspects of the user interface, like indicating which game mechanism to use, how to interact with and configure the game mechanism, and where to look for additional information. The server 126 then receives further user inputs and eligible tutor inputs 1216, such as additional game play or the tutoring assistance.

Figure 34:
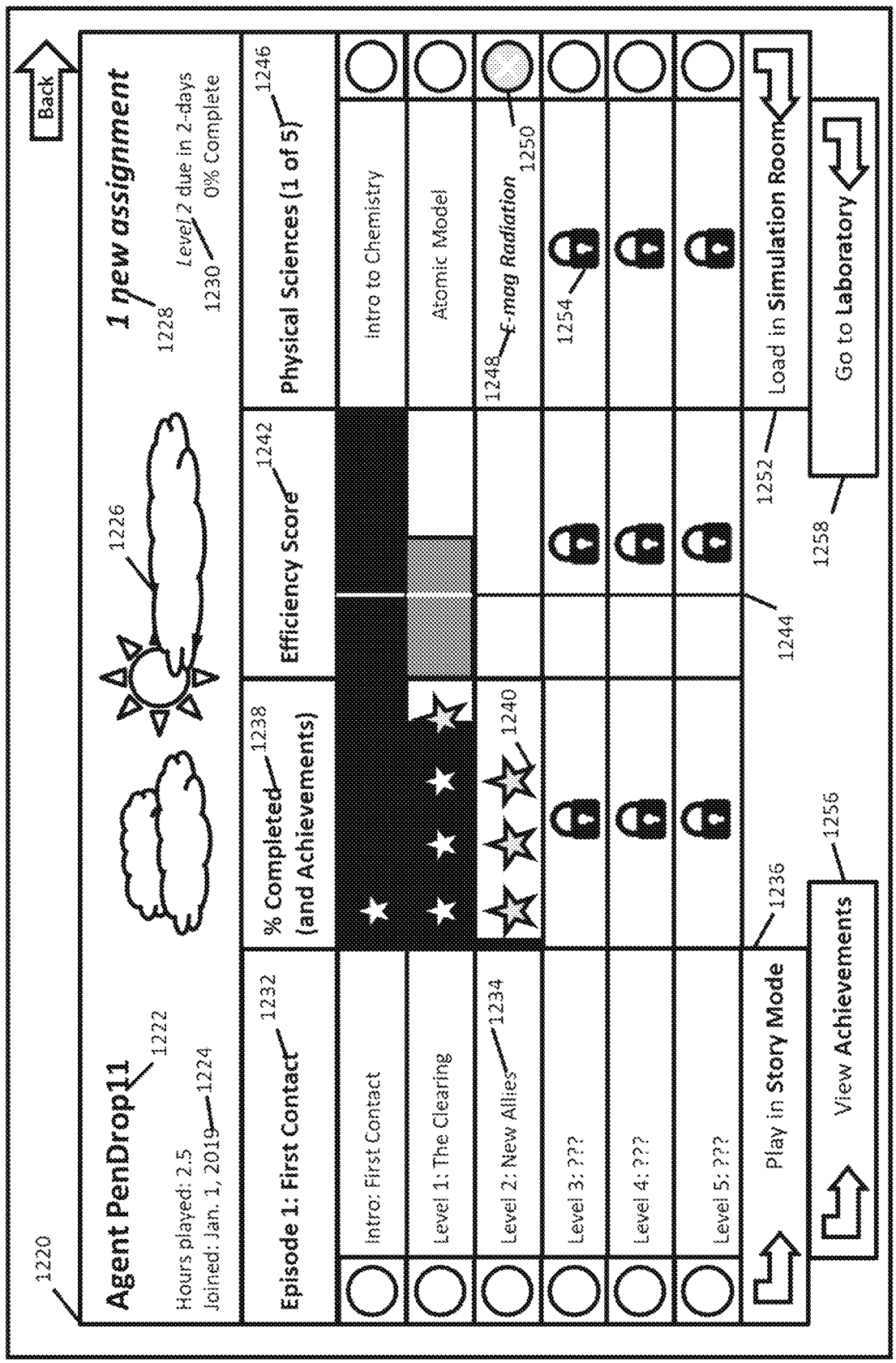
FIG. 34 is an illustration of a user interface of a student profile screen of the educational game.

Referring now to FIG. 34, a user interface for a student profile screen 1220 of the educational game is shown. The student profile screen 1220 has an upper title area that includes a student codename 1222 that is a user generated nickname created when the user first logs into the educational game, and student account details 1224 such as the amount of time the user has spent playing the educational game and when the user first logged into the educational game.

A dynamic weather graphic 1226 reflects where the user is in the story of the episode of the educational game that the user is playing through at present, and how far the user has progressed through the episode. In addition, the dynamic weather graphic 1226 reflects where the user stands in terms of the educational curriculum and how the user has performed in the educational game. For example, when the user first starts the educational game, the dynamic weather graphic 1226 will display a clear sky with a bright sun. As the user progresses toward plot turns and boss battles, the dynamic weather graphic 1226 will display a more intense weather pattern like a thunderstorm with lightning that will persist until the user successfully clears the boss battle. If the user has been performing poorly in those levels, the dynamic weather graphic 1226 will display precipitation and fog that will persist until the user's performance improves and they achieve higher efficiency scores.

The student profile screen 1220 includes a notification alert 1228 and notification details 1230 that informs the user of teacher-issued assignments. The user can hover over and click through the notification alert 1228 and notification details 1230 to see additional information and initiate the assigned task. For example, accepting the notification alert 1228 could cause the educational game to present Level 2 of the story mode of Episode 1.

The student profile screen 1220 includes an episode selector 1232. The episode selector 1232 shows the user which episode the user currently has selected with an indication of whether the user has the appropriate license rights to the selected episode. Below the episode selector 1232 are level titles 1234. The level titles 1234 shows the user which level of the selected episode the user has unlocked and which level the user has selected. The user can hover over and click through the level titles 1234 to see a plot summary and a curriculum overview of the selected level, and to load the selected level, respectively. The user can also load the selected level by pressing a play in story mode button 1236 at the bottom of the student profile screen 1220.

The student profile screen 1220 includes a completion indicator 1238 that shows a percentage completed for each level. In line with the completion indicator 1238 is an achievement indicator 1240 that tracks the number of achievements present or available from the selected level, and how many of those achievements the user has unlocked. Combined, the completion indicator 1238 and the achievement indicator 1240 track completionism—how much of the educational game experience the user has experienced.

The student profile screen 1220 includes an efficiency indicator 1242. The efficiency indicator 1242 tracks user performance from zero to the maximum possible efficiency score for the level (varies by level) and versus a minimum efficiency score 1244 that the user must achieve to successfully complete the level. The efficiency indicator 1242 tracks mastery—how well the user understands the material.

The student profile screen 1220 also includes a curriculum indicator 1246 that describes where in the taxonomy of classes and knowledge the learning objects of the selected episode is positioned. For example, the episode indicator 1232 shows that Episode 1 is the selected episode and the curriculum indicator 1246 shows that Episode 1 relates to the Physical Sciences, namely, the first of five episodes on the Physical Sciences. Below the curriculum indicators 1246 are module titles 1248. The module titles 1248 describe the educational curriculum from within the selected class that is conveyed. For example, the module titles 1248 for Level 2 of Episode 1 relates to electro-magnetic radiation. The user can select and click through level titles 1234 or curriculum titles 1248, either individually or in groups, to load a simulation mode of the educational game with the selected educational curriculum contained therein. The user can also use the load in simulation room 1252 button to load the simulation mode for the selected items.

In one embodiment, the level titles 1234, the module titles 1248 and the achievement indicators 1240 are masked (not revealed) until the user has unlocked the associated level. This can be shown with locked content indicators 1254, shown in FIG. 34 as padlocks.

The student profile screen 1220 also includes links to other game modes, such as a view achievements 1256 button and a go to laboratory 1258 button, that the user can use to navigate to those areas of the educational game.

Figure 35:
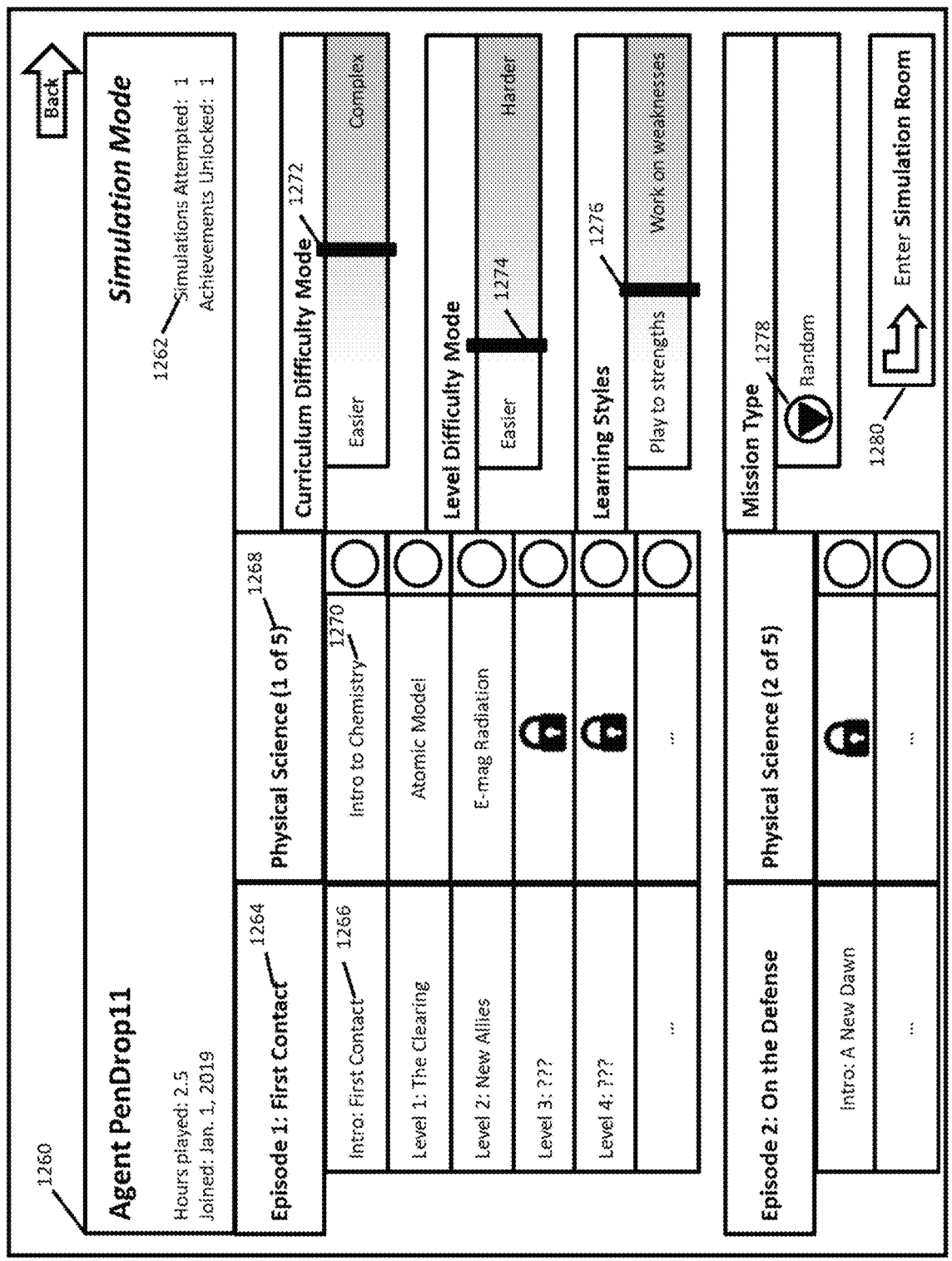
FIG. 35 is an illustration of a simulation mode screen of the educational game.

Referring now to FIG. 35, a user interface of a simulation mode selector 1260 of the educational game is shown. From the main menu and from the student profile screen, the user can request that the server 126 create a custom level in the simulation mode via the simulation mode selector 1260. The simulation mode selector 1260 has a simulation status indicator 1262 that displays how many simulations the user has attempted and the number of achievements the user has unlocked through the use of the simulation mode. The simulation mode selector 1260 includes episode titles 1264, level titles 1266, curriculum titles 1268 and module titles 1270 for every associated item in the educational game. However, the user can only select and engage the simulation mode for the items that the user has access rights to and has unlocked. The educational game is configured so that the user may make a selection from the unlocked episodes, levels, curriculum and modules, and the server 126 will mash-up the elements to dynamically generate a level.

The simulation mode selector 1260 includes a curriculum difficulty mode selector 1272. The curriculum difficulty mode selector 1272 is configured so that the user can select a level of learning object difficulty or challenge for the level created in the simulation mode. For example, the curriculum difficulty mode selector 1272 controls the tier of the game mechanisms, the complexity of learning objects, the narrative framework and the story elements selected for the level of the educational game.

The simulation mode selector 1260 includes a level difficulty mode selector 1274. The level difficulty mode selector 1274 is configured so that the user can select a level of game play difficulty or challenge for the level created in the simulation mode. For example, the level difficulty selector 1274 controls the type of enemy elements, the number of enemy elements, enemy element aggression (e.g., behavioral AI), the type of light cover elements, the number of light cover elements, story elements, and other game elements selected for the level of the educational game.

The simulation mode selector 1260 includes a learning style selector 1276. The learning style selector 1276 is configured so that the user can select whether the educational game presents learning objects and game mechanisms that—due to the learning styles presented—are easy for the user (e.g., that play to the user's strengths and preferences regarding learning styles) or that are more difficult for the user (e.g., that present information via the user's weaker learning styles), or somewhere in the middle. For example, the learning style selector 1276 controls the dynamic selection of learning objects, game mechanisms, narrative frame and story elements that are selected for the level of the educational game.

The simulation mode selector 1260 includes a mission type selector 1278. The mission type selector 1278 is configured so that the user can choose the mission type for the level of the educational game.

The simulation mode selector 1260 also includes an enter simulation room 1280 button, that the user can actuate to cause the server 126 to load a level of the educational game in accordance with the current selections from the simulation mode selector 1260 screen.

Figure 36:
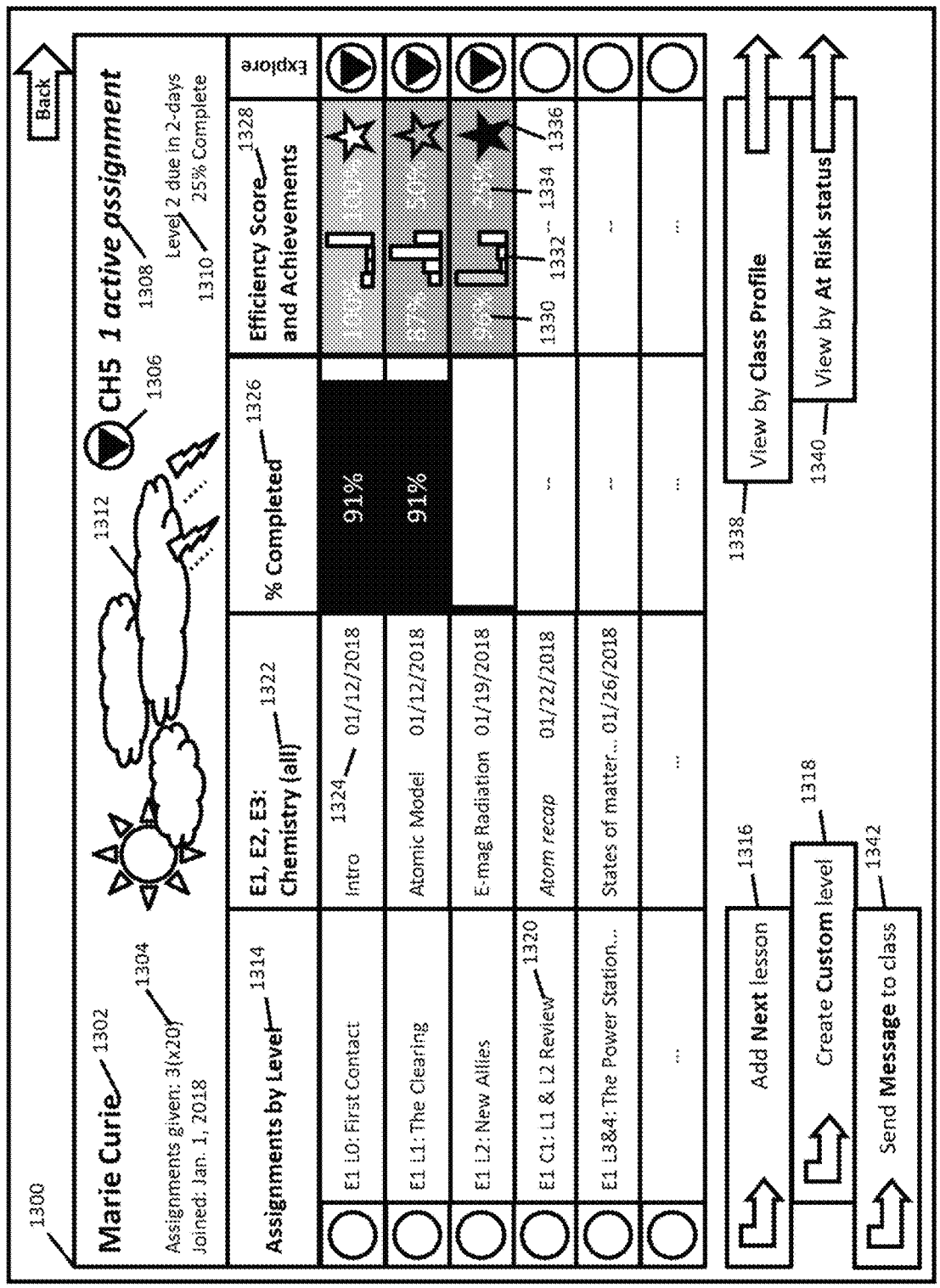
FIG. 36 is an illustration of a user interface of a teacher mode screen of the educational game.

Referring now to FIG. 36, a user interface of a teacher mode screen 1300 of an educational game is shown. The teacher mode screen 1300 has a title bar that includes a teacher name 1302 and teacher account details 1304 for the logged-in teacher. The teacher mode screen 1300 also has a class selector 1306. The class selector 1306 shows the current class period that is selected and is configured to allow the teacher to switch between class-level profiles or instances of the teacher mode screen 1300. The teacher mode screen 1300 includes an assignment indicator 1308 and assignment details 1310 that display information relevant to the selected class. For example, as shown in FIG. 36, the teacher's name is Marie Curie, she has selected "CH5" (e.g., for fifth period chemistry), that class has one assignment outstanding, which is to complete Episode 1, Level 2 in 2-days, and only 25% of students in that class have completed the assignment to-date.

The teacher mode screen 1300 includes a dynamic weather graphic 1312. The dynamic weather graphic 1312 is configured similarly to the dynamic weather graphic of the student profile screen (see FIG. 34) in that it also reflects progress and performance in the educational game. However, the dynamic weather graphic 1312 is generated to reflect where the teacher's class of students is in the story of the educational game, and how the class is performing (e.g., rather than how the teacher is progressing in the educational game).

The teacher mode screen 1300 includes a premade assignments selector 1314. The premade assignments selector

1314 provides a list of assignments that the teacher can quickly and easily assign to the class based on the episodes and the levels of the game. For example, the levels of the educational game are configured to be issued as an assignment to the class by clicking through one of the premade assignments. The teacher mode screen 1300 also includes an add next lesson 1316 that is configured to allow the teacher to automatically issue the next assignment in the list. By either approach, the teacher will be prompted to specify timing of the assignment and to make any customizations or add comments.

The teacher mode screen 1300 includes a create custom level 1318 button. The educational game is configured so that the teacher can create custom levels 1320 via a teacher-specific simulation mode interface. Once created, the custom level 1320 is added to the premade assignments selector 1314 list. Accordingly, the teacher mode screen 1300 is configured so that the teacher can issue the custom level 1320 quickly and easily for other classes or in future semesters.

The teacher mode screen 1300 also has information on the assignments, including: a curriculum description 1322 for the assignments; a timing 1324 for the assignment, such as the due date; a completion indicator 1326 that displays the percentage of students in the class who have completed the assignment by the due date; and performance indicators 1328 that tracks student mastery of the assignment. The performance indicators 1328 are a multi-factorial set of data that provide a summary of how the students of the class are engaging with and performing at the educational game. The performance indicators 1328 include a class average score 1330 that summarizes the average efficiency score of all students in the class normalized into a traditional 0% to 100% scale. The performance indicators 1328 include a bar chart 1332 of the efficiency scores of the students in the class grouped by a traditional letter grade scale (e.g., A, B, C, etc.). The performance indicators 1328 include a top achievement score 1334, which indicates the percentage of students who unlocked all of the achievements for the assignment. And the performance indicators 1328 include an average achievement score 1336, which graphically indicates the average amount of achievements unlocked and is color coordinated on a traditional medal scale (e.g., gold, silver, bronze, etc.). The performance indicators 1328 feed into the dynamic weather graphic 1312 and, combined, provide a useful, mostly visual snapshot of the status of the class with respect to the assignment.

The teacher mode screen 1300 also has a view by class profile 1338 button and a view by at risk status 1340 button is configured to load a class roster and grade book by assignment and a report of students who may be at risk, respectively. The teacher mode screen 1300 also has a send message to class 1342 button that is configured to send a notification, such as an e-mail, SMS text or learning management system message, to the class.

Figure 37:
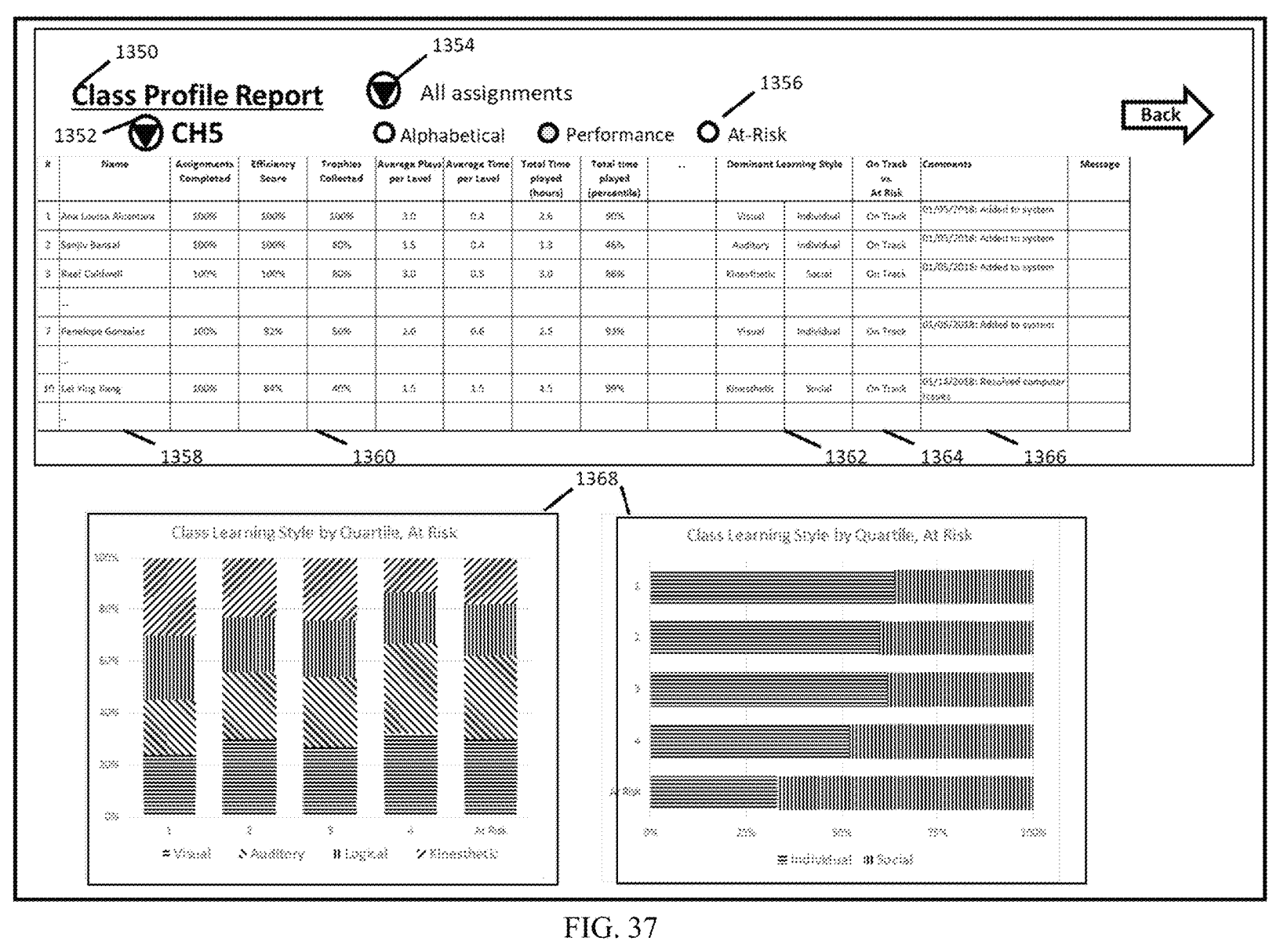

Referring now to FIG. 37, a user interface of a class profile report 1350 of the teacher mode of the educational game is shown. The class profile report 1350 is a detailed report of student performance and engagement with the educational game. The class profile report 1350 has a class selector 1352 that is configured to load the report with data for the selected class. The class profile report 1350 has an assignment filter 1354 that is configured to load the report with data for the selected assignments. And the class report 1350 has a presentation view filter 1356 that is configured to sort how the data is presented in the report. The presentation view filter 1356 has three modes, including: alphabetical (e.g., that sorts the report by the students' last name), performance (e.g., that sorts the report by the students' efficiency scores) and at risk (e.g., that sorts the report to show the students who are at risk to the top).

The class profile report 1350 has a spreadsheet of data on the class based on how the teacher selects and filters the data. The class profile report 1350 includes a real name 1358 of each student (e.g., rather than the student generated code-names or nicknames). The class profile report 1350 has summary statistics 1360, which include a variety of calculations of user performance like assignments completed, average efficiency score across all assignments (which can be nominal or weighted), a measure of achievements unlocked (e.g., a percentage), an average number of plays that the user has tried each unlocked level, an average time spent on each level, a total time the user has played the educational game, and a percentile score for total time played. The summary statistics 1360 provide a detailed view of many different aspects of how the users are engaging the educational game and can provide insight about irregular behaviors. The class profile report 1350 also provides insightful data analytics on users that goes beyond simple summary statistics, like a dominant learning style 1362 of the students and an at risk indicator 1364. The dominant learning style 1362 is based on a complex calculation of user interaction with learning objects that use the various learning styles. The at risk indicator 1364 is also based on a complex calculation of user interactions with the educational game. The summary statistics 1360, the dominant learning style 1362 and the at risk indicators 1364 can provide a robust picture of a student's performance to facilitate teacher intervention. The class profile report 1350 also has a comments box 1366 where the teacher can make notes about individual student performance.

The lower half of the class profile report 1350 displays class learning style 1368 charts. The class learning style 1368 charts are organized by quartile and by at risk students, providing a quick snapshot of the class's makeup. Teachers can utilize these insights in class to better connect with the students and approach the material from a perspective that resonates with the learning needs of each class. For example, as shown in FIG. 37, the class learning style 1368 data shows that at risk students are quite similar to the other students in terms of visual versus auditory versus logical versus kinesthetic learning; however, the at risk students are much more likely to be social learners. Thus, the teacher may decide to make that class's sessions more group-oriented and historical figure-oriented to draw the at risk students into the conversation to engage the at risk students. The teacher may hover over and click through the class profile report 1350, for example, to view an individual student's profile.

Figure 38:
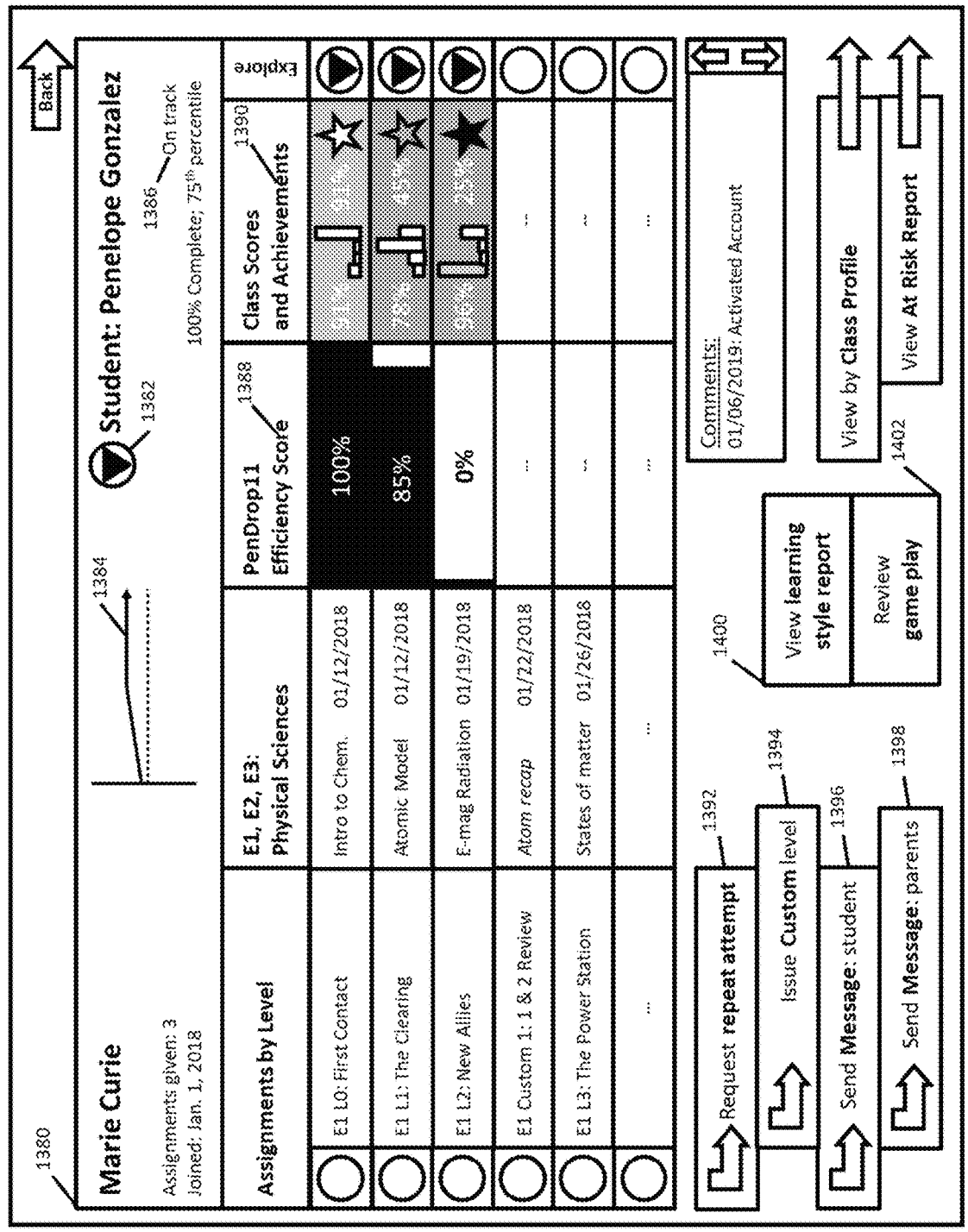
FIG. 38 is an illustration of a user interface for an individual student profile report of the teacher mode of FIG. 36.

Referring now to FIG. 38, a user interface of an individual student profile 1380 report is shown. The individual student profile 1380 is similar to the user profile that the focal student would see, but with some modifications. The individual student profile 1380 of the teacher mode has a student selector 1382 to choose which student from within the class to display. The dynamic weather graphic is replaced by a relative performance graphic 1382 that is configured to graphically display how the focal student has performed over time relative to the rest of the class (e.g., the median class performance is indicated as a dashed line). The individual student profile 1380 includes individual assignment details 1386 indicating the status of any outstanding assignments and the focal student's progress on the assignment. The individual student profile 1380 includes an individual student efficiency score 1388 that shows the best efficiency score that the user achieved on each assignment. And the individual student profile 1380 includes class scores and achievements data 1390 that provides a snapshot of the relative performance of the class. The individual student profile 1380 is configurable to display other statistics of user performance as well, such as win-loss ratios, enemies defeated-to-player characters disabled (sometimes referred to in games as kill-to-death averages or "KDAs"), energy expended-to-energy received ratios, and the like.

The individual student profile 1380 includes a request repeat attempt 1392 button that is configured to issue a new assignment to the focal student to complete a previously assigned level. The individual student profile 1380 includes an issue custom level 1394 button that is configured to load a teacher version of the simulation mode. The individual student profile 1380 includes a send message to student 1396 button that is configured to open a window with a text editor to send a message (e.g., e-mail, SMS text or LMS system message) to the focal student. The individual student profile 1380 also includes a send message to parents 1398 button that is configured to open a window with a text editor to send a message to the parent of the focal student. The individual student profile 1380 has a view learning style report 1400 button that is configured to toggle the body of the individual student profile 1380 screen from student completion and performance data to student learning preference data and analytics. The individual student profile 1380 also has a game play 1402 button that is configured to load very detailed data about the focal student's game play history, such as prior game walk throughs.

Figure 39:
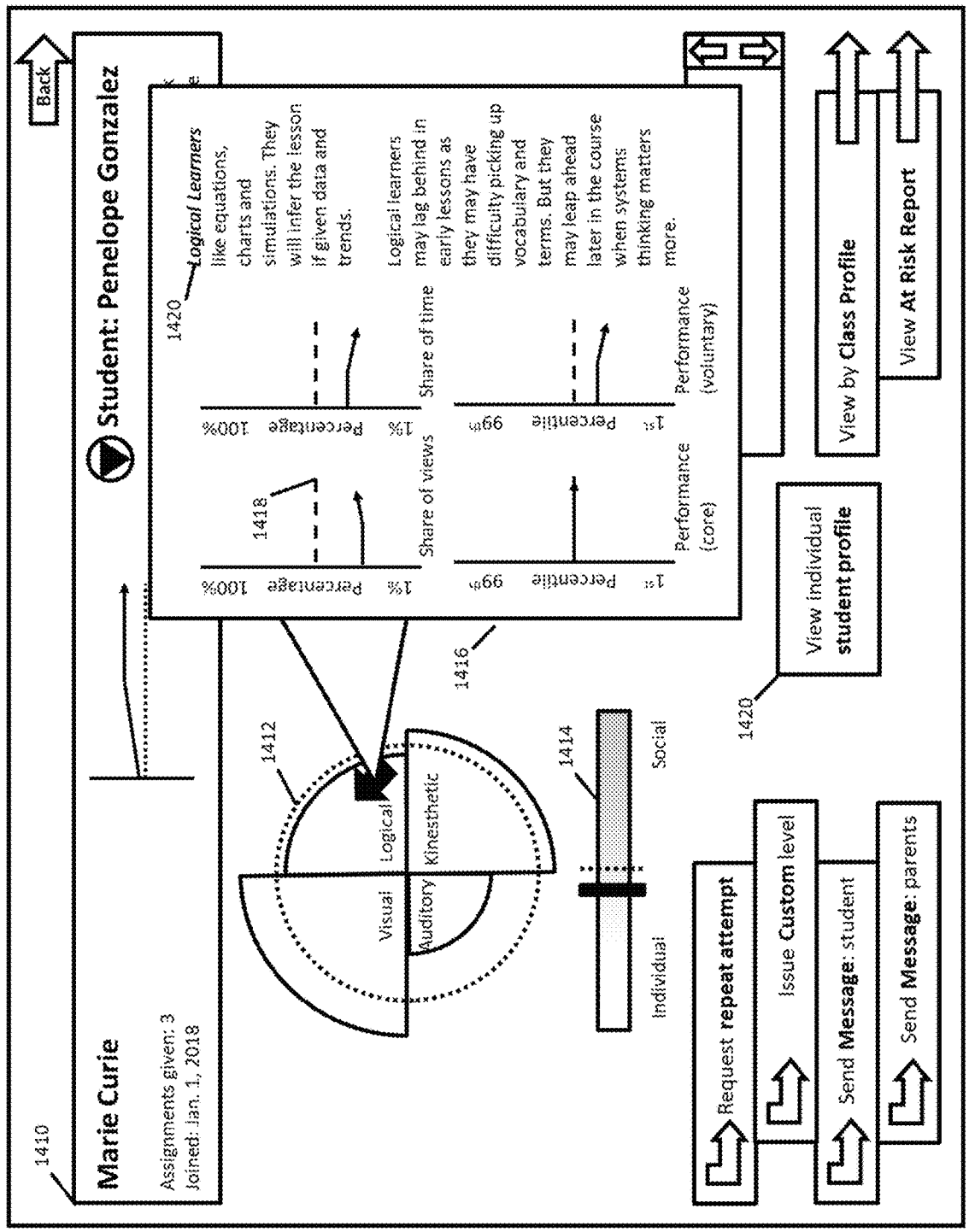
FIG. 39 is an illustration of a user interface for an individual student learning style report of the teacher mode of FIG. 36.

Referring now to FIG. 39, a user interface of an individual student learning style report 1410 is shown. The individual student learning style report 1410 has a dominant learning style graphic 1412 and a dominant learning mode graphic 1414. The dominant learning style graphic 1412 depicts the focal student's learning style and preferences among the major categories of: visual learning, auditory learning, logical learning and kinesthetic learning. The focal student's learning style is depicted relative to the average student represented as a dotted line. The dominant learning mode graphic 1414 depicts the focal student's learning style and preferences among the minor categories of: individual versus social learning. The focal student's learning style (represented as a thick bar) is depicted versus the average student (represented as the dotted line).

The dominant learning style graphic 1412 and the dominant learning mode graphic 1414 are configured to display a pop-up window 1416 if hovered over with additional details and data underlying the learning style insights. For example, hovering over the logical learning style part of the dominant learning mode graphic 1414 reveals a series of charts 1418 depicting the focal student's data relative to the median student. A first chart shows a focal student's share of views of the focal learning style materials (logic) versus all learning objects on a relative basis as compared to the rest of the class. A second chart shows the focal student's share of time spent viewing the focal learning style materials versus all learning objects on a relative basis as compared to the rest of the class. A third chart shows the focal student's performance on core challenges (e.g., required to successfully beat a story mode level or prebuilt challenge) presented in the focal learning style on a relative basis as compared to the rest of the class. And a fourth chart shows the focal student's performance on voluntary challenges (e.g., not core to completing each level or challenge, such as simulation mode play) presented in the focal learning style on a relative basis as compared to the rest of the class. The pop-up window 1416 also includes a series of learning style coaching tips 1420 that are a description of the focal learning style and the learners who favor it, tips of how to engage students with that learning style, and dynamically adaptive text providing insight on how to intervene in view of all data for the focal student. The learning style coaching tips 1420 provide insight to the teacher regarding how the focal student can be more effectively engaged.

The individual student learning style report 1410 also includes a view individual student profile 1420 button, which returns to the individual student profile screen 1380.

Referring now to FIG. 40, a user interface of an at risk class report 1430 for a class of students is shown. The at risk class report 1430 lists names 1432 of all students in a class stack ranked based on an at risk score 1434. The at risk score 1434 is computed based on the learning profile of the user and usage patterns, as analyzed by the assignment module, the usage modules, the performance modules, the engagement modules and the other modules of the learning management system engine 146. The at risk score 1434 is a number between 0 and 1 that indicates the level of problematic or worrisome behavior observed for each student. The at risk score 1434 is based on a calculation of student performance factors, such as: completion of assignments or completion of assignments on time, performance on assignments (e.g., as measured by efficiency score), trends in completion and performance over time, and average time of use (including minimal and excessive times spent playing the educational game). The at risk score 1434 is more fine-grained in nature than is currently possible to compute from existing learning management systems. For example, the educational game with learning management system engine computes an at risk score 1434 based on: incremental completion of the assignment throughout the assignment window, variance of when the assignments are completed, variance of time of day of completion, variance of time of day of use of the educational game, variance of performance on specific learning objects over time, variance of rate of learning over time, variance of retention over time, variance of in-game play patterns and strategies, variance of performance on specific learning styles over time, variance of location of use (e.g., based on changing IP addresses), variance of equipment used (e.g., based on changing device descriptions and MAC addresses), variances of engagement levels (e.g., click per minute), indications of frustration (e.g., as measured by very high click per minute rates), variance of time spent inactive (e.g., periods of use with gaps in click or input of greater than 3-minutes), variance of use of different game modes, variance of search patterns within the laboratory mode, variances of search patterns in the achievements modes, variance of hover over and click through behaviors, variance of play conditions, and so on. The at risk class report 1430 also includes a reason 1436 for the at risk score 1434. The reason 1436 is an analytically-backed explanation for the factor or factors that are causing an at risk score of greater than a minimum threshold (e.g., 0.2). The at risk score 1434 and the reason 1436 harnesses insights about micro level changes in performance that may reveal or provide indication of troubles at home, volatility in the student's life, lack of focus, poor retention and other factors that the teacher can use to spur an intervention and one-on-one time with the student.

In addition, the at risk class report 1430 includes a comments section 1438 that tracks messages with the student and the parents of the student over time, and a message 1440 utility that is configured to allow for rapid communication (e.g., via e-mail, SMS text or learning management system notification) with the focal student and the parents of the focal student.

Figure 41:
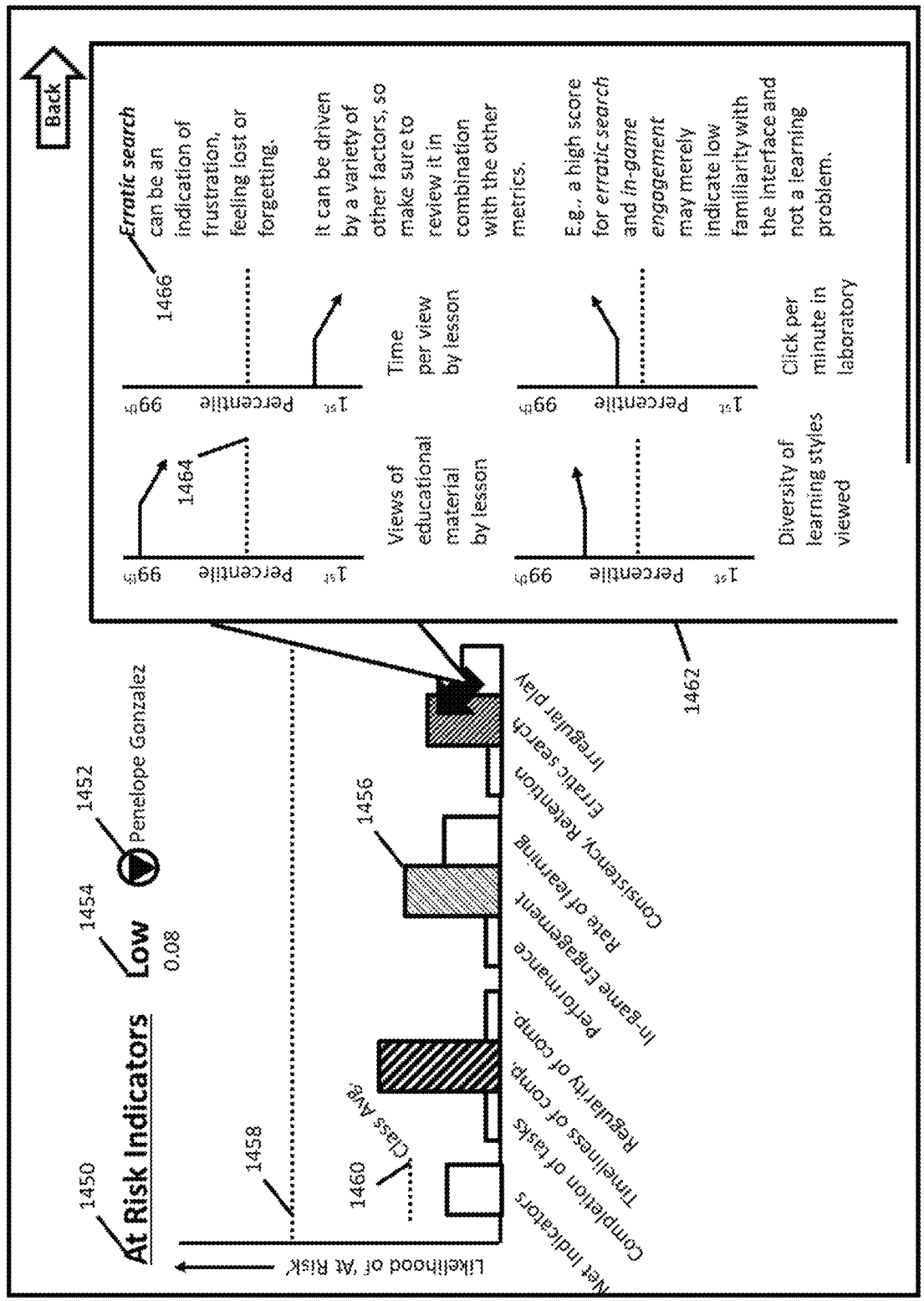
FIG. 41 is an illustration of a user interface for an at risk indicators report for an individual student of the teacher mode of FIG. 36.

Referring now to FIG. 41, a user interface of an at risk indicators report 1450 for an individual student is shown. The at risk indicators report 1450 provides additional details and insights about the focal user's at risk score. The at risk indicators report 1450 includes an individual student selector 1452 to switch between students from the same class. The at risk indicators report 1450 also includes a summary indicator 1454 that succinctly characterizes the focal user's at risk score and details.

The at risk indicators report 1450 organizes the user engagement and user performance data into risk factors 1456 that are grouped into categories, including completion metrics, performance metrics, and consistency metrics, and a net indicator that averages the risk factors 1456. Each risk factor 1456 is presented on a relative basis versus a median threshold 1458 of at risk behavior, based on aggregated user data collected from all users of the educational game. The risk factors 1456 are presented with formatting rules (e.g., dynamic color adjustments) to draw the teacher's attention to key measures and facilitate quick and easy interpretation. The net indicator is presented relative to a class average 1460. The class average 1460 provides two insights: first, the class average 1460 can be compared to the focal student to quickly and succinctly understand how the focal student is situated within the class; and second, the class average 1460 can be compared to the median threshold 1458 to understand how the class is situated within the broader population of student users, which can provide early indications regarding end of the year testing.

The risk factors 1456 are configured to display a pop-up window 1462 when hovered over, which displays the underlying data for the focal student over time and on a relative basis to the rest of the class. The underlying data is presented as a series of charts 1464 with at risk coaching tips 1466, which are similar to the data presented with the learning style reports.

The at risk data in the at risk class report 1430 and the at risk indicators report 1450 is partially aggregated and presented in the form of relative values (e.g., versus the class or the total user population) to obscure sensitive data about the users. Instead, the at risk data is presented in a way that focuses on providing actionable insights and useful teaching or coaching tips to the teacher to improve interactions with the focal student. This is achieved through sensitive analysis of extensive user input data that is gathered from the play of the educational game.

Figure 42:
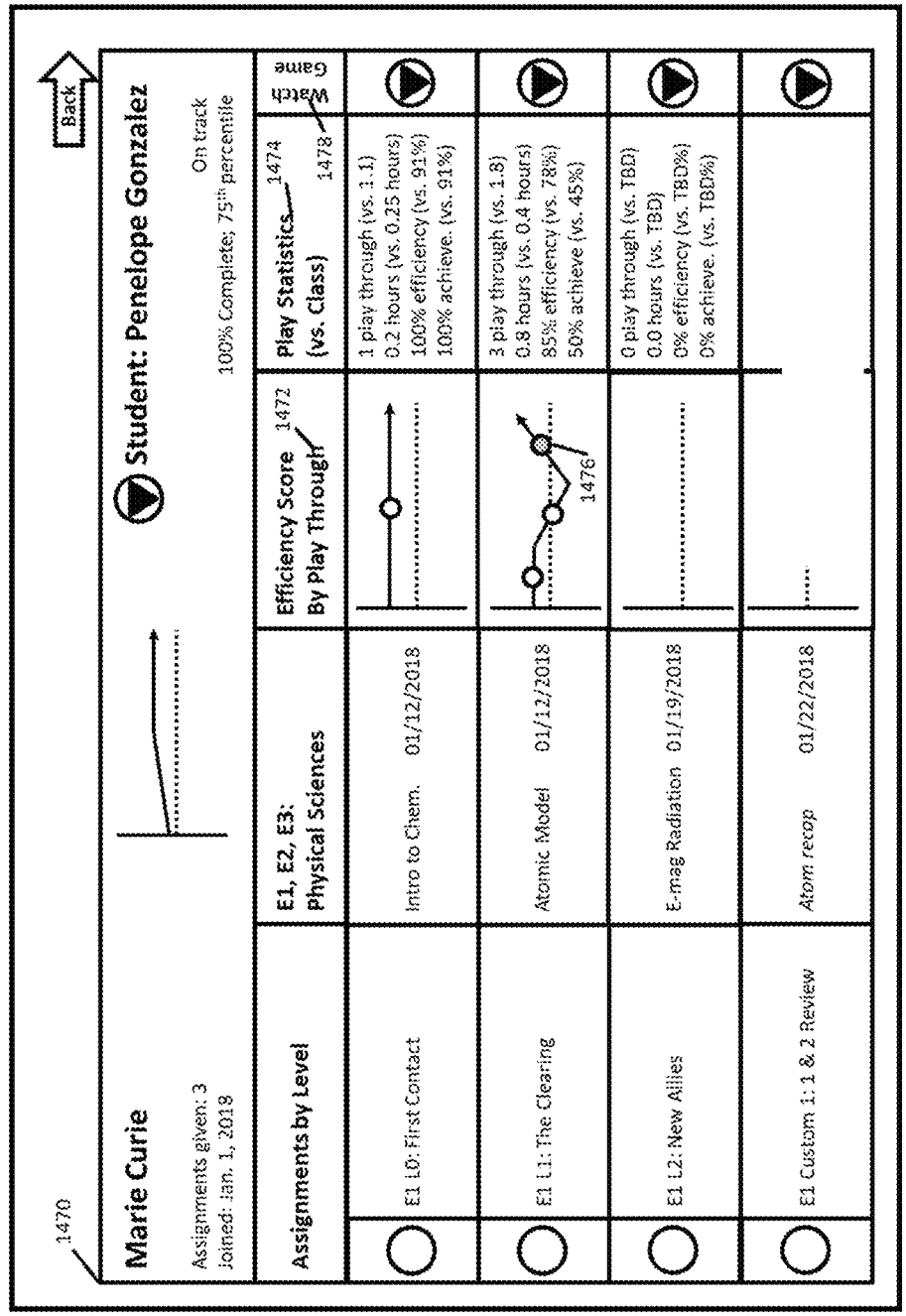
FIG. 42 is an illustration of a user interface for a review game play report of the teacher mode of FIG. 36.

Referring now to FIG. 42, a user interface of a review game play report 1470 of the teacher mode is shown. The review game play report 1470 is configured to allow the teacher to observe student performance in the educational game in granular detail. The review game play report 1470 is similar to the individual student profile screen of the teacher mode in many ways, but with some differences. The review game play report 1470 has efficiency score by play through 1472 charts that depict how the focal student performed on each attempt of a level versus the class average (based on best performances). The review game play report 1470 has play statistics 1474 that show how the focal student completed and performed on a given level or assignment versus the class average. The efficiency scores by playthrough 1472 includes a node selector 1474 that is configured to select a specific playthrough, and a watch game 1478 button that is configured to load the selected playthrough. In one embodiment, the educational game is a turn-based strategy game. Accordingly, each game action and invocation of a game mechanism is a discrete event that occurs at a discrete time. Even voice-based inputs by the user can be readily converted to text and saved as a manageable file size. Thus, the total data created by each play through is reasonable and can be stored, replayed, analyzed and annotated without creating undue computing loads. The watch game interface is configured in accordance with the game mode interfaces with the addition of a control panel that is configured to play, pause, jump forward and jump back between actions, annotate comments, and jump forward and jump back between comments.

Referring now to FIG. 43A, a user interface of a custom lesson mode 1480 for the teacher mode of the educational game is shown. The custom lesson mode 1480 allows teachers to create custom levels and is similar in many ways to the simulation mode lesson creator that student users can access, but with some differences. The custom lesson mode 1480 has creation data 1482 that are configured to track how many custom challenges the teacher has created and the date of creation. The custom lesson mode 1480 also includes engagement data 1482 that are configured to track an engagement rating of what percentage of students completed the challenge and an easter egg tracker of what percentage of students found special objects inserted in the custom level.

The custom lesson mode 1480 has an episode selector and a level selector, as well as an educational standard selector 1486 that are configured to allow the teacher to identify relevant lessons and curate the learning objects of the custom level. As shown in FIG. 43A, the educational standard selector 1486 indicates that the Next Generation Science Standards (NGSS) are selected and, as a result, the NGSS codes for learning standards are shown alongside a description of the subject matter covered in each level. The educational standard selector 1486 provides the teacher with fine grain controls over the educational materials of the educational game that aligns with the standards and curriculum of the teacher's choosing.

The custom lesson mode 1480 has a curriculum difficulty mode selector 1488, a level difficulty mode selector 1490, a learning style selector 1492 and a mission type selector 1494 that are generally similar to the simulation mode equivalents from the student-user mode. However, the custom lesson mode 1480 includes customization 1498 buttons that allows the teacher to have additional control over the generation of the custom level.

Figure 43B:
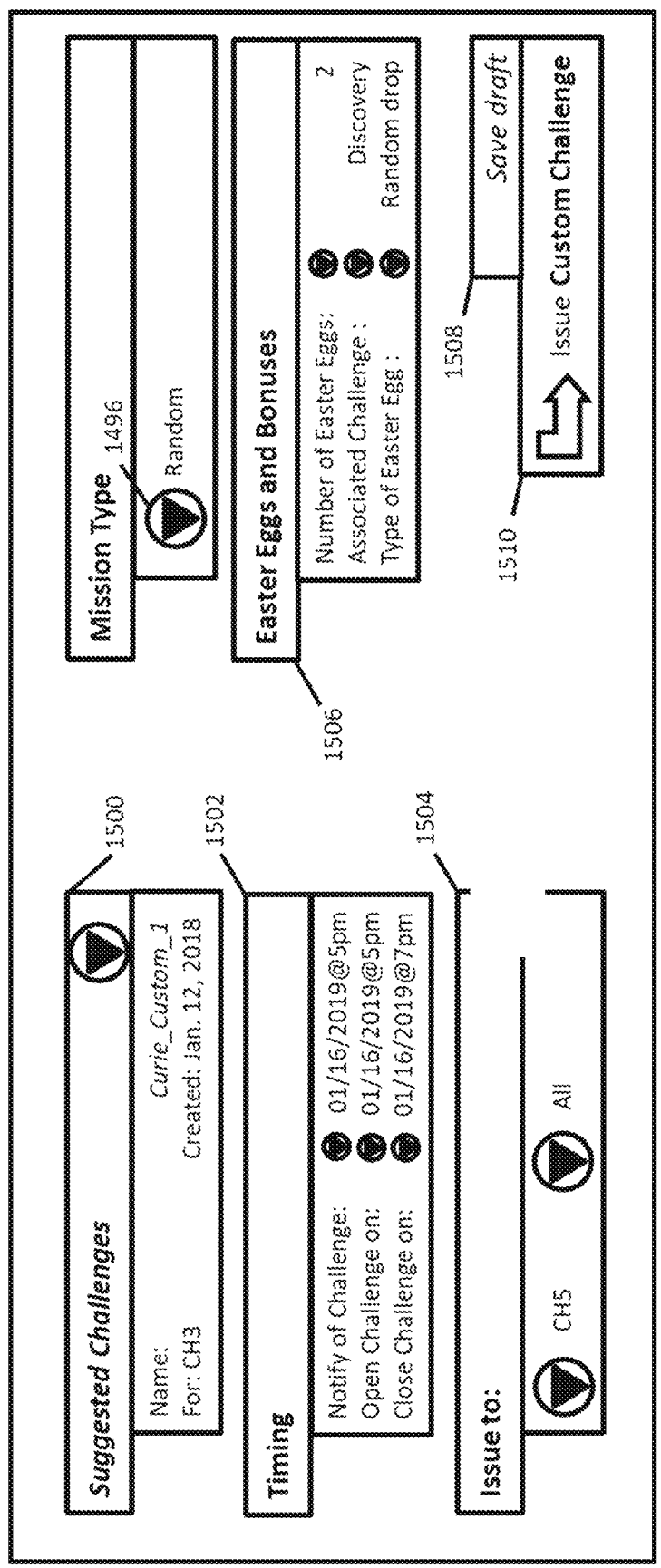
FIG. 43B is an illustration of a second aspect of a user interface of a custom lesson mode of the teacher mode of FIG. 36.

The custom lesson mode 1480 has a suggested challenge selector 1500, as shown in FIG. 43B. The suggested challenge selector 15000 is configured to display a previously created custom level that may be of interested to the teacher. For example, the suggested challenge selector 15000 automatically identifies pre-built levels based on the time of the year (e.g., drawing from last year or last semesters lessons), the sequence of recently issued lessons (e.g., drawing from other recently issued lessons), the current figuration of the custom lesson mode 1480 screen, previously created and saved drafts of custom levels, and a pool of publicly available lessons created by other teachers. By clicking on the suggested challenges selector 1500, the elements of the custom lesson mode 1480 will populate with the configuration of the suggested challenge. The teacher can then customize the lesson further, if desired.

The custom lesson mode 1480 has assignment timing controls 1502 and assignment distribution controls 1504. The assignment timing controls 1502 define when notification of the challenge will be sent to the recipients, when the challenge will open and when the challenge will close. The assignment timing controls 1502 define the assignment window of the custom level. For example, the assignment timing controls 1502 and the assignment distribution controls 1504 are configured to allow the teacher to define a wide assignment timing window, such as one week, to allow students to plan and perform the assignment at the students' leisure, or to define a narrow assignment timing window, such as one hour, to use the educational game as a proxy for a quiz in class or to spur student excitement at the promise of a great reward for participating in a short-lived event out of class hours.

In one embodiment, the educational game is configured so that if an assignment is released for a short period (e.g., ≤1-hour) during regular class hours (e.g., between 7 am and 3 pm during a weekday) or if an assignment is set to be released immediately and for a short period, then a pop-up window with a "STOP (/RESUME)" button will be presented. The teacher mode is configured so that the teacher can click on the STOP button to pause the educational game for all members of the focal class; and, after resolving the issue or making an announcement, the teacher can click on the RESUME button to recommence the educational game for all members of the focal class. Accordingly, the educational game is configured for controlled-use in a classroom environment.

In one embodiment, the educational game is configured to throttle student access to the educational game outside of the assignment windows defined by the teacher. Accordingly, the teacher can control the rate at which students playthrough the educational game by defining the window periods of play and use. This ensures that all students are experiencing the educational game at the same time so that the teacher can have improved control over in class discussions and engagement.

The custom lesson mode 1480 has assignment distribution controls 1504. The assignment distribution controls 1504 define who will receive the challenge, with specification of existing classes and individual students from within those classes.

The custom lesson mode 1480 also has an Easter eggs and bonuses selector 1506 that are configured to allow the teacher to insert Easter eggs, bonuses and special objects into the custom level, such as resource nodes, power nodes, terrain elements and so on. The Easter eggs and bonuses selector 1506 also has practical implications. For example, if a teacher would like to issue a hard challenge to a class of students, the teacher may first want to create a custom level with a sufficient abundance of resources to allow the students to play the custom level, collect resources and upgrade armor and weapons to survive the hard challenge ahead.

The custom lesson mode 1480 has a save draft 1508 button that is configured to save the current configuration of the custom level mode 1480 to memory for later use, and an issue custom challenge 1510 button that is configured to assign the custom level to students or classes in the specified time frame.

Referring now to FIG. 44, an illustration of a data structure 1520 of learning objects of the educational game is shown. As previously described, the learning objects, and thus the data structure 1520 of learning objects, are configured for dynamic rendering and presentation into the content window 1020 of the laboratory area 1000 as depicted in FIG. 25. Also, as previously described, each learning object is associated with a small and readily digestible amount (e.g., a few sentences or paragraphs on a given science topic) of educational materials, which are presented in a variety of learning style formats including text, audio, video, simulations and so on.

The data structure 1520 of the learning objects is structured based on a number of domain categories that determine which learning objects are selected and where those learning objects will be presented in the educational game. A subject matter domain category 1522, such as the primary affiliated subject matter or area of scientific endeavor, like chemistry, physics, biology, statistics and so on, organizes the learning objects at a high-level. The primary domain category 1522 generally aligns to how the educational game is organized by episodes (e.g., collections of levels). The educational data elements 1520 are structured based on a secondary domain category 1524, such as an element or material selection that crosscuts the subject matter. The secondary domain category 1524 are configured to align to how the subject matter is encountered in-game and through the game mechanisms. The data structure 1520 is also structured based on a tertiary domain category 1526, such as a categorical breakdown of the key concepts that run throughout the subject matter (e.g., electro-magnetic properties, chemical reactivity properties, combustion properties, nuclear properties, and bulk material properties of matter within the primary domain of chemistry). The tertiary domain categories 1526 are configured to align to how the subject matter is taught and reinforced in-game through the laboratory area and during game play.

The data structure 1520 is also structured by module factors 1528 that are configured to determine which learning objects are unlocked and available for presentation. The module factors 1528 include an order score 1528 that indicates the sequence of when the educational data element 1520 is to be unlocked based on a given learning profile of the user. The order score 1528 is updated progressively with the learning profile of the user to throttle the amount of information presented to the user. The module factors 1528 include a topic overview 1530 that indicates the type of subject matter covered. The module factors 1528 include a format type 1532 that indicate the type of file present, which influences how the learning objects are rendered and how users can interact with the learning objects. And the module factors 1528 include learning style data 1536 that represents the dominant learning style of the learning object.

For example, in FIG. 44, a set of available learning objects for a given user is shown in black, with still locked learning objects shown in gray to illustrate the progression of learning. The user has unlocked fourteen (14) of the subset of thirty-six (36) learning objects shown, each of which relates to the primary domain category of chemistry, the secondary domain category of carbon as an element or in game material, and the tertiary domain category of five physical science material properties. If the user opened the learning area of the educational game (e.g., see FIG. 25) and properly configured the display, the user would be able to see and experience four (4) learning objects about the electro-magnetic properties of carbon, three (3) learning objects about the chemical reactivity properties of carbon, one (1) learning object about the combustion properties of carbon, zero (0) learning objects about the nuclear properties of carbon and six (6) learning objects about the bulk material properties of carbon. Moreover, the user would be presented with a customized set of learning objects based on the associated learning style of the learning objects and the learning profile of the user (e.g., indicating the user's preference with previously viewed learning objects). In time, as the user progresses through the educational game and consumes more of the learning objects in the laboratory area and the achievements area, additional learning objects will be unlocked (grayed out).

Figure 45:
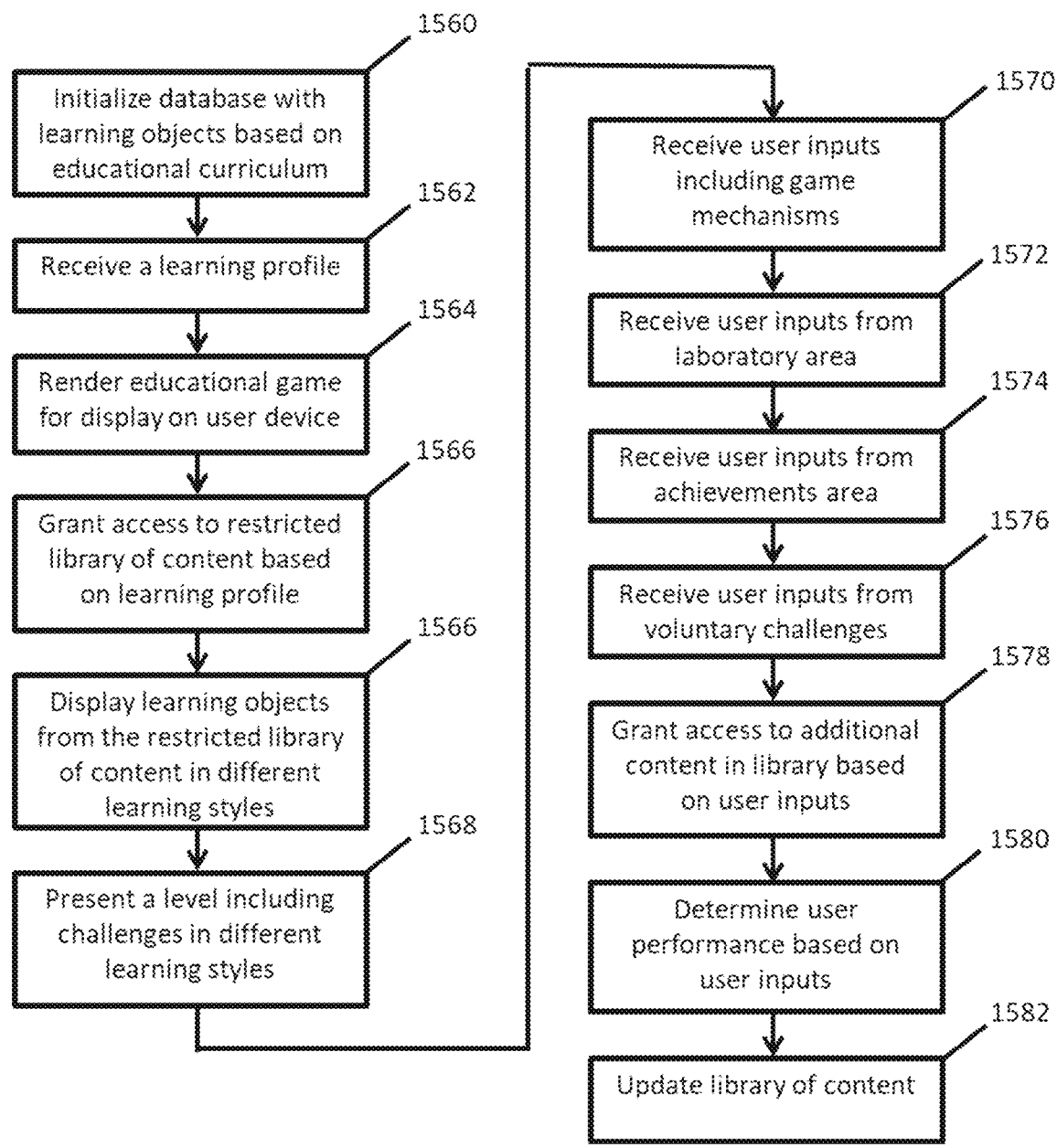
FIG. 45 is a flow diagram of a method of updating user access to the data structure of learning objects of the educational game.

Referring now to FIG. 45, a method of updating user access to the data structure of learning objects is shown. The method starts when the server 126 initializes a database with learning objects based on educational curriculum 1560, receives a learning profile of a user 1562, and renders the educational game for display on a user device 1564. Then, the server 126 grants access to a restricted library of content based on the learning profile 1566 of the user and displays learning objects from the restricted library of content. As the user plays the educational game, the server 126 receives user inputs including game mechanisms 1568, receives user inputs from the laboratory area 1570, receives user inputs from the achievements area 1572, and receives user inputs from voluntary challenges 1574 (e.g., voluntary quizzes invoked in-game). Then, based on the user inputs, the server 126 grants access to additional content in the library of content based on the user inputs 1576. The server 126 also determines user performance based on the user inputs 1570, 1572, 1574, 1576 and updates the learning profile of the user to calibrate the data structure based on data-driven performance impacts.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A computer system for teaching science, technology, engineering and math (STEM) curriculum in a video game format, the computer system comprising:

a memory and a processor configured for:

accessing a user-defined learning standard of the STEM curriculum that is stored in the memory, wherein the user-defined learning standard of the STEM curriculum includes a first set of scientific properties and a curriculum-based game mechanism;

displaying the user-defined learning standard of the STEM curriculum to a player of the video game via a graphical user interface (GUI) during gameplay,
  wherein the gameplay includes a story-driven narrative framework, and
  wherein the gameplay is based on the user-defined learning standard;
generating an interactive object to display to the player of the video game via the GUI during the gameplay,
  wherein the interactive object is associated in the memory with a first set of scientific properties stored in the memory that define real-world characteristics of the interactive object;
generating at least one player-controlled avatar that is configured to interact in real-time during the gameplay with at least one scientific property of the first set of scientific properties associated with the interactive object as part of the story-driven narrative framework,
  wherein available actions for the at least one player-controlled avatar to advance the story-driven narrative framework are based on the curriculum-based game mechanism,
  wherein the curriculum-based game mechanism governs the real-time interaction between the at least one player-controlled avatar and the at least one scientific property during the gameplay, and
  wherein the input from the player is based on the curriculum-based game mechanism and relates to the first set of scientific properties associated with the interactive object;
applying one or more transformations to the interactive object to create a modified interactive object in response to the input from the player,
  wherein the one or more transformations to the interactive object are applied according to the curriculum-based game mechanism; and
displaying the modified interactive object via the GUI.

2. The computer system of claim 1, wherein:
the at least one player-controlled avatar is associated in the memory with a second set of scientific properties that define real-world characteristics of the player-controlled avatar; and
the interactive object is configured to interact with at least one scientific property of the second set of scientific properties associated with the player-controlled avatar using the curriculum-based game mechanism;
wherein the user-defined learning standard defines the second set of scientific properties.

3. The computer system of claim 1, wherein:
the player-controlled avatar is associated with a supply of energy; and
wherein the interaction of the at least one player-controlled avatar with at least one scientific property of the first set of scientific properties is simulated in two parts, the two parts including:
a player-controlled action portion that transmits energy from the supply of energy associated with the player-controlled avatar to the interactive object; and
a reaction portion that absorbs at least some of the transmitted energy based on the first set of scientific properties.

4. The computer system of claim 1, wherein the processor is further configured for
generating a field of play associated in the memory with a third set of scientific properties;
  wherein the curriculum-based game mechanism governs how the field of play behaves based on the third set of scientific properties associated with the field of play; and
  wherein the user-defined learning standard defines the third set of scientific properties.

5. The computer system of claim 4, wherein the curriculum-based game mechanism governs interactions with the first set of scientific properties and is used to simulate at least two parts selected from the list of: a player-controlled action portion that transmits energy from the player-controlled avatar to the interactive object; a reaction portion of the interactive object that absorbs some of the transmitted energy based on the first set of scientific properties; and a loss factor portion that dissipates a remainder of the transmitted energy into the field of play.

6. The computer system of claim 1, wherein the first set of scientific properties is selected from the list of: electrical properties, magnetic properties, thermal properties, chemical reactivity properties, combustion reactivity, nuclear properties, bulk physical properties, organic molecule properties, protein properties, cell structure properties, and biological function properties.

7. The computer system of claim 1, wherein the first set of scientific properties is based on an element or a combination of elements from the periodic table of elements.

8. The computer system of claim 1, wherein the curriculum-based game mechanism is used to simulate a gadget that is configured to operate with an element or a combination of elements from the periodic table of elements as the medium of the gadget.

9. The computer system of claim 1, wherein the first set of scientific properties is based on cell structure and function of cells selected from the list of: prokaryotic cells, plant cells and animal cells.

10. The computer system of claim 1, wherein the first set of scientific properties is based on energy transfer and energy conversion.

11. The computer system of claim 1, wherein the curriculum-based game mechanism is used to simulate energy transfer based on a selection from the list of: radiation, photon emission, conduction, convection, kinetic projection, chemical reaction, electricity, magnetics, elasticity, fusion and fission.

12. The computer system of claim 1, wherein the curriculum-based game mechanism is selected from the list of:
an electro-magnetic radiation gadget that is simulated based on the Bohr model of the atom and the absorption of radiation by a material;
an electro-magnetic pulse gadget that is simulated based on Maxwell's equations and the Lorentz force law of electromagnetism and the induction of electric current in metal circuits;
an oxidation-reduction sprayer that is simulated based on chemical reaction of elements and molecules and the conduction and convection of heat energy to matter;
an acid-base reaction gadget that is simulated based on acid-base properties, the chemical reactivity of elements and molecules and stoichiometry, and the conduction and convection of heat energy to matter;
a railgun device that is simulated based on Faraday's laws of induction and the laws of classical mechanics regarding the transfer of kinetic energy to macroscopic objects and the impact on the structural properties of matter;
an electronic transmission device that is simulated based on analog and digital electronic component control systems properties regarding the controlled transfer of an electronic signal to interact with the electro-magnetic properties of the matter;

a virus, bacteria, fungus, or toxin that is simulated based on cell structure and function theories and that alters the function of the cell; and a cell structure that is simulated based on prokaryotic cell, plant cell or animal cell functions and that produces byproducts for the cell.

13. The computer system of claim 1, wherein the curriculum-based game mechanism is associated with at least two domains of scientific knowledge.

14. The computer system of claim 1, wherein the processor is further configured for generating a laboratory area with explanations, equations and data relating to the interaction of the curriculum-based game mechanism with the first set of scientific properties.

15. The computer system of claim 14, wherein the laboratory area allows the player to alter the interactive object using scientific principles based on the first set of scientific properties.

16. The computer system of claim 15, wherein altering the interactive object includes upgrading, modifying, equipping, attaching, rearranging, or programming the interactive object.

17. The computer system of claim 1, wherein the processor is further configured for generating an achievements area with industry context, career trends and employment information relating to the interaction of the curriculum-based game mechanism with the first set of scientific properties.

18. The computer system of claim 1, wherein the curriculum-based game mechanism is used to simulate a gadget that is configured to operate based on a scientific principle as the medium of the gadget.

19. A method for teaching science, technology, engineering and math (STEM) curriculum using an educational game executed on a computer system comprising:

accessing, using the computer system, a user-defined learning standard of the STEM curriculum that is stored in a memory,
wherein the user-defined learning standard of the STEM curriculum includes a first set of scientific properties and a curriculum-based game mechanism;

displaying, using the computer system, the user-defined learning standard of the STEM curriculum to a player of a video game via a graphical user interface (GUI) during gameplay,
wherein the gameplay includes a story-driven narrative framework, and
wherein the gameplay is based on the user-defined learning standard;

generating, using the computer system, an interactive object to display to the player of the video game via the GUI during the gameplay,
wherein the interactive object is associated in the memory with a first set of scientific properties stored in the memory that define real-world characteristics of the interactive object;

generating, using the computer system, at least one player-controlled avatar that is configured to interact in real-time during the gameplay with at least one scientific property of the first set of scientific properties associated with the interactive object as part of the story-driven narrative framework,
wherein available actions for the at least one player-controlled avatar to advance the story-driven narrative framework are based on the curriculum-based game mechanism,
wherein the curriculum-based game mechanism governs the real-time interaction between the at least one player-controlled avatar and the at least one scientific property during the gameplay, and
wherein the input from the player is based on the curriculum-based game mechanism and relates to the first set of scientific properties associated with the interactive object;

applying, using the computer system, one or more transformations to the interactive object to create a modified interactive object in response to the input from the player,
wherein the one or more transformations to the interactive object are applied according to the curriculum-based game mechanism; and displaying, using the computer system, the modified interactive object via the GUI.

* * * * *

UNITED STATES PATENT AND TRADEMARK OFFICE
CERTIFICATE OF CORRECTION

PATENT NO. : 11,468,788 B2  
APPLICATION NO. : 16/103294  
DATED : October 11, 2022  
INVENTOR(S) : Samuel Bedor et al.

Page 1 of 1

It is certified that error appears in the above-identified patent and that said Letters Patent is hereby corrected as shown below:

On the Title Page

Item (73) Assignee, "PLASMA GAMES, LLC" should be replaced with -- PLASMA GAMES, INC. --.

Signed and Sealed this  
Twenty-eighth Day of November, 2023

Katherine Kelly Vidal  
*Director of the United States Patent and Trademark Office*